United States Patent
Farag

(10) Patent No.: US 7,832,160 B2
(45) Date of Patent: Nov. 16, 2010

(54) SEISMIC SAFE AND FIRE RESISTANT RATED EDGE ATTACHED STOPLESS GLAZING

(75) Inventor: F. Aziz Farag, Iselin, NJ (US)

(73) Assignee: Media Curtainwall Corp., Gillette, NJ (US)

( * ) Notice: Subject to any disclaimer, the term of this patent is extended or adjusted under 35 U.S.C. 154(b) by 1451 days.

(21) Appl. No.: 11/060,705

(22) Filed: Feb. 18, 2005

(65) Prior Publication Data

US 2005/0166496 A1    Aug. 4, 2005

Related U.S. Application Data

(63) Continuation-in-part of application No. 10/102,892, filed on Mar. 22, 2002, now Pat. No. 6,857,233.

(60) Provisional application No. 60/277,633, filed on Mar. 22, 2001, provisional application No. 60/304,411, filed on Jul. 12, 2001.

(51) Int. Cl.
*E04H 1/00* (2006.01)
*E06B 3/96* (2006.01)
(52) U.S. Cl. ..................... 52/235; 52/204.57
(58) Field of Classification Search ............... 52/235, 52/204.57, 204.62, 582.1; 49/501, 475.1, 49/DIG. 1
See application file for complete search history.

(56) References Cited

U.S. PATENT DOCUMENTS

| | | | |
|---|---|---|---|
| 3,380,210 A | 4/1968 | Neal et al. | |
| 3,782,064 A | 1/1974 | Hubbard et al. | |
| 4,021,987 A | 5/1977 | Schnebel et al. | |
| 4,449,341 A | 5/1984 | Taglianetti et al. | |
| 4,557,089 A | 12/1985 | Breithaupt | |
| 5,309,689 A | 5/1994 | Croissant | |
| 5,355,645 A | 10/1994 | Farag | |
| 5,381,637 A | 1/1995 | Farag | |

(Continued)

FOREIGN PATENT DOCUMENTS

DE    295 18 751 U1    5/1997

OTHER PUBLICATIONS

International Search Report and Written Opinion issued on Nov. 10, 2009 for International Application No. PCT/US2009/049775 filed Jul. 7, 2009.

*Primary Examiner*—Richard E Chilcot, Jr.
*Assistant Examiner*—Andrew J Triggs
(74) *Attorney, Agent, or Firm*—Oliff & Berridge, PLC

(57) ABSTRACT

Forming a fenestration unit which may have seismic safe properties and/or fire resistance rated properties for use in buildings and other structures includes edge attaching a panel of any applicable material, in a continuous fashion, to a supporting mullion by means of a bridging element that withstands and transfers stresses to the supporting mullion. Single or multiple insert parts may be attached to the bridging element and may be integrally embedded between multiple sheets composing the panel, or attached respectively in single or multiple grooves at the edge of the panel. The panel may be composed of multiple laminated sheets. A laminating interlayer between the sheets will hold the sheets together as one sheet. The interlayer can be a liquid that may cure to a rigid material. Alternatively, the interlayer may be provided between the multiple sheets and the assembly may be heated and pressed multiple times.

22 Claims, 26 Drawing Sheets

U.S. PATENT DOCUMENTS

| | | |
|---|---|---|
| 5,481,839 A | 1/1996 | Lang et al. |
| 5,579,616 A * | 12/1996 | Farag ............................ 52/235 |
| 5,746,032 A | 5/1998 | Koike et al. |
| 5,765,332 A | 6/1998 | Landin et al. |
| 5,839,236 A | 11/1998 | Frey |
| 6,141,923 A | 11/2000 | Habicht et al. |
| 6,421,968 B2 | 7/2002 | Degelsegger |
| 6,679,013 B2 * | 1/2004 | Hornung ................... 52/204.62 |
| 6,857,233 B2 | 2/2005 | Farag |
| 6,928,776 B2 * | 8/2005 | Hornung ................... 52/204.62 |

* cited by examiner

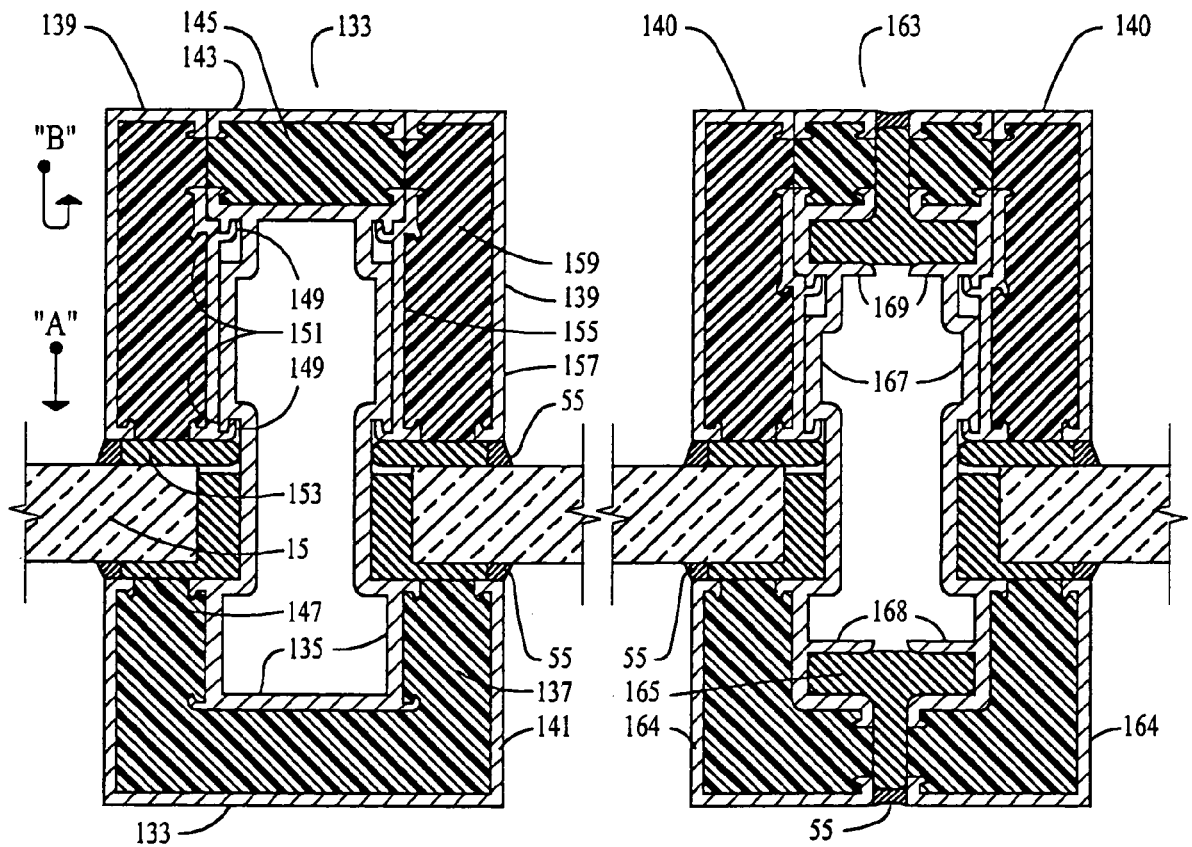
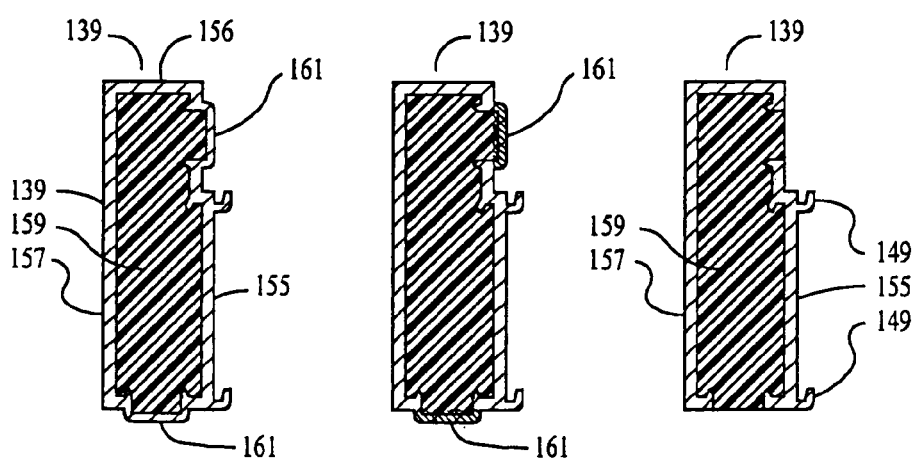

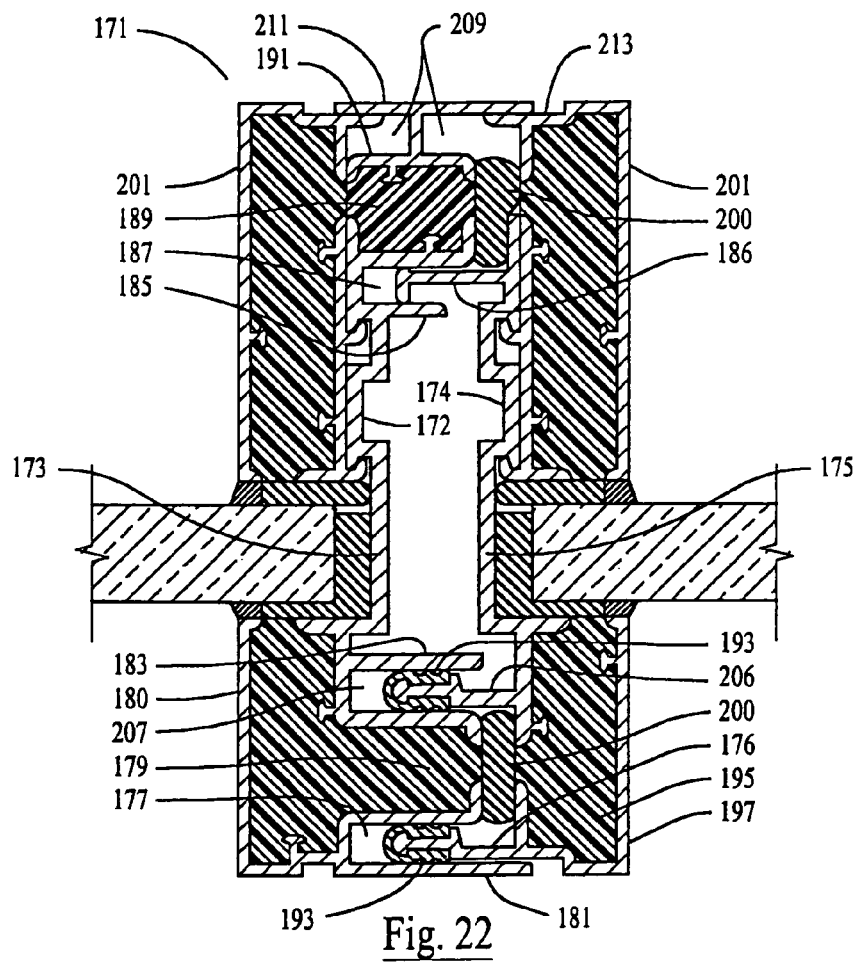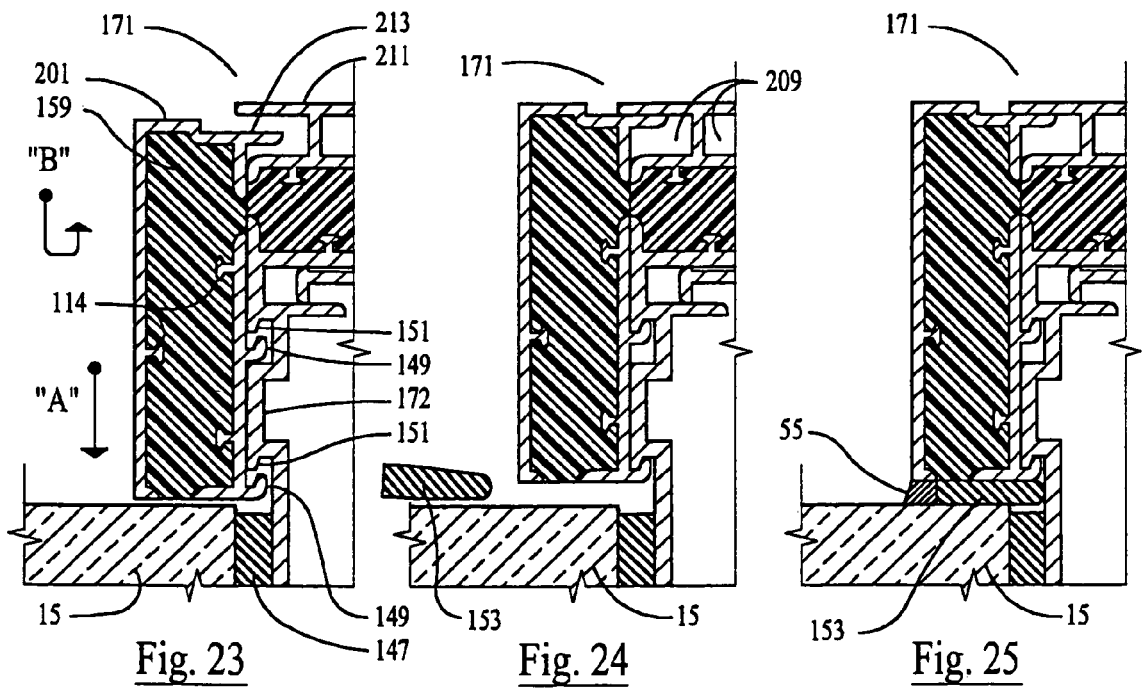
Fig. 22
Fig. 23  Fig. 24  Fig. 25

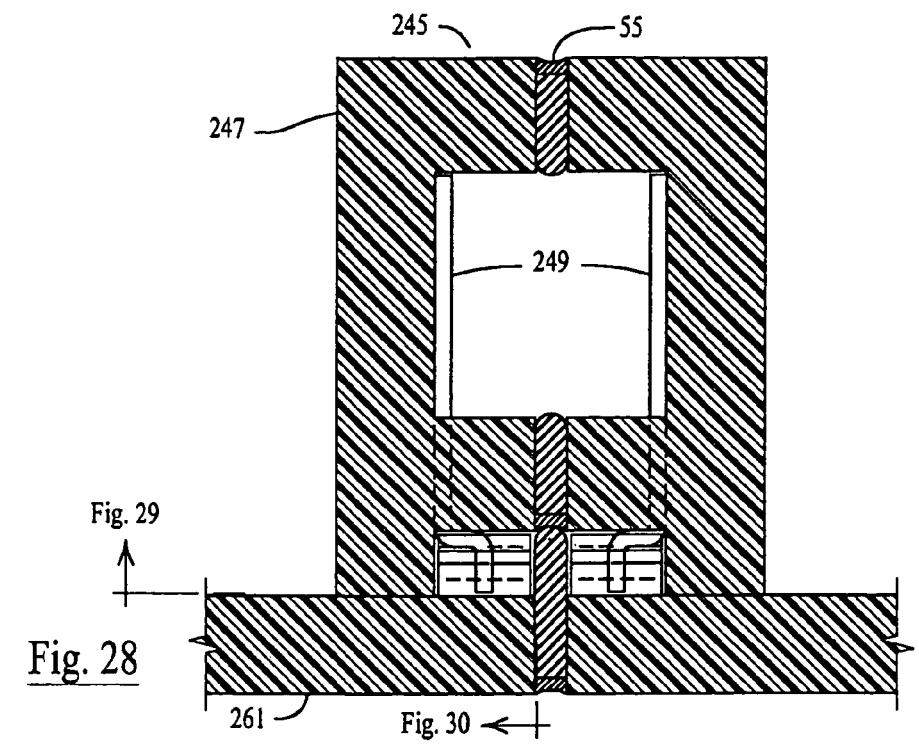
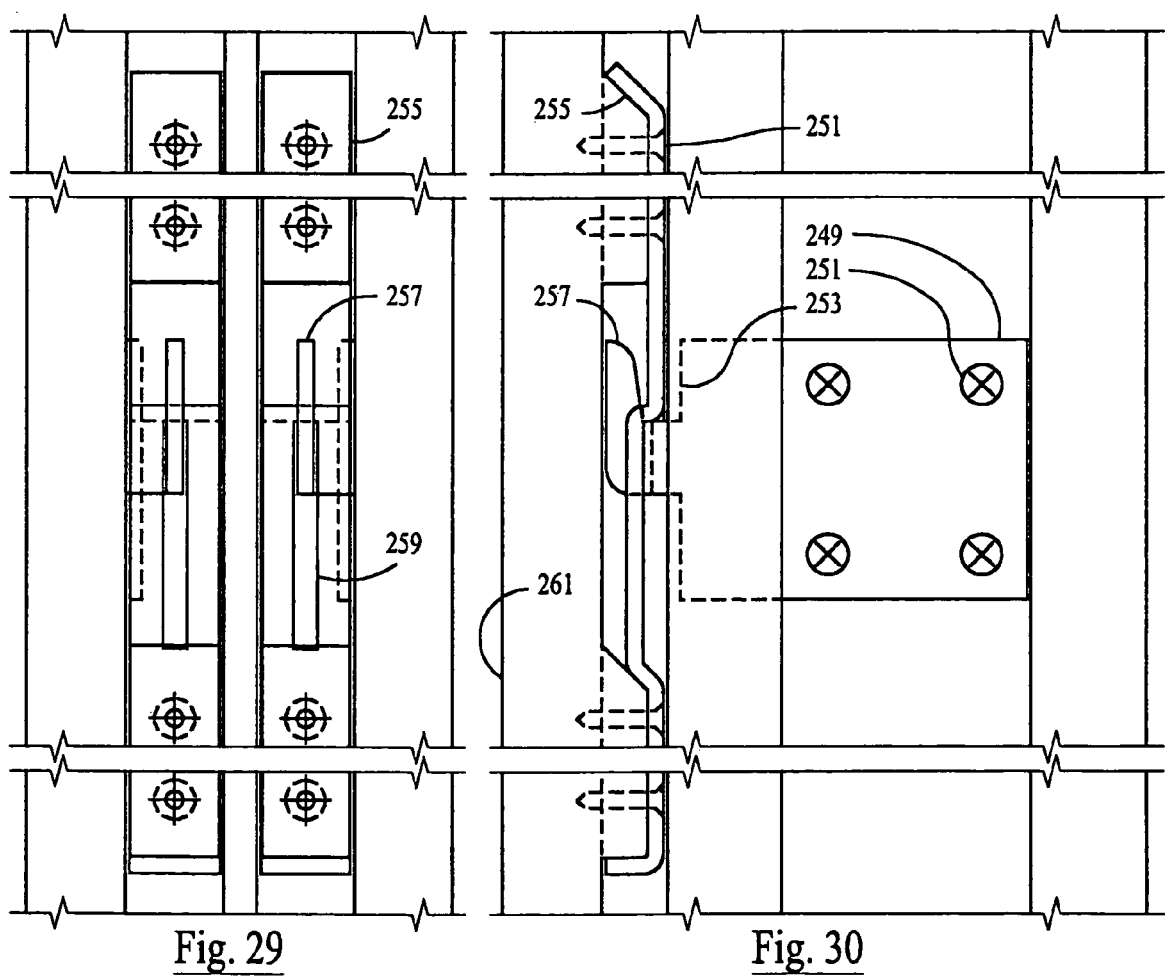

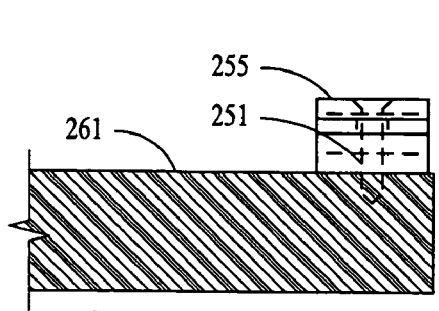
Fig. 37
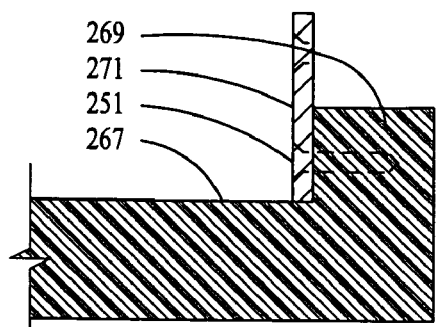
Fig. 38
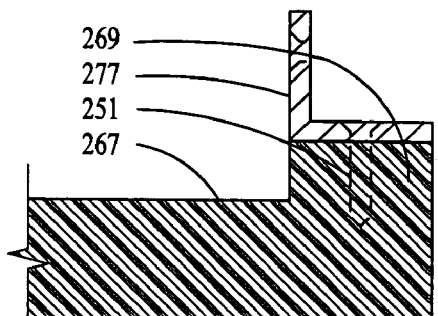
Fig. 39
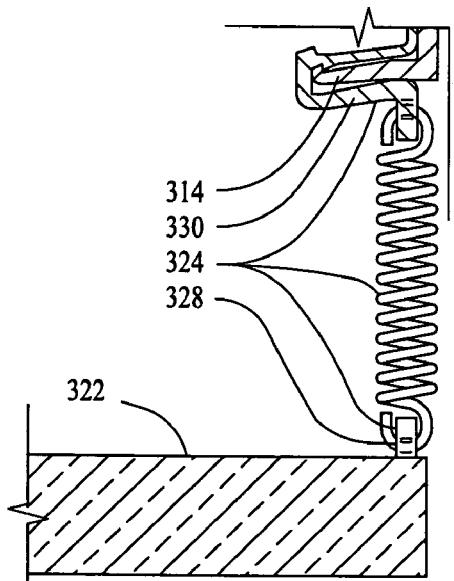
Fig. 40
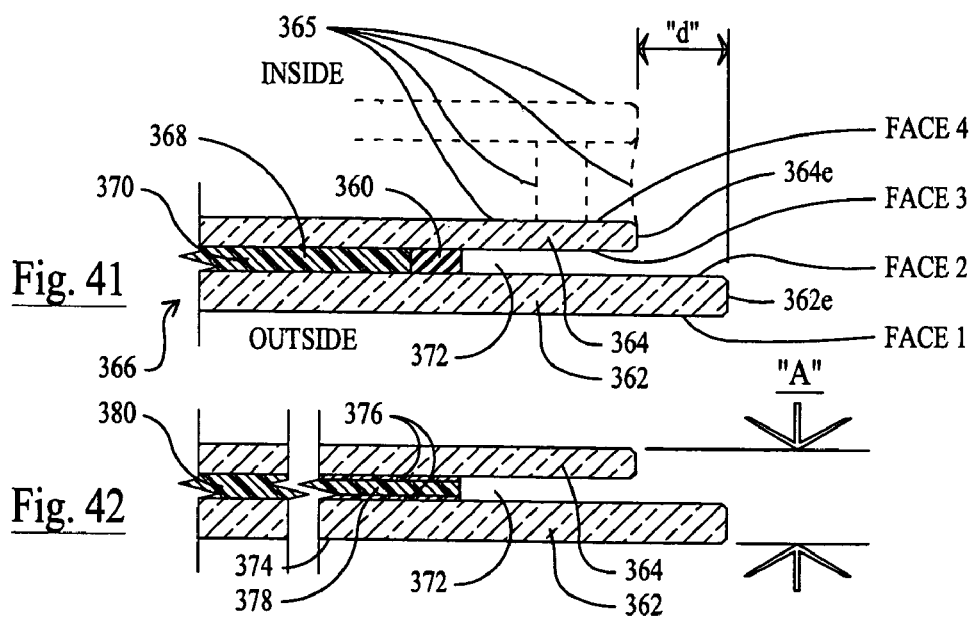
Fig. 41
Fig. 42

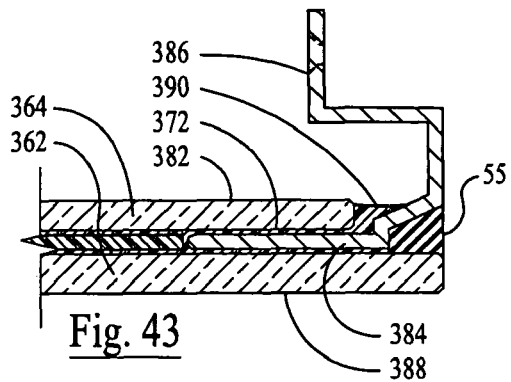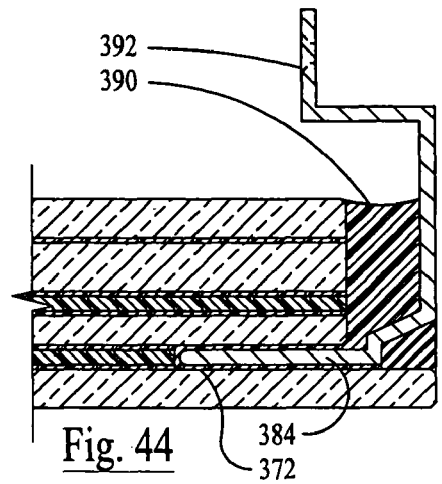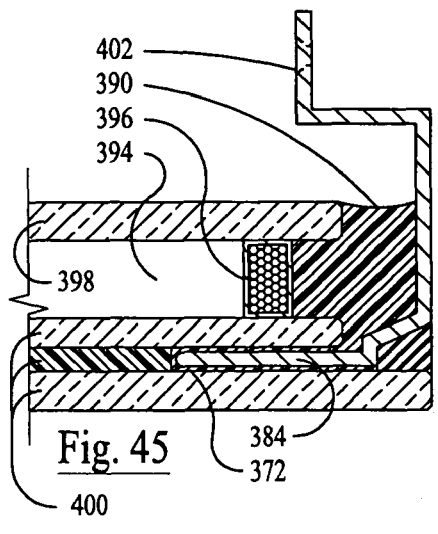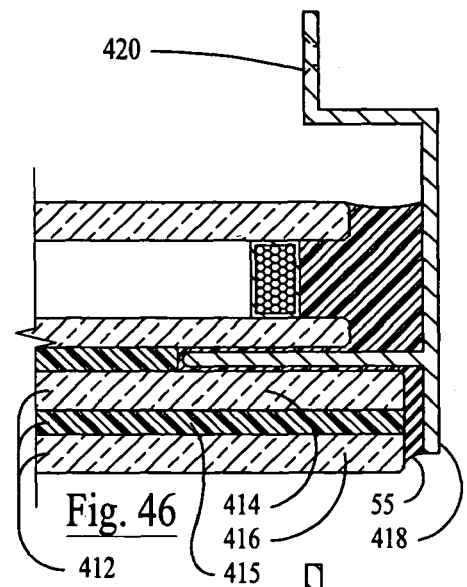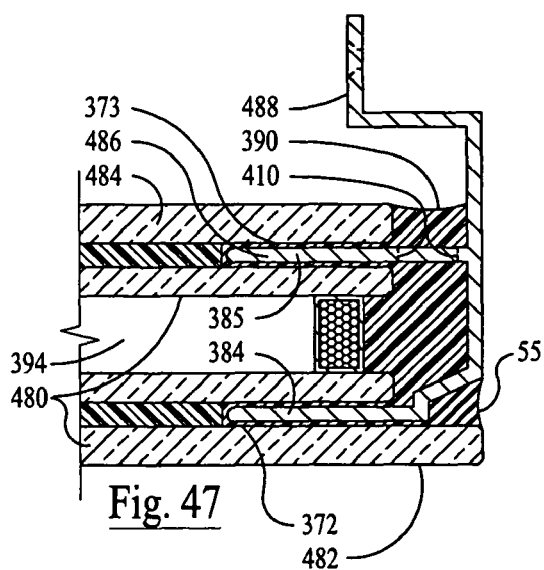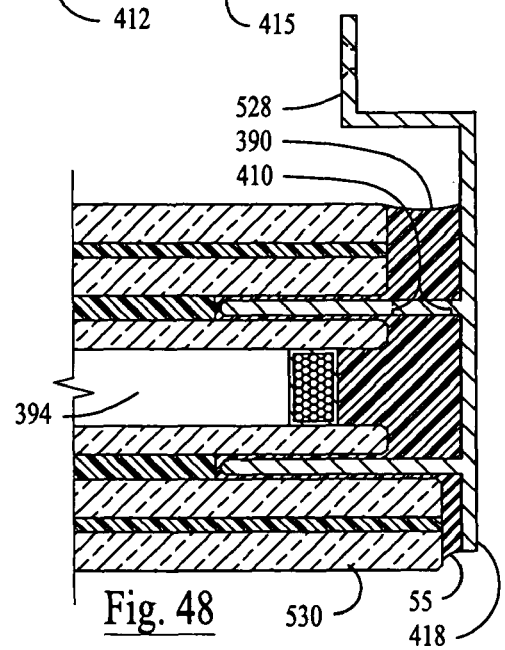

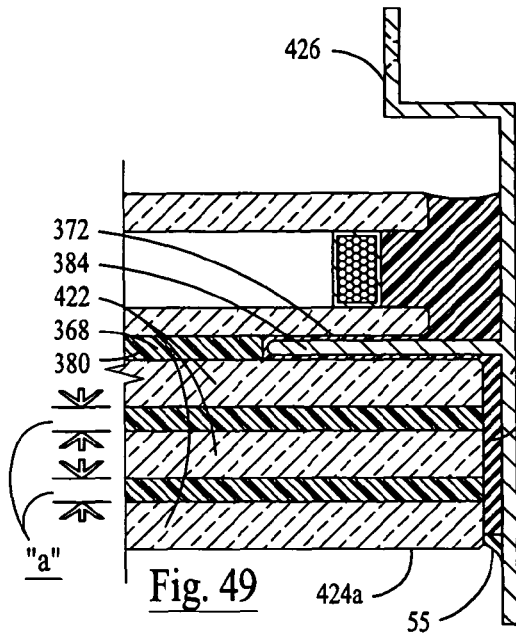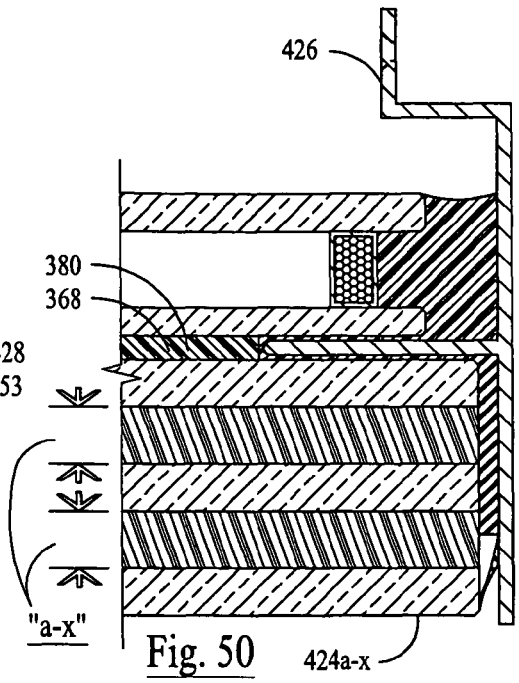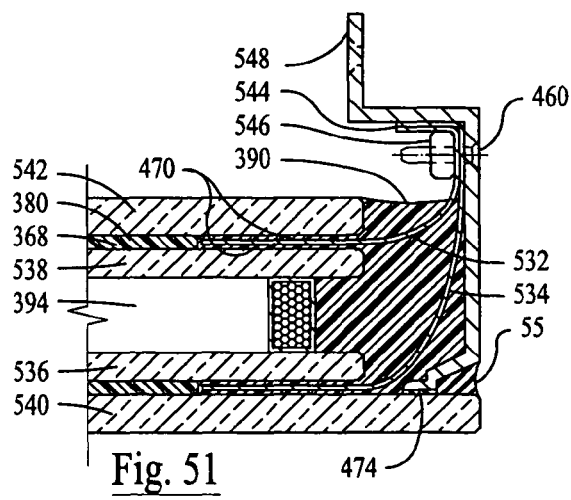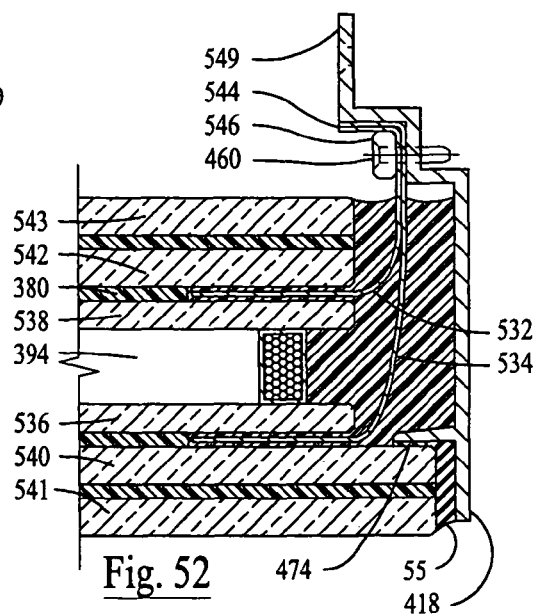

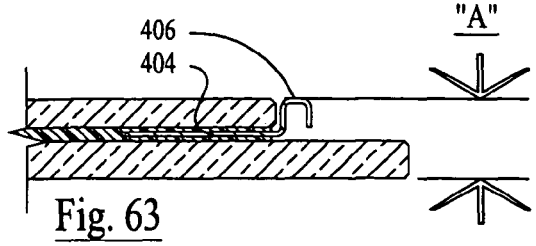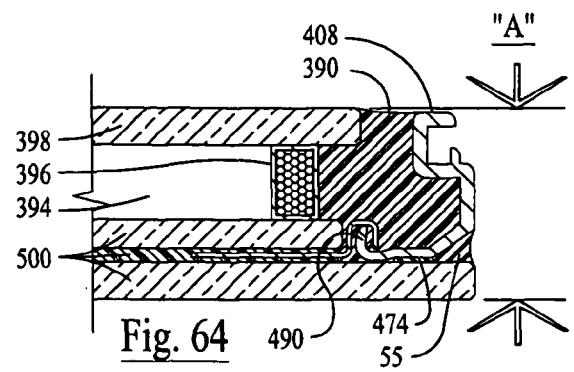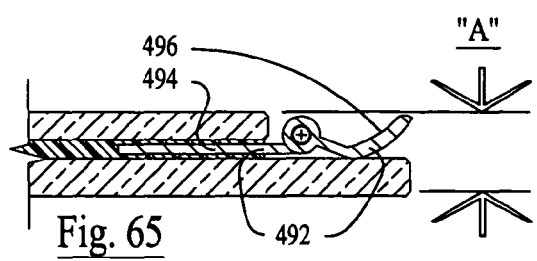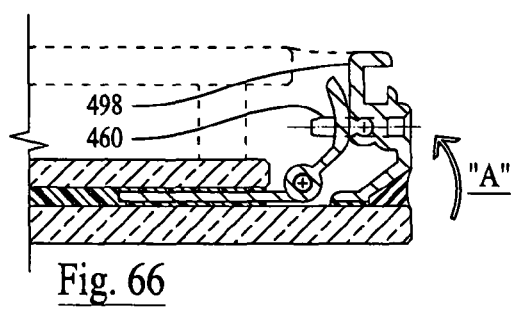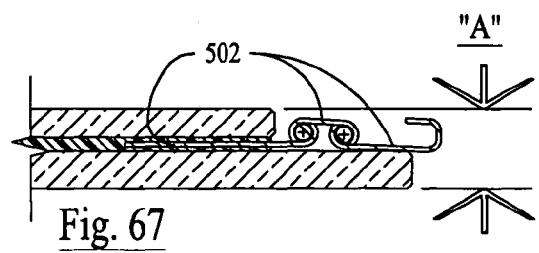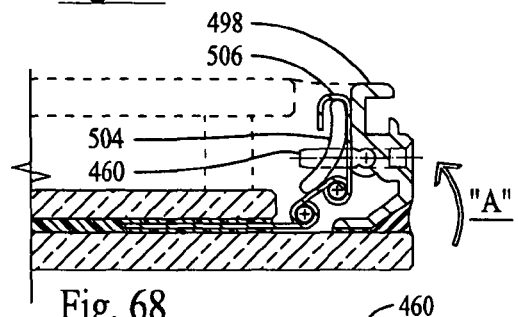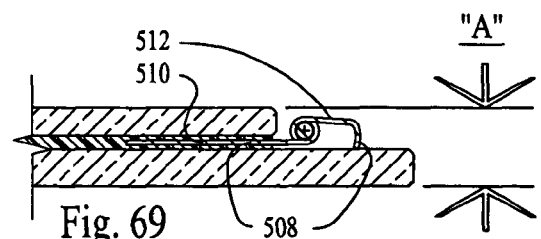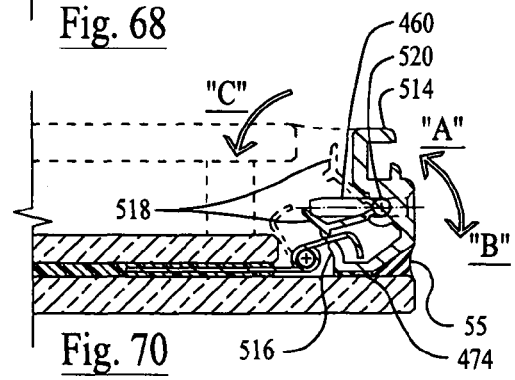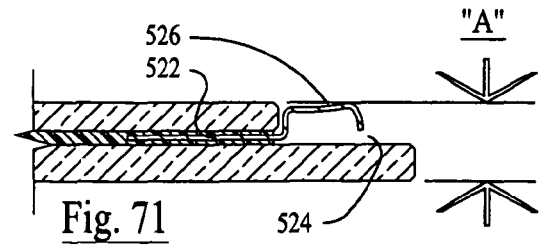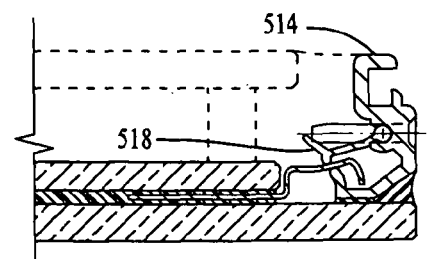

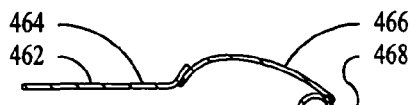
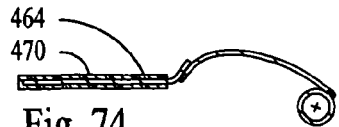
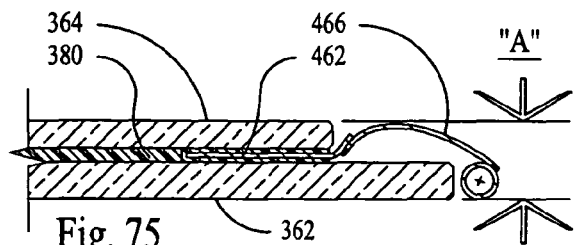
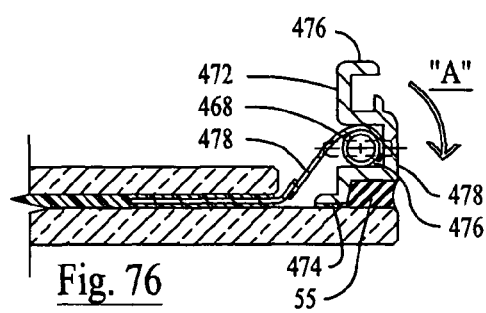
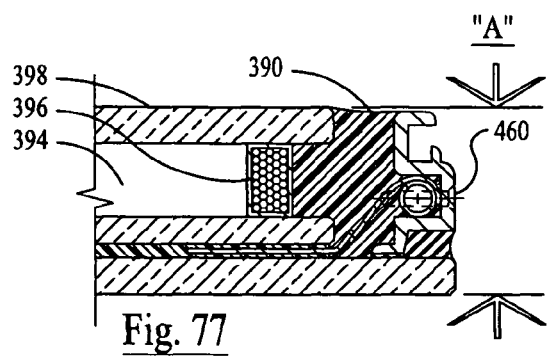
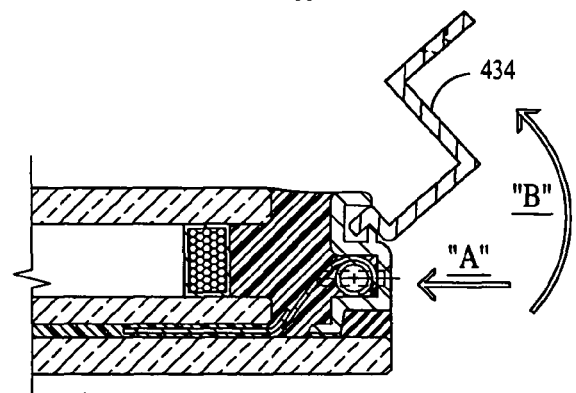
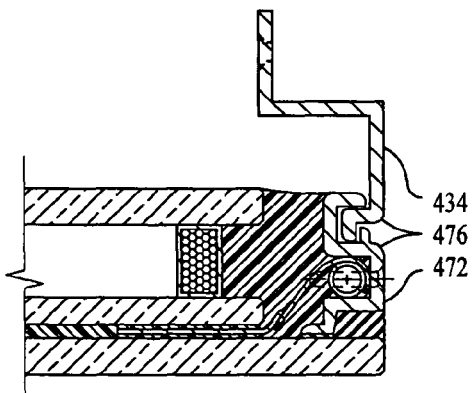
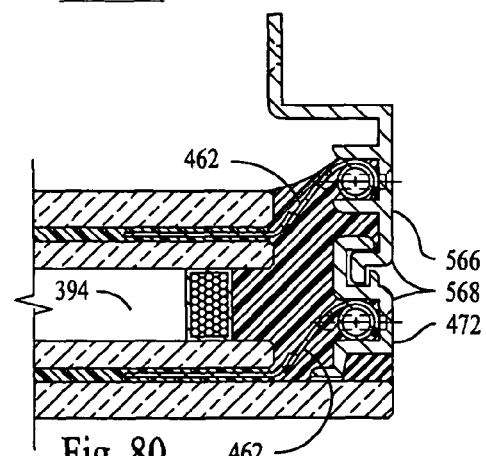
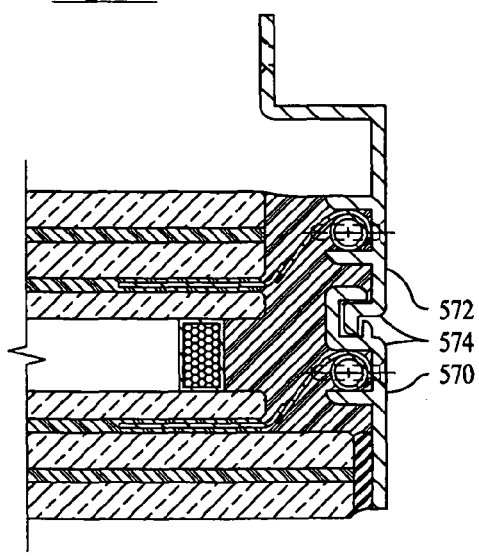

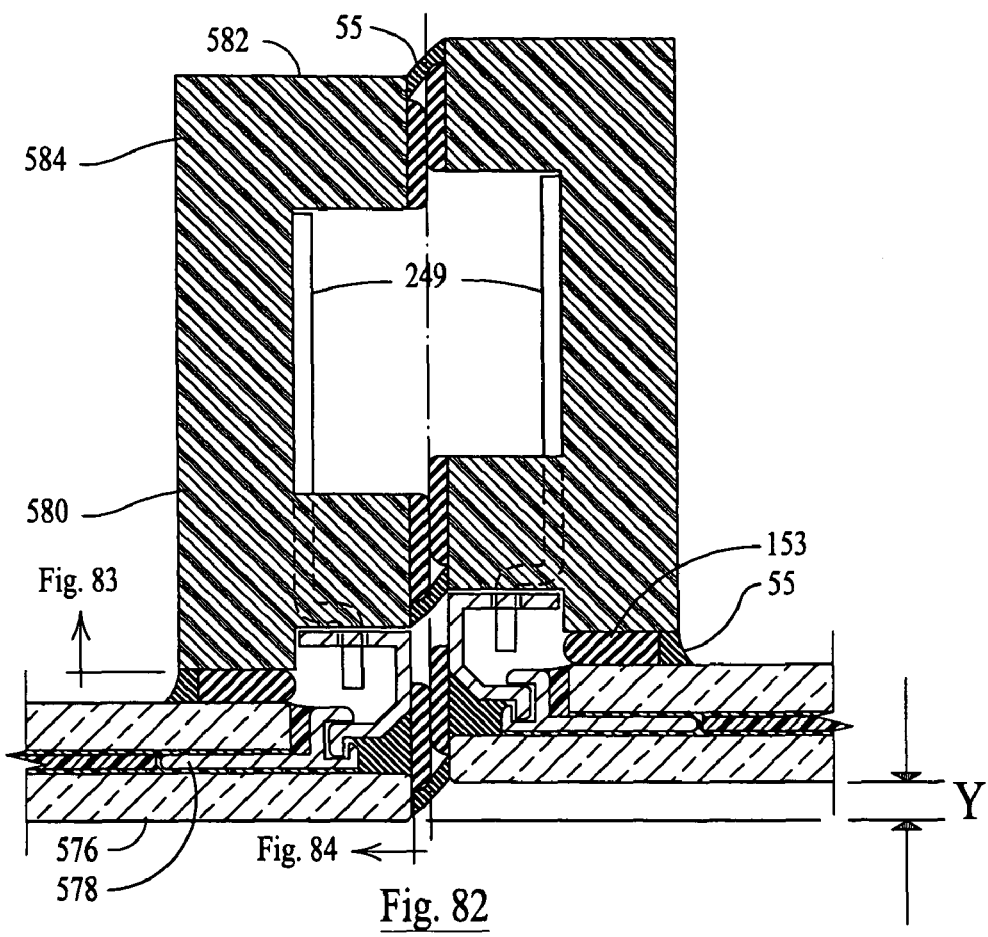
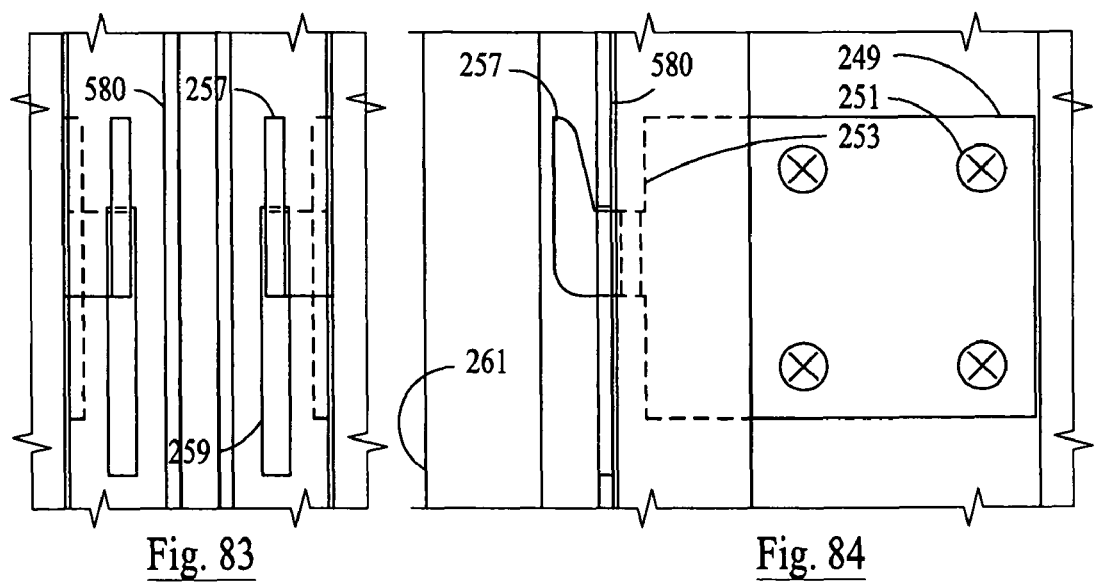
Fig. 82
Fig. 83
Fig. 84

SEISMIC SAFE AND FIRE RESISTANT RATED EDGE ATTACHED STOPLESS GLAZING

CROSS-REFERENCE TO RELATED APPLICATIONS

This application is a Continuation-in-Part of U.S. patent application Ser. No. 10/102,892 filed Mar. 22, 2002, which claims the benefit of U.S. Provisional Application No. 60/277,633 filed Mar. 22, 2001, and U.S. Provisional Application No. 60/304,411 filed Jul. 12, 2001, the disclosures each of which are herein incorporated by reference.

BACKGROUND

The exemplary embodiments relate to fire resistant stopless glazing fenestration for use in buildings and other structures, to fire resistant fenestration capable of withstanding seismic loadings, machinery for providing and a method of manufacturing panels, especially glass panels, and their attachment to mullions.

Fenestration includes windows, multiple window strips, curtain walls, store fronts, entrances, sloped glazing and the like. Fenestration includes a frame of at least one piece, which holds at least one panel, or a supporting grid frame having multiple vertical and horizontal members to hold multiple panels. The frames and panels can have an endless variety of shapes, forms and sizes. Panels may be made of glass, metal, marble, granite, composite or the like. Some types of glass and other facing panels can be provided in a fire resistant rated panel. Frames for use in curtain walls are made of metal, plastic or wood, but the currently aluminum available frames do not have any fire resistance for use in fenestration and curtain walls.

Fire in a multiple story building can be devastating. Fenestration, and in particular curtain walls, do not resist or contain fire. Rather, the fenestration is usually destroyed by fire, and flames can spread from one floor to an adjacent upper floor, from the outside of the building through the destroyed exterior skin of the curtain wall or other fenestration. Therefore, fenestration is destroyed by the fire on the floor where the fire originated and usually destroys the fenestration directly above that floor and spreads to the adjacent upper floor, and so on throughout the building.

Advances in resin composite materials technology have resulted in a new light-weight, high strength material with unique fire resistant properties. Materials such as Moldite™, manufactured by Moldite Technologies of Novi, Mich. are one such product.

U.S. Pat. Nos. 5,381,637; 5,355,654; and 5,579,616 describe curtain wall systems and panel securing systems for creating the exterior surface of a multiple story building. The disclosures of the above-identified patents are herein incorporated by reference.

SUMMARY

The exemplary embodiments relate to mechanically securing facing panel, of any material and in particular glass facing panel by its edge, in a continuous fashion, to a supporting mullion located at one side behind the panel, where the panel extends and overlaps the face of mullion. A mullion, as described herein, is a strip, component, or portion of a truss or frame at the end or at a joint dividing a panel or glass. The panel and the mullion may form a fenestration unit or a facing panel unit for use in buildings and other structures including fire resistant units, and/or units capable of withstanding seismic loadings.

Resin composite and other materials may be used in creating fire resistant fenestration. A fire resistant fenestration assembly may be created by combining the fire resistant resin composite or other material with fire resistant rated glass or other facing materials. The combined fire resistant fenestration assembly has the ability to pass fire resistance rating duration tests. The fenestration frame members and the attached panel or glass may be made in different thickness and shapes to meet different fire resistant duration ratings criteria.

The exemplary embodiments include various fire resistant rated fenestration and curtain wall systems, where the fire resistant rating may be determined according to a variety of formal test procedures. Testing is usually performed on completed assemblies. The thickness of the barriers and panels may be adjusted to provide the required exposure time durations for different fire resistance ratings.

In various exemplary embodiments, fire resistant barriers may form a full mullion shell, and have the proper amount of coverage for the edge of a glass or panel. In other exemplary embodiments, a barrier may also be used as a fill between two shells, where the outer exposed shell can be affected by fire and may be damaged. Still in other exemplary embodiments, the inner structural shell may also have fire barrier material around it. The two shells may be extruded as one extrusion and after being filled with barrier material they may be separated and thermally broken into two separate shells.

The fire rated fenestration and curtain wall designs of the exemplary embodiments may also be provided with special seismic safe features for seismic zones. In these exemplary embodiments, the panels and glass are attached by means that allow them to nearly remain in place when the building sways sideways and also engages in a twisting movement. When this occurs, the perpendicular angularity of the frames may be deformed while the panels are not deformed. In these exemplary embodiments, the centerline of the mullion may travel past the center of the joint between the panels.

The panel units may also have special features suited for seismic safety in earthquake zones, where the panel and the frame mullion are assembled as one rigid independent unit secured to the building at three points. Each unit having the top mullion attached to the top floor slab structure at two points and the bottom mullion attached to the bottom slab at one point. Adjacent unit frame mullions may be two symmetrical independent halves, and free to move in a parallel direction of in-out and up-down, such that the units may stay angular and flat during all expected moves. The three point attachment may keep the face of top mullion parallel to the face of top slab, and may allow all sides of frame mullions to move or project in relation to adjacent units. The panel units may follow the sway and twist of the upper slab as independent separated rigid units.

In various exemplary embodiments, the mullions may be exposed. In other exemplary embodiments, monolithic stopless facing panel curtain walls where mullion members are not exposed from the exterior side may also be used. Facing panels may be manufactured of glass or any other material of uniform or composite construction, with one or multiple layers.

BRIEF DESCRIPTION OF THE DRAWINGS

Various exemplary embodiments of the invention will be described with reference to the accompanied drawings, in which like elements are labeled with like numbers, and in which:

FIGS. 17, 18, 22, 26, 27, 28, 31, and 32 are horizontal cross sectional detail views of different alternative mullions of a curtain wall as shown in FIG. 4;

FIGS. 19-21 are horizontal cross sectional detail views of the design, and the steps to provide a double shell retainer for providing a thermal break for all double shell components and of the mullion assembly as shown in FIG. 17;

FIGS. 23-25 are horizontal cross sectional detail views of the installation steps of the retainer for installing the facing panel or glass as shown in FIG. 22;

FIG. 28 is a horizontal cross sectional detail view of mullion alternative of stopless curtain wall, partitions, and sloped roof or glazing;

FIGS. 29 and 30 illustrate vertical front and side views for an attachment method of a panel to a mullion, shown in FIG. 28;

FIGS. 31 and 32 are horizontal cross sectional detail views of mullion alternatives of stopless curtain wall, partitions, and sloped roof or glazing;

FIG. 37 is a cross-sectional view of the vertical facing panel, or glass panel, which is part of the embodiment illustrated in FIG. 28;

FIG. 38 is a cross sectional view of the vertical facing panel with an angled integral return of single or multiple pieces, which is part of the embodiment illustrated in FIG. 31;

FIG. 39 is a cross sectional view of the vertical facing panel with an integral return, and anchor angle integrally formed as part of the facing panel of the embodiment illustrated in FIG. 31;

FIG. 40 is a cross sectional view of the vertical facing glass panel attached to a mullion with an elastic element integrally attached as part of the facing panel of the embodiment illustrated in FIG. 33;

FIG. 41 is a cross sectional view illustrating a pour-in method for providing a pre-formed groove for embedding an attaching insert part of a bridging element inside an edge of a panel;

FIG. 42 is a cross sectional view illustrating a heat and pressure method for providing a pre-formed groove for embedding an attaching insert part of a bridging element inside an edge of a panel;

FIG. 43 is a cross sectional view of a laminated glass facing panel unit composed of two sheets of glass, integrally assembled with a bridging element which has an insert segment embedded inside a preformed groove at an edge of a panel;

FIG. 44 is a cross sectional view similar to FIG. 43, of a laminated glass facing panel unit composed of multiple sheets of glass, one sheet at the outer side of an insert segment of a bridging element, and multiple laminated sheets at an inner side;

FIG. 45 is a cross sectional view similar to FIG. 43, of a laminated insulating glass unit with single inner sheet of glass, and air space, and an outer laminated sheet of glass composed of two sheets and integrally attached to a bridging element;

FIG. 46 is a cross sectional view similar to FIG. 45, of a laminated insulating glass unit with a single inner sheet of glass, and air space, and an outer sheet of glass composed of at least three sheets of glass, and a bridging element with multiple sheets of glass at an outer side of an insert segment;

FIG. 47 is a cross sectional view similar to FIG. 45, of a laminated insulating glass unit attached to multiple insert parts of a bridging element, and air space between two laminated sheets of glass, where each laminated sheet has at least two sheets of glass, and has an insert part;

FIG. 48 is a cross sectional view similar to FIG. 47, of an insulating glass unit with an attached bridging element with multiple insert parts, and an air space between two laminated sheets of glass, where each laminated sheet is composed of at least three sheets of glass with an insert part, and multiple sheets of glass at an outer side of an outer insert part;

FIG. 49 is a cross sectional view similar to FIG. 45, of an insulating glass unit with a single inner sheet of glass, and air space, and an outer sheet of laminated glass integrally attaching a bridging element with the insert part embedded at a conventional interlayer, and multiple glass sheets at an outer side of an insert part laminated with special multi-intumescent interlayers;

FIG. 50 illustrates the same embodiment of FIG. 49, with an intumescent interlayer material after it is activated and expanded by exposure to fire, where it will expand to thicker interlayers of a thermal insulation property;

FIG. 51 is a cross sectional view similar to FIG. 47, of a laminated insulating glass unit with an attached bridging element, and air space between two laminated sheets of glass, where each laminated sheet has a flexible insert part, the flexible insert part suited for a pre-formed groove or suited for being embedded during a heat and pressure laminating method;

FIG. 52 is a cross sectional view similar to FIG. 51, of a laminated insulating glass unit with an attached bridging element, and air space between two laminated sheets of glass, where each laminated sheet is composed of at least three sheets of glass, and has a flexible insert part, with multiple sheets of glass at an outer side of an outer flexible insert part, a flexible insert part suited for a pre-formed groove or suited for being embedded during a heat and pressure laminating method;

FIG. 63 is a cross sectional view of a laminated glass panel with insert part suited to allow using rollers, while embedding an insert part in a process of heat and pressure for laminating multiple sheets of glass;

FIG. 64 is a cross sectional view of a laminated insulating glass panel using the laminated glass panel shown in FIG. 63, with an assembled panel edge part of a bridging element, and illustrating the pressing together with air space to form the insulating glass unit;

FIG. 65 is a cross sectional view of a laminated glass panel with an alternative hinge insert part composed of two hinged segments, suited to allow using rollers while embedding the insert part in the same process of heat and pressure for laminating multiple sheets of glass;

FIG. 66 is a cross sectional view of a laminated glass panel shown in FIG. 65, with an assembled panel edge part of a bridging element shown attaching a hinge segment of an insert part, and illustrating pressing with air space to form an insulating glass unit;

FIG. 67 is a cross sectional view illustrating a laminated glass panel with an insert part similar to FIGS. 65 and 66, and illustrating an alternative double hinge insert part composed of three hinged segments, suited to allow using rollers, while embedding the insert part in the same process of heat and pressure for laminating multiple sheets of glass;

FIG. 68 is a cross sectional view of the laminated glass panel shown in FIG. 67, with an assembled panel edge part of a bridging element attaching a hinge segment of an insert part, and an assembly ready to be pressed together with air space to form an insulating glass unit;

FIG. 69 is a cross sectional view of a laminated glass panel with an insert part similar to FIGS. 65 through 68, and an alternative hinge insert part composed of two hinged segments, suited to allow using rollers, while embedding the insert part in a same process of heat and pressure used for laminating multiple sheets of glass;

FIG. 70 is a cross sectional view of the laminated glass panel shown in FIG. 69, with an assembled panel edge part of a bridging element shown attaching an angle hinge segment of an insert part, where the angle segment is locked using a rotating angle lock with the assembled panel edge part of the bridging element, and the assembly is ready to be pressed together with air space to form an insulating glass unit;

FIG. 71 is a cross sectional view of a laminated glass panel with an alternative insert part similar to FIGS. 63 through 70, suited to allow using rollers, while embedding an insert part in a same process of heat and pressure used for laminating multiple sheets of glass;

FIG. 72 is a cross sectional view of the laminated glass panel shown in FIG. 71, with an assembled panel edge part of a bridging element shown attaching a bent segment of an insert part, where an angle segment is locked using a rotating angle lock with the assembled panel edge part of the bridging element, and the assembly is ready to be pressed together with air space to form an insulating glass unit;

FIG. 73 is a cross sectional view of an exemplary embodiment insert part composed of three segments, and similar to the exemplary embodiments shown in FIGS. 63 through 72;

FIG. 74 illustrates the insert part in the exemplary embodiment shown in FIG. 73 with the possibility of pre-applying an interlayer material on an inserted segment with an adjusted thickness equivalent to an adjacent laminating interlayer between the two sheets of glass;

FIG. 75 is a cross sectional view of a laminated glass panel with the insert part shown in FIGS. 73 and 74 suited to allow using rollers, while embedding the insert segment in a same process of heat and pressure used for laminating multiple sheets of glass;

FIG. 76 illustrates the exemplary embodiments shown in FIGS. 73 through 75 attached to a panel edge part of a bridging element;

FIG. 77 illustrates the exemplary embodiments shown in FIGS. 73 through 76 attached to a panel edge part of a bridging element and having an inner sheet of glass pressed together with air space to form an insulating glass unit;

FIG. 78 illustrates the same exemplary embodiment of FIG. 77, and illustrates a method for attaching the mullion part of a bridging element;

FIG. 79 illustrates the same exemplary embodiment of FIG. 78 and illustrates a laminated insulating glass unit with an assembled panel edge part and a mullion part, which compose a bridging element;

FIG. 80 is a cross sectional view similar to FIG. 51, of a laminated insulating glass unit with an attached bridging element, and air space between the two laminated sheets of glass, where each laminated sheet has an insert part similar to FIGS. 73 through 79, suited for a pre-formed groove or to be embedded during a heat and pressure laminating method, and a bridging element composed of two parts, each part attached to an insert part;

FIG. 81 is a cross sectional view similar to FIG. 52, of a laminated insulating glass unit with an attached bridging element, and an air space between the two laminated sheets of glass, where each laminated sheet is composed of at least three sheets of glass, and has an insert part similar to FIGS. 73 through 80, suited for a pre-formed groove or to be embedded during a heat and pressure laminating method, and a bridging element composed of two parts, each part attached to an insert part, with multiple sheets of glass at an outer side of an outer insert part;

FIG. 82 is a horizontal cross sectional view of a fire resistance rated laminated glass panel unit, with a unitized split mullion similar to FIG. 28, and a mullion composed of two symmetrical halves of a solid fire barrier, and demonstrates an expected move of adjacent panel units caused by earthquakes;

FIGS. 83 and 84 illustrate vertical front and side views for an attachment method of a panel to the mullion shown in FIG. 82;

DETAILED DESCRIPTION OF THE EMBODIMENTS

Figure 1:
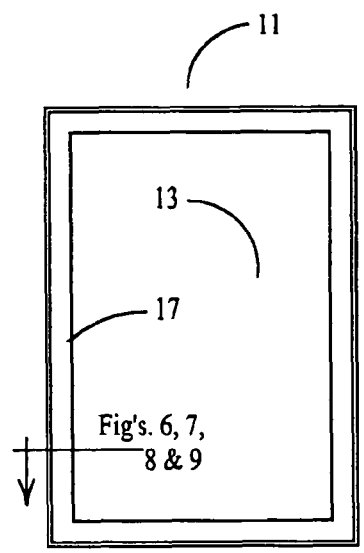
FIG. 1 is a front view of a window.

FIG. 1 through FIG. 36 illustrate views and details of windows, strip windows, store fronts, entrances, including fixed or operable windows, single doors or double door entrances, curtain walls, partitions and sloped roof or glazing that are referred to herein as "fenestration". The exemplary embodiments of fenestration may be used as a fire barrier with fire resistance rating, and as presented herein. The exemplary embodiments of fenestration described herein possess the added function of containing fire and smoke (if and when it occurs) to the floor, room, or to the side of the fenestration where the fire originated, and to keep it on that side until all personnel at both sides of the barrier should be safely evacuated within a designated time.

It should be noted that the various exemplary embodiments of fenestration presented herein may have any possible configuration and be of single or multiple panels in any shape. The single or multiple panels may have intermediate dividing single or multiple mullions in any position, in a modular or non-modular arrangement. They may also have the face plane of the facing panels at the same plane or in multiple face planes, in a regular or irregular fashion in any arrangement, with an endless variety of shape, form, size, or combination.

The fire barrier may be made of one monolithic material, composed of fire barrier, fire retardant, heat insulation, non-combustible and like materials, and it may be made of one or multiple materials in a mixture in substance or as layers. Assemblies, sections, and components made of one monolithic fire barrier material can be redesigned and reformed in layers, or with a parameter shell made of multiple materials, or a single material for a casting shell. These assemblies sections and components may also be made of a double shell, with an inner core structural shell and an outer exposed shell with a space in between the two shells as the casting form for the housing of the fire barrier material. Assemblies, sections, and components shown with a single or multiple shell, part, or portion made of different material, can be redesigned and reformed in one monolithic section of fire barrier.

The material illustrated and used herein as a fire barrier material is preferably made of Moldite™, by Moldite Technologies, which is based on a new proprietary high-tech composite material. Other materials like mineral fiber or like kinds of fire proofing, fire retarding or non-combustible materials approved by codes for such use may be used.

Fire barrier mullions, mullion walls, barrier filled cavities between mullion shells, and facing panels may be furnished in different thicknesses for each particular element. Material of the assembly may be suited such that the whole assembly may withstand a fire without structural failure. The assembly may also withstand a fire for a time duration required for each particular time rating test, and in accordance with a particular fire rating test protocol and procedures.

The components of fire resistant rated fenestration presented in various exemplary embodiments can be used as a whole, or in part, and in combination with non-fire rated mullions, frames or panels, or the like for decorative and other architectural non-fire rating uses. The frame members and mullions presented herein may be used for structural functions to the exceptional high stiffness-to-weight ratio of the Moldite material. Facing panels may be of any type, thickness, or material of uniform or composite construction, such that the whole assembly of the panel may have a designated fire resistance rating. This may be accomplished while having the exposed layer or finish in decorative, natural or man made material, in any type of finish. Fire rated glass panels are available in different thickness and construction for each designated rating. Panels are shown engaging the mullions in a central location for a clearer explanation of the concept of the exemplary embodiments, but the presented embodiments may be designed such that panels can be in a non-central location in relation to mullions.

If the components of a fenestration do not have the same rating, it is expected that completed, assembled and tested fenestration will have an overall rating equivalent to that of the least rating of its individual components. Barrier cover is defined as the depth of engagement of the facing panel inside the mullion wall cavity, and it is also considered the size of barrier coverage for the edge of the panel. Glazing and installation methods of the different panels and the materials used are to be closely coordinated with panel manufacturers in accordance with their recommendations and future tests.

The shape of the mullions and components shown in cross sectional detail views may be in the form of decorative moldings, fillets, ornament-like outlines and corners without loosing the rated barrier characteristics. The mullions of the exemplary embodiments are illustrated in simple outlines for briefness. The size of the mullions and components shown as solid pieces may be formed as larger pieces of the same configuration but with cavities and multiple walls. It is expected that testing will show that the summation of these multiple wall thicknesses may be equal to the relative solid thickness, as known in the architectural trade as the "equivalent solid thickness", which is used in the rating of cement block units.

The finish of the surface of the mullion and all the components shown without a parameter shell to contain the fire barrier material presented herein may be cast, molded, carved out of blocks, machine shaped, extruded, or pulltruded. The components may be left with a natural mill finish, be finished all around, or only at the exposed surfaces. These components may also be finished with cold applied finish coats like special primer and paint, vinyl, plastic laminate, or cladded with metal sheets or the like. Hot finish applications may include baked enamel, or spray with molten metal or ceramic frit or the like.

FIG. 1 is a front view of window 11. The window 11 consists of one fire resistant rated fixed panel portion 13. The panel portion 13 of this embodiment may be a glass panel. The window 11 has a frame 17 of at least one piece. The frame 17 may be made in one piece or multiple pieces. The panel 13 is installed in window frame 17.

Figure 2:
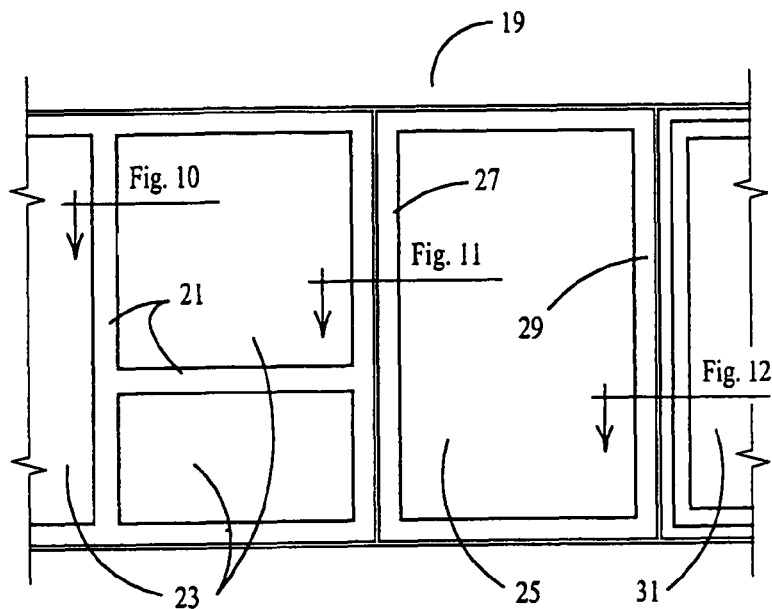
FIG. 2 is a front view of a partial strip window, store front, and an entrance with multiple windows including operable windows.

FIG. 2 illustrates a partial strip window 19, also known as a ribbon window. The partial strip window 19 could be utilized as a store front, or entrance. The partial strip window 19 is divided vertically and horizontally with intermediate mullions 21 to have multiple panels 23. The multiple panels 23 (also referred to herein as window 23) may be in any arrangement, and either be fixed or operable sash. They may also be uniform or in any combination. Strip window 19 consists of multiple window units installed against each other. Intermediate mullion 27 between windows 23 and window 25 is a two-piece split mullion, where the two frames of the adjacent windows meet. Intermediate mullion 29 is between window 25 and window 31. In this embodiment, window 31 is an operable sash type window.

Figure 3:
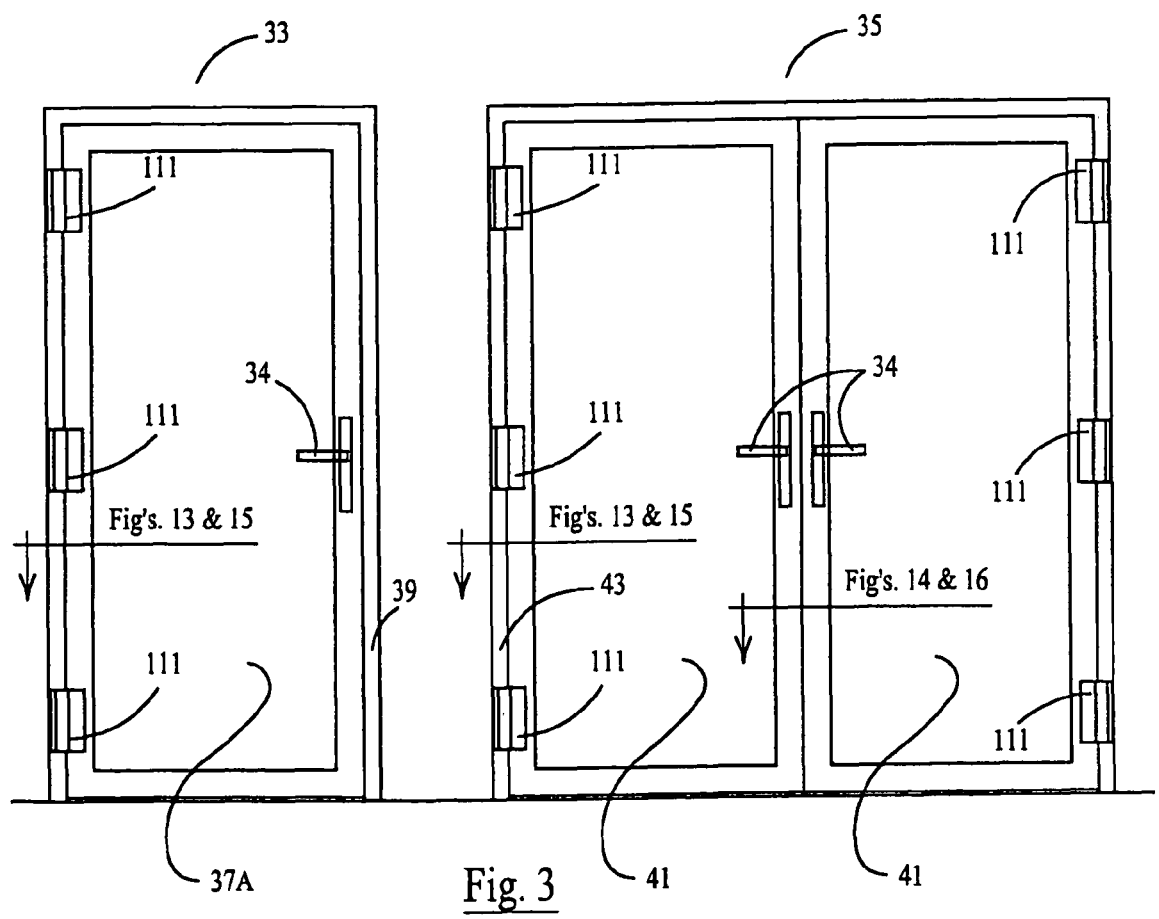
FIG. 3 is a front view of single and double door entrances.

FIG. 3 illustrates a single doorway 33 and a double doorway 35. Single doorway 33 consists of one door 37A and frame 39. Door 35 consists of two doors 41 and frame 43. The doors 37A and 41 are rotatably secured to the frames 39 and 43, respectively, by hinges 111 and may be opened via handles 34.

Figure 4:
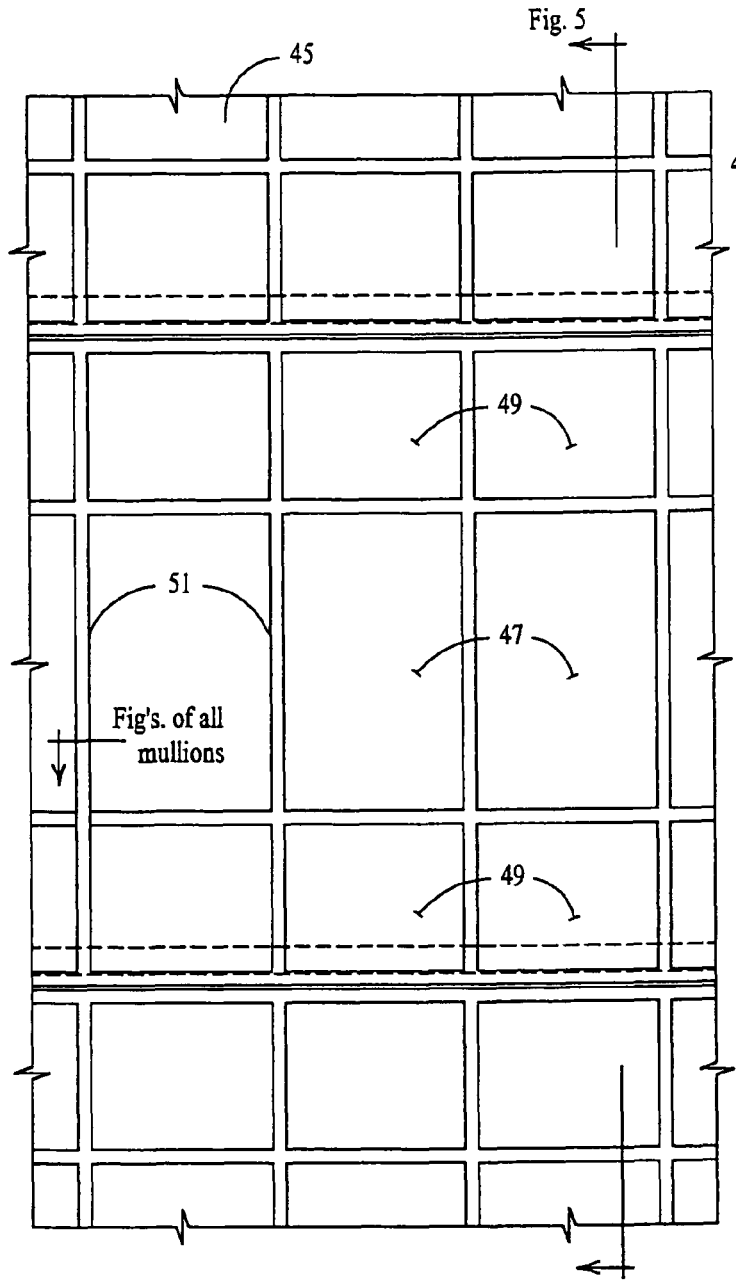
FIG. 4 is a front view of a partial curtain wall facade.
Figures 10, 11:
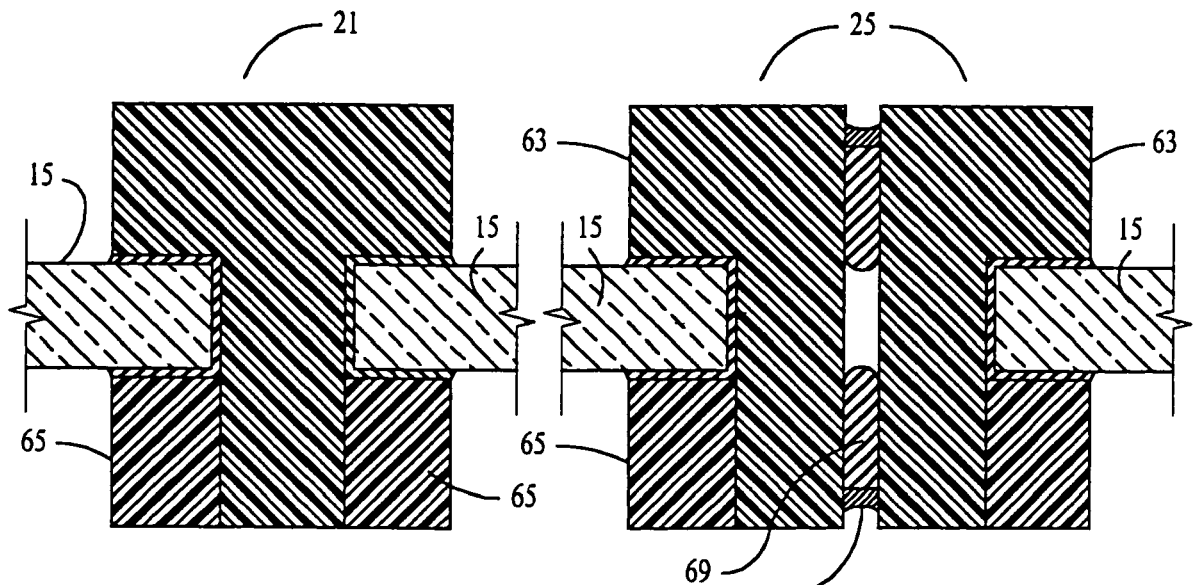
FIGS. 10 through FIG. 12 are horizontal cross sectional detail views of different intermediate mullion alternatives of the partial strip window, store front, and entrance, with multiple windows and operable windows as shown in FIG. 2.

FIG. 4 illustrates a partial curtain wall 45 of a building facade consisting of vision panels 47, and non-vision panels 49 at a spandrel area where beams, columns, slabs, ventilation ducts (not shown) above a suspended ceiling and convector enclosures (not shown) at floor level may be located. Mullions 51 are supporting the facing panels and transmitting the loads to the building structure. The mullions 51 may be intermediate mullions as shown in FIGS. 10, 11 and 17. The mullions 51 may be used as components in different combinations to make up various designs. The mullions 51 illustrated in FIG. 4 may be the two piece split mullion shown in FIGS. 12, 18, 22, 26, 27, 28, 31, 32 and 33, or of a design with a different combination of components from these mullions.

Figure 5:
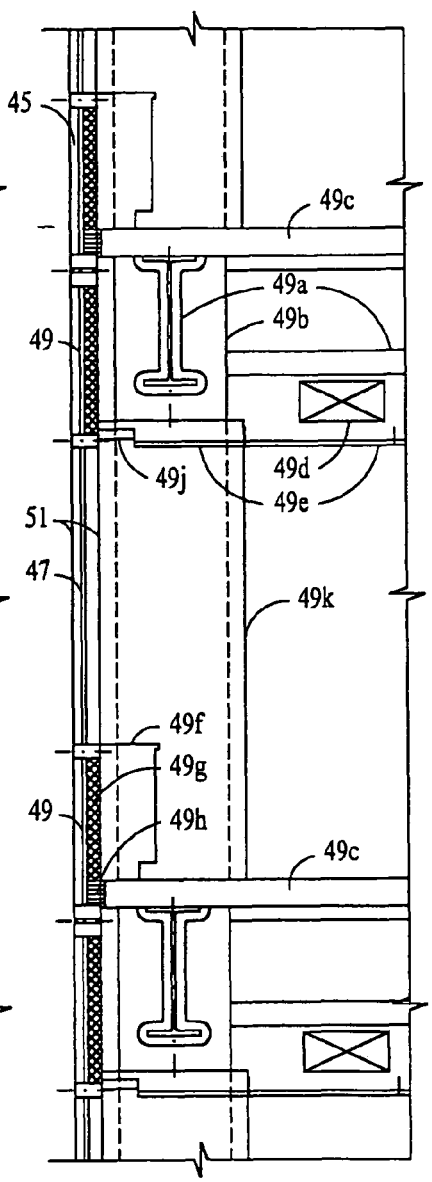
FIG. 5 is a vertical cross sectional view of a curtain wall façade as shown in FIG. 4.

FIG. 5 is a vertical cross section to the curtain wall partial building facade of FIG. 4. FIG. 5 illustrates the self supported curtain wall 45 as the exterior wall enclosing the floor space, and the mullions 51 are shown with a vision panel 47 at the floor area where the exposed portion of a column at the floor area has a decorative cover 49k. Non-vision panels 49 are located at the spandrel area for hiding the sight of beams 49a and column 49b which are shown with a coat of fire proofing spray. A concrete slab 49c and ventilation ducts 49b are above a suspended ceiling 49e. The suspended ceiling 49e may consist of acoustic tiles in a grid, the light fixtures, and the air diffusers of the heating, ventilation and air conditioning systems. Convector enclosure 49f adjacent to the curtain wall is preferably used for parameter heating. Thermal insulation panels 49g are integrally installed as backing behind non-vision panels in the curtain wall for energy conservation. A fire stop 49h may block the spread of fire between floors, and has the same fire resistance rating of the floor assembly. Venetian blinds or curtains may be installed in a curtain pocket 49j.

Figure 6:
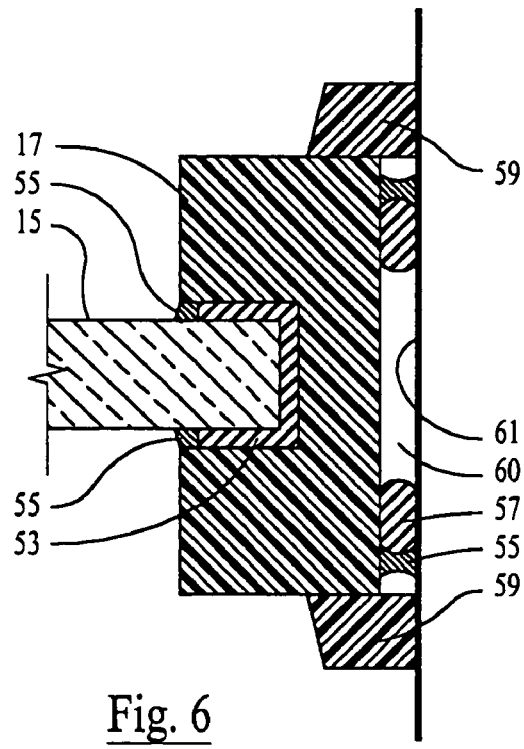
FIGS. 6 through FIG. 9 illustrate horizontal cross sectional detail view alternatives for window frame mullions as shown in FIG. 1.

FIG. 6 illustrates a cross section of one piece frame mullion 17 of window 11 shown in FIG. 1. Mullion 17 is made of a fire barrier material and is of a wall thickness suited to the designated rating of the window, and to the rating of installed panel. Glass panel 15 is factory installed while the window frame is assembled. The mullion 17 is formed as a channel shape for creating a cavity to install the glass panel 15 having a deep engagement for creating a specific cover distance to the edge of the glass panel 15. A compressible lining pad 53 is used between the mullion 17 and glass panel 15. The lining pad 53 may be made of mineral fiber or other fire resistant materials.

A weather seal 55 is used to seal a glass panel 15 to the mullion 17 and to the lining pad 53. The weather seal 55 may be made of silicone, mineral compound, or other such materials with a high resistance to heat. A wall joint 60 between mullion 17 and an adjacent wall 61 preferably has the same fire resistance rating as the glass panel 15. A compressible filler 57 and a weather seal 55 function to weather seal each side of the wall joint 60. The weather seal 55 between the glass panel 15 and mullion 17 and wall joint 60 also functions as a smoke barrier between the two sides of fenestration, and a rated barrier strip 59 provides the needed fire rated barrier to wall joint 60, and preferably has enough thickness to withstand fire and heat for a required duration.

Figure 7:
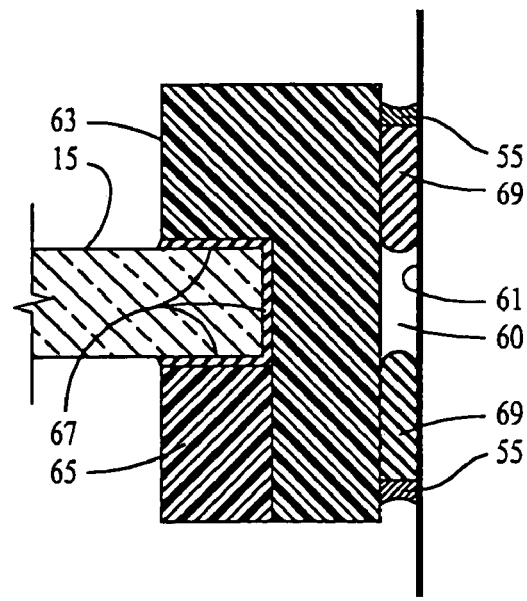

FIG. 7 is an alternative design to the design shown in FIG. 6. Glass panel 15 can be either factory installed or field installed after a mullion 63 is first put into place. A glazing strip 65 is fastened to mullion 63 and retains the glass panel 15. A lining pad 67 is used to install the glass panel and is thinner than the pad 53, shown in FIG. 6. The lining pad 67 may be weather sealed to the mullion 63 and to the glass panel 15 by applying a thin coat of weather seal 55 to all adjacent surfaces and to exposed ends during the installation of the glass panel. The lining pad 67 may also be a pre-formed compressible glazing tape made of mineral fibers or other non-combustible fabric. The lining pad 67 may be encased between thin coats of silicone rubber material or the like and may be used as a sealer, while enhancing the fire barrier function of the glass panel 15, mullion 63 and the glazing strip 65. The lining pad 67 could also be in the form of a very thin coat of sealer compound. A compressible filler 69 is wedged at each side of the joint 60 between the mullion 63 and the wall 61. In this exemplary embodiment the lining pad 67 may replace the rated barrier strip 59, as shown in FIG. 6. The compressible filler 69 is similar to the lining pad 67 and has enough depth to act as a fire barrier between the mullion 63 and the wall 61, where the joint 60 may also be capped with smoke and weather seal 55.

Figure 8:
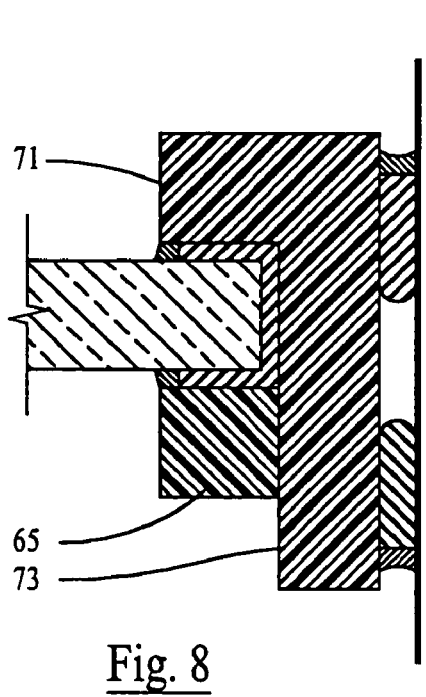
Figure 9:
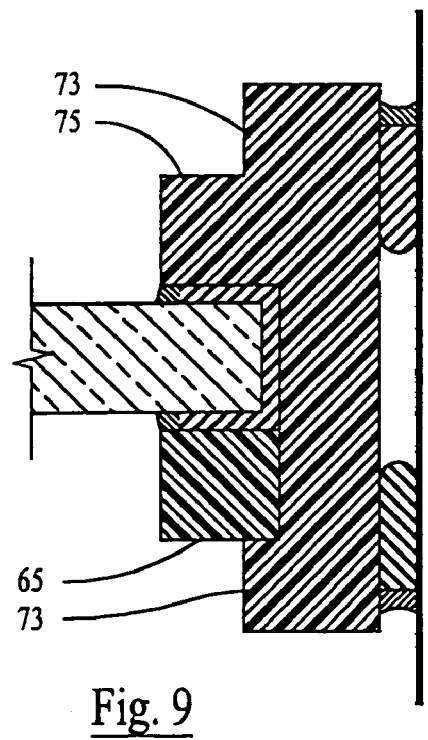

FIG. 8 illustrates a dissymmetrical mullion 71, which is an alternative to mullions 17 and 63. The mullion 71 has an extended portion 73 that adds more depth to the bulk of the mullion and provides additional structural stiffness if and where it is needed. FIG. 9 illustrates a symmetrical mullion 75 having extended portions 73 at two sides. The symmetrical mullion 75 provides greater structural stiffness. The glazing strip 65 of this exemplary embodiment is installed in a corresponding cavity in a wall of mullion 75. FIG. 10 illustrates an intermediate mullion 21, and it is similar to the previously shown mullions 63. The intermediate mullion 21 allows for the installation of glass panels 15 and glazing strips 65 at opposite sides of intermediate mullion 21. FIG. 11 illustrates an intermediate mullion 25 having two back-to-back mullions 63. The intermediate mullions of this embodiment use the same seal method at the joint between the two mullions as used in joint 60 between mullion 63 and wall 61, as shown in FIG. 7.

Figure 12:
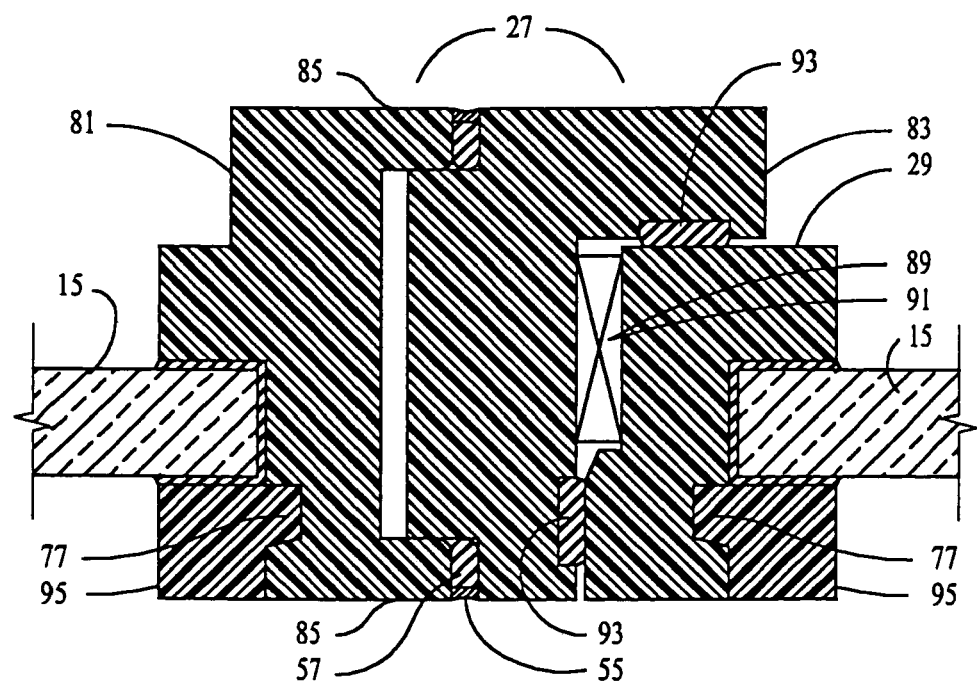

FIG. 12 illustrates an intermediate mullion 27 composed of two interlocking split mullion halves with a female left half 81 and male right half 83. The joint between the two halves has fire barrier cover protruding portions 85 at the two ends of female mullion half 81. Protruding portions 85 engage two corresponding cavities formed in male mullion half 83. Protrusions 85 retain and interlock the male mullion 83 and the area where compressible filler 57 and smoke/weather seal 55 are applied to the exposed joint in-between the two halves. Mullion half 83 has an "L" shape to receive an operable window sash 29, where an inner cavity 89 is formed in-between the mullion half 83 and window sash 29. The inner cavity 89 is provided to house an operable hinge 91 which is shown with diagonal lines. The inner cavity 89 is located in a central location such that a barrier cover is provided all around the hinge 91.

The hinge 91 is preferably composed of swiveling multiple steel bars, and it may expand outward to allow the sash 29 to swing in a balanced state and move around a horizontal axis. The horizontal axis is preferably at the top if the sash 29 swings outward, and at the bottom if the sash 29 swings inward. Other centrally located expanding concealed hinges, such as a "Soss" hinge, may also be used as alternative hinges. These types of hinges perform like a pivoted hinge while being invisible, and are usually used in special hardwood doors. It is installed inside the assembly with a barrier cover, and provides a horizontally swinging sash around a vertical axis at either side. Other types of necessary operational hardware may be provided or closely developed by hardware manufacturers. Male mullion 83 may be deep enough to back-up two sashes 29 side-by-side for horizontally sliding windows with two adjacent rails (not shown), or for vertically operable single or double hung windows (not shown), barrier cover around the cavities which house the needed hardware may be provided in similar designs as presented herein.

A pile strip 93 is attached to and engages a corresponding cavity in mullion 83 located at each end of the joint between mullion 83 and sash 29. Pile strip 93 can be made of mineral fibers or the like, and it should have enough width to complement the fire barrier around the hinge and between the two sides of the window. Glazing strip 95 is designed for the possibility of field glazing to install and retain glass panel 15. Glazing strip 95 has a protruding portion 77 which is retained in a corresponding cavity in mullion 81 and sash 29.

Figure 13:
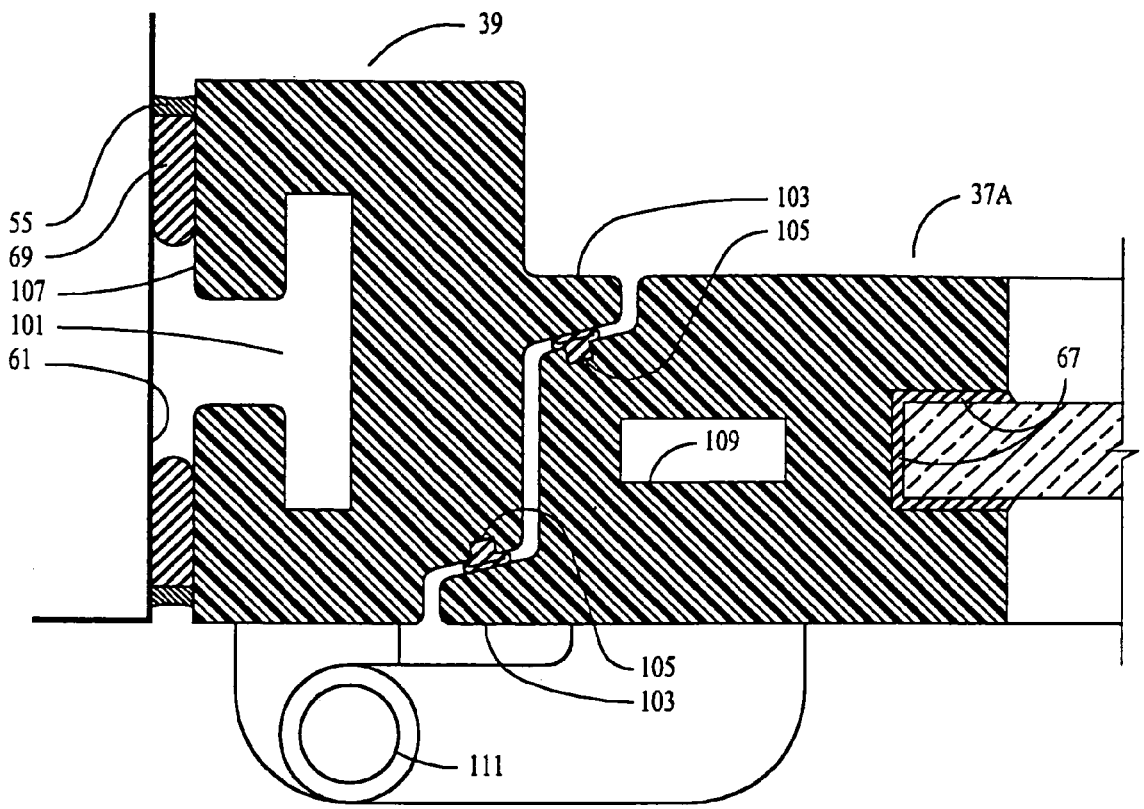
FIG. 13 is a horizontal cross sectional detail view of a door frame as shown in FIG. 3.

FIG. 13 illustrates a cross section of a hinged portion of a single door and frame unit 33, and double door and frame unit 35 shown in FIG. 3. Vertical side jamb 39, and the adjacent vertical door stile 37A apply for single door and double doors. Cavity 101 inside jamb 39 is centrally located between the walls of the jamb 39, and is the rated housing for hinge fasteners or other required hardware. Extended portions 107 hold the wedged compressible filler 69 against the wall 61. The wall 61 can be replaced by another back-to-back door jamb or any other store front or entrance mullion for any type of entrance façade or fenestration. The filler 69 is capped with smoke/weather seal 55. The jamb 39 is formed to correspond with the profile of the edge of a door stile 37A.

Both the jamb 39 and door stile 37A have a similar tapered protrusion 103 which engage the corresponding tapered cavities in both. Gaskets 105 are attached to and engage cavities in each tapered cavity provided for protrusions 103 such that the gaskets 105 work as resting pads to the protrusions 103. Cavity 109 is centrally located inside door stile 37A and with the surrounding walls as a designated fire barrier cover. The cavity 109 is a rated housing for fasteners of hinges and other hardware elements. Doors are usually glazed in the factory while being assembled and a glazing removable strip similar to glazing strip 95 may be provided for a field glazing detail. The lining pad 67 may also be of pre-formed compressible glazing tape. Hinge 111 may be a single, continuous, or multiple hinge and may also be fire rated. Single or multiple expanding Soss hinges may also be installed in a central location with the needed barrier cover. A jamb and door stile at the opposite side of the door will be similar to FIG. 13 but reversed, and chamber 109 at the door stile 37A may partially house the lock and other applicable hardware.

Figure 14:
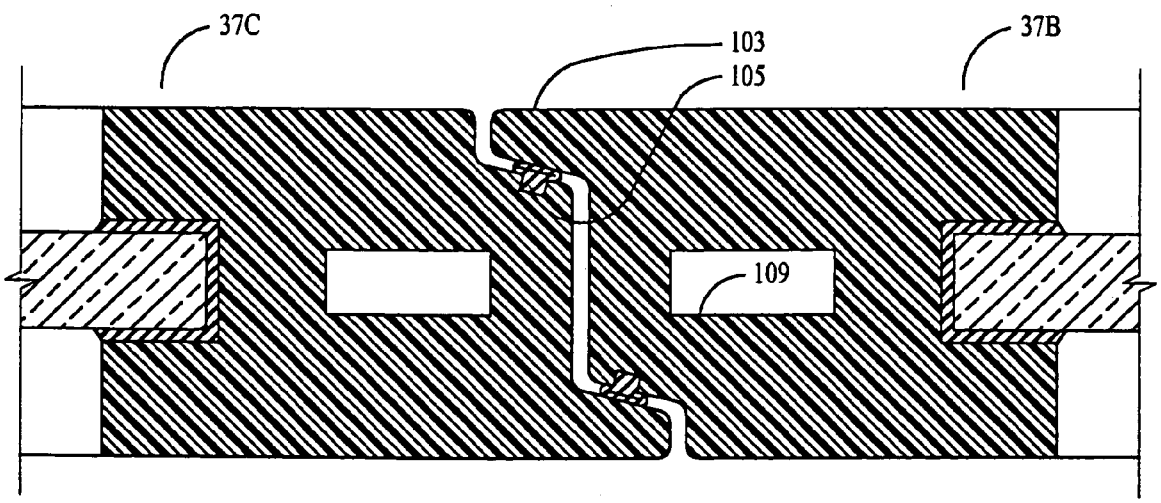
FIG. 14 is a horizontal cross sectional detail view of double door meeting stiles as shown in FIG. 3.

FIG. 14 illustrates meeting stiles 37B and 37C of double door unit 35. Each stile has a tapered protrusion 103 at one side of the edge, and at the other side there is a cavity corresponds to the protrusion 103, the two door stiles meet in an 180 degree rotated impression. Cavity 109 serves as the rated housing for locks and other hardware.

Figure 15:
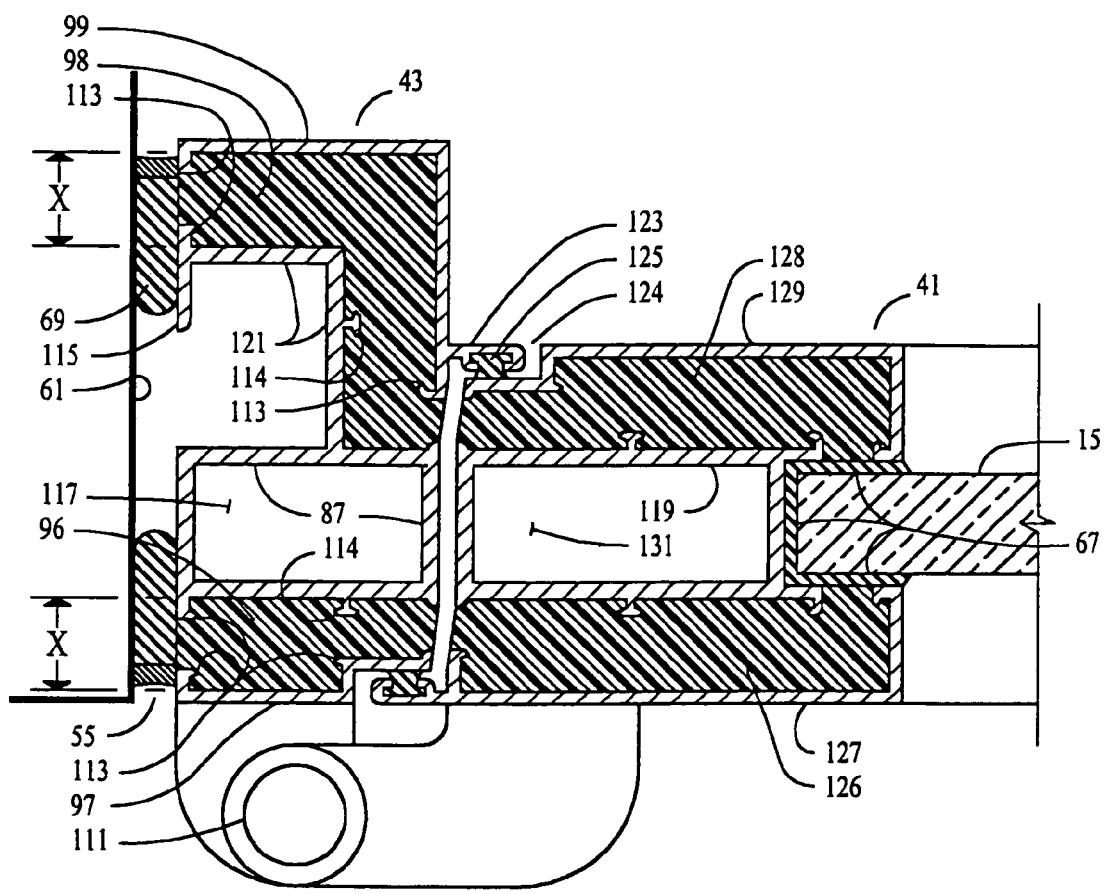
FIG. 15 is a horizontal cross sectional detail view alternative of a door frame as shown in FIG. 13.

FIG. 15 illustrates another exemplary embodiment for providing a fire resistant rated door stile 41 and jamb 43. The two components of this embodiment have a composite combination of metal shells, and a fire barrier material. An inner structural shell and an exposed shell at each side of each of the door jamb and the door stile are extruded in one piece, are preferably of aluminum, and connected in such a way that the connecting portions are removed to eliminate the possibility of thermal conductivity between the exposed shells and the inner structural shell. See also FIGS. 19-21 which illustrate the design and details for making such a component. Fire barriers 96 and 126 compose a continuous fire barrier at one side, and barriers 98 and 128 compose a continuous fire barrier on the opposite side of both the stile 41 and the jamb 43. The four fire barriers have a constant thickness "X". Thickness "X" is a variable dimension corresponding to the thickness of the above mentioned fire barriers necessary to resist fire for the duration time specified for different fire ratings.

Jamb 43 has a metal inner structural shell 87. The shell 87 has two barbs 113, and two "T" tee shaped barbs 114. The barbs 113 the 114 integrate with and retain the fire barriers 96 and 98. The outer exposed shell 97 has two barbs 113 which integrate with and are retained by the fire barrier 96. The exposed shell 97 is parallel to the adjacent wall of the inner structural shell 87, and is at constant distance "X". The exposed shell 99 has an angular shape and is located at the other end of the jamb 43. It has two barbs 113 which integrate with and are retained by fire barrier 98. The structural shell 87 has angle portion 121 formed parallel to the exposed shell 99 at a constant distance "X" from the exposed shell. It should be appreciated that barbs 113 and 114 may be of many shapes and can be distributed in different numbers and arrangements along shell walls to perform both the integration and retaining of the element components. Extended flange 115 holds the wedged compressible filler 69 against the wall 61. Filler 69 is capped by smoke/weather seal 55. Chamber 117 houses the hinge fasteners and other hardware and may be opened to a space inside angle 121 for less complexity in the shape of the metal extrusion. The flange 123 extends from the exposed shell 99 in a perpendicular direction and engages similarly shaped cavity 114 formed in the door stile 41. The flange 123 has a chamber to install a gasket 125 which is a resting pad for the door stile 41 at the wall of chamber 114. The jamb 43 has a similar chamber 124 and a similar flange 123 projecting from door stile 41. Each of jamb 43 and door stile 41 engage with their similar profiles which are rotated 180 degrees.

The door stile 41 has an inner structural shell 119 which has two barbs 113 and two "T" tee shaped barbs 114. The barbs 113 and 114 engage and retain the fire barrier 126. The door stile 41 has an exposed shell 127 adjacent to the hinge 111 and extends to form the flange 123. The exposed shell 127 has two barbs 113 that are engaged and held by the fire barrier 126. The exposed shell 129 is opposite shell 127 and at the other side of the stile 41. The exposed shell 129 has two barbs 113 which are integrated with and held by the fire barrier 128. The exposed shell 129 extends to form a cavity 124. The central chamber 131 is a rated housing for the hinge fasteners and other hardware. The chamber 131 of the door stile 41, and the chamber 117 of jamb 43 are preferably aligned for the central location of hardware, and for a single or multiple Soss hinge if they are used.

Exposed shells 97, 99, 127 and 129 are the exposed cover of the fire barriers. Fire barriers 96 and 126 are at one side, and 98 and 128 are at the other side. These four barriers and the panel 13 comprise continuous all around fire protection for the inner structural shells 87 and 119. It is expected that the exposed shells can withstand fire for a short time before failing and melting. This may be especially so if the shells are made of aluminum. When the inner structural shells are insulated and jacketed by the barrier covers, fire rating tests will give an accurate fire resistance time to the total assembly.

Figure 16:
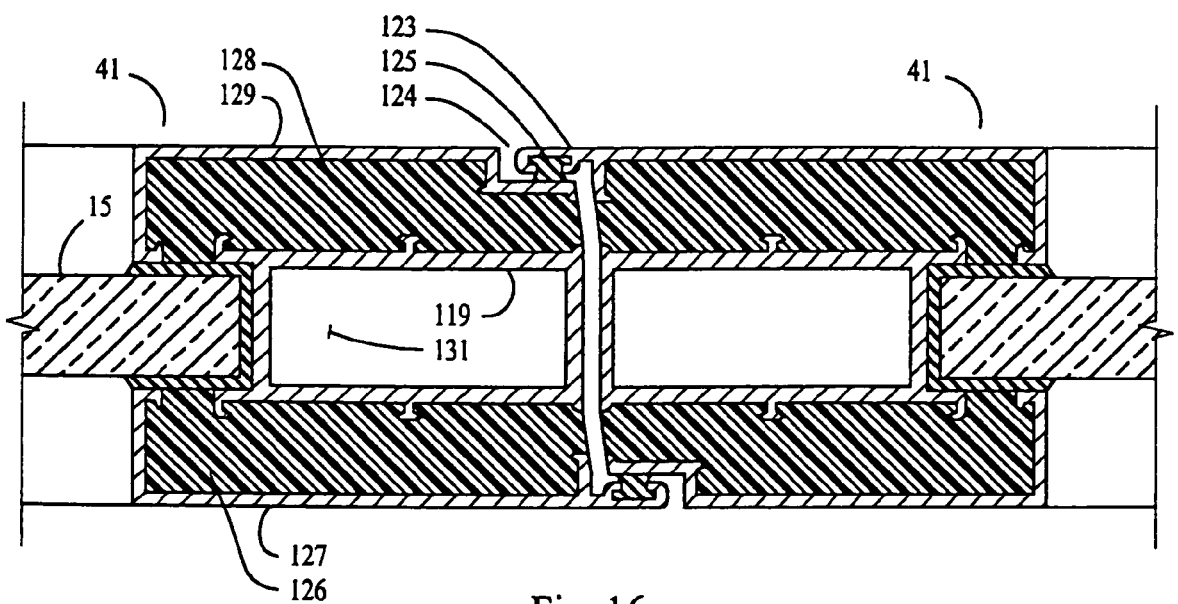
FIG. 16 is a horizontal cross sectional detail view alternative of double door meeting stiles as shown in FIG. 14.

FIG. 16 is another exemplary embodiment of meeting door stiles corresponding to the door stile 41 and jamb 43 shown in FIG. 15. Each of the meeting stiles 41 has a flange 123 at one side of the edge, and at the other side there is a corresponding cavity 124. The two door stiles meet in 180 degree rotated impression. Cavity 131 is a fire rated housing of locks and other hardware.

FIG. 17 illustrates an intermediate mullion 133. Mullion 133 has a thermally broken double shell and jacketed inner structural shell protected with fire barriers covered by exposed shells. The mullion 133 is the main component of the assembly, and it has double shells at the front and back. The double shell at the front is composed of an inner structural shell 135 and the exterior exposed shell 141 with a barrier 137 in between the two shells. The double shell at the back is composed of a shell 135 and an interior exposed shell 143 with barrier 145 in between the two shells. The two glass retainers 139 are preferably at the interior side bracket exposed shell 143 and comprise a continuous fire barrier around structural shell 135. Retainers 139 are removable and they are necessary for the field glazing method described herein. All the shells have barbs 113 to integrate with and engage the middle sandwiched fire barrier material and they may have different shapes and arrangements. Installing the glass panel 15 starts with removing the retainers 139. The inner structural shell 135 is exposed such that there is enough clearance for the edge of the glass panel 15 to fit into place. The angled lining pad 147 may be of one or two pieces and may be installed in the shop or in the field prior to installing the glass panel 15.

The next step is to move glass panel 15 in a straight outward direction "A" until the edge of the panel rests against the two sides of the angled lining pad 147. The lining pad 147 should be buttered with weather/smoke sealant 55 on all surrounding surfaces as well as glass panel 15. A glass retainer 139 may be installed and maneuvered in a clear space which may be filled later by a wedge 153. The glass retainer 139 is to be moved in direction "B" until its two hooking barbs 149 are engaged and retained by the two corresponding barbs 151. The barbs 151 extend from inner structural shell 135 to retain each of the two glass retainers 139. Glazing wedge 153 may be squeezed into place and wedged between the glass panel 15 and the glass retainer 139. A wedge 153 locks the glass retainer 139 into place. The exposed edge of the lining pad 147 and the wedge 153 may be capped with a bead of weather/smoke sealant 55 as the last step of panel installation.

FIG. 18 illustrates an exemplary embodiment of a split mullion 163. Split mullion 163 is composed of two mirror image back-to-back female halves 164 and provides a continuous fire barrier around structural core shells 167. Each half 164 has thermally broken double shells at the front and at the back. Halves 164 may be assembled together by using "T" tee shaped mullion spacers 165 at the front and back. Flanges 168 and 169 of shells 167 form the pocket chamber where spacer 165 will engage the two halves of the mullion. Spacer 165 is preferably made of compressible mineral fibers or other fire resisting materials similar to the glazing pad 147 and the wedge 153. A weather/smoke sealant cap 55 may be applied to the joints at the front and back of the split mullion 163 with a spacer 165 as a back-up.

FIGS. 19-21 are horizontal cross sectional detail views of the design, and illustrate providing a thermal break for all double shell components of the exemplary embodiments, including the assembly of mullion 133, as shown in FIG. 17. FIG. 19 shows the extruded aluminum full shape 156 of panel retainer 139, which is used as the casting form for the fire barrier material. A fire barrier 159 is cast or applied inside an extruded tubular closed shell 156. A part shell 155 and part shell 157 are connected with a bridge connector 161. Connectors 161 may have a thinner wall thickness. FIG. 20 shows connectors 161 to be removed with cross hatching. FIG. 21 shows retainer 139, after being thermally broken by removing the connector 161. The barrier 159 connects the two shells 155 and 157. It should be appreciated that an alternative way of providing a thermally broken double shell member may be to provide the two shells preferably in metal pre-shaped, bent or extruded and the thermal break barrier material also pre-shaped. In this way, various means of assembling, fastening or snap-fitting the components together may be utilized.

FIG. 22 illustrates an alternative split mullion 171. Mullion 171 has a weather/smoke seal created by two gaskets 193. The gaskets 193 are located at the front end of the mullion and are housed inside cavities 177 and 207. A flange 181 in combination with flange 176 and cavity 177 at the front end of mullion provide added fire resistance to the jointed portion of front end of the mullion 171. A flange 211 in combination with flanges 213 and the adjacent two cavities 209 provide added fire resistance to the jointed portion of the back end of mullion 171. The mullion 171 is composed of two thermally broken double shell halves, female half 173 and male half 175. The front of female half 173 has two cavities 177 and 207 separated by a fire barrier 179. The flange 181 partially forms the front central portion of mullion 171 and extends from exposed shell 180 of female half 173 and forms one side wall of cavity 177.

A flange 183 extends from structural shell 172 of the female half 173 and forms one side wall of cavity 207. A flange 185 extends from an inner female structural shell 172 and forms the side wall of cavity 187 at the back of mullion 171. Inner female structural shell 172 of female half 173 has a barrier 179 at its front portion. The exposed shell 180 is retained by the barrier 179. Inner female structural shell 172 also retains the barrier 189 at the back of mullion 171, which in turn retains an interior exposed shell 191. Male half 175 retains barrier 195, and barrier 195 retains exposed shell 197 at the front of the mullion. The male half 175 has a flange 186 that extends from the structural shell 174 at the back of mullion 171. The flange 186 is formed as a "T" tee shape for technical extruding precautions. A flange 206 extends from the structural shell 174, and the other flange 176 extends from exposed shell 197. Flanges 176 and 206 align with cavities 177 and 207 respectively. The two gaskets 193 may be pre-installed at the end of flanges 176 and 206. Gaskets 193 are made of heat resistant compressible silicone or mineral fiber, or the like, of single or multiple heat resistant materials.

One half of the split mullion is preferably installed first, after which the other half interlocks with and is retained by the first half, where the flange 186 and the two gasket covered flanges 176 and 206 engage the cavity 187 and the two cavities 177 and 207, respectively. Two gaskets 193 provide double seal for weather/smoke between the two sides of the curtain wall, where gasket 193 and cavity 207 are protected by the fire barrier 179, and are included with the thermally broken inner structural shells 172 and 174. Compressible filler and fire barrier 200 is back adhered to the female half 173 to fill the variable width of the joint between the two halves of mullion 171. These provide a continuation to the fire barrier around the inner structural core shells 172 and 174. The glazing retainers 201 and the installation steps of the glass panel are explained in FIGS. 23-25.

FIGS. 23-25 illustrate the installation of retainer 201 to secure the glass panel 15 to mullion 171. Retainer 201 is composed of a thermally broken double shell similar to the retainer 139 shown in FIG. 17. The two shells of retainer 201 have barbs 114 to integrate with and engage the middle sandwiched fire barrier material 159. Barbs 114 may have different shapes, locations and arrangements. Installing the facing panel 13, preferably a glass panel 15, starts with removing the retainer 201 from inner structural shell of mullion 171 to allow enough clearance for the installation of the edge of glass panel 15. An angled lining pad 147 is installed inside a glazing chamber before installing the glass panel 15.

Next the glass panel 15 is moved in a straight outward direction "A" until the edge of panel rests against the two sides of the angled lining pad 147. The angled lining pad 147 should be buttered with weather/smoke sealant 55 on all surrounding surfaces, as well as glass panel 15. The glass retainer 201 is put in place and maneuvered in the clear space which will be filled later by a wedge 153, as shown in FIG. 23. The retainer 201 is to be moved in direction "B" such that it travels inward towards the back of mullion until its two hooking barbs 149 are engaged and retained by the two corresponding barbs 151. This movement in the direction "B" allows flange 213 to rest against the back side of flange 211 and closes the cavities 209 where the joint between the two halves are located, as shown in FIG. 22. Barbs 151 extend from inner structural shell 172. Glazing wedge 153 is wedged in-place between glass panel 15 and retainer 201. The wedge 153 locks the retainer 201 in its place. Finally, the exposed edge of lining pad 147 and the wedge 153 are capped with a bead of weather/smoke sealant 55.

Figure 26:
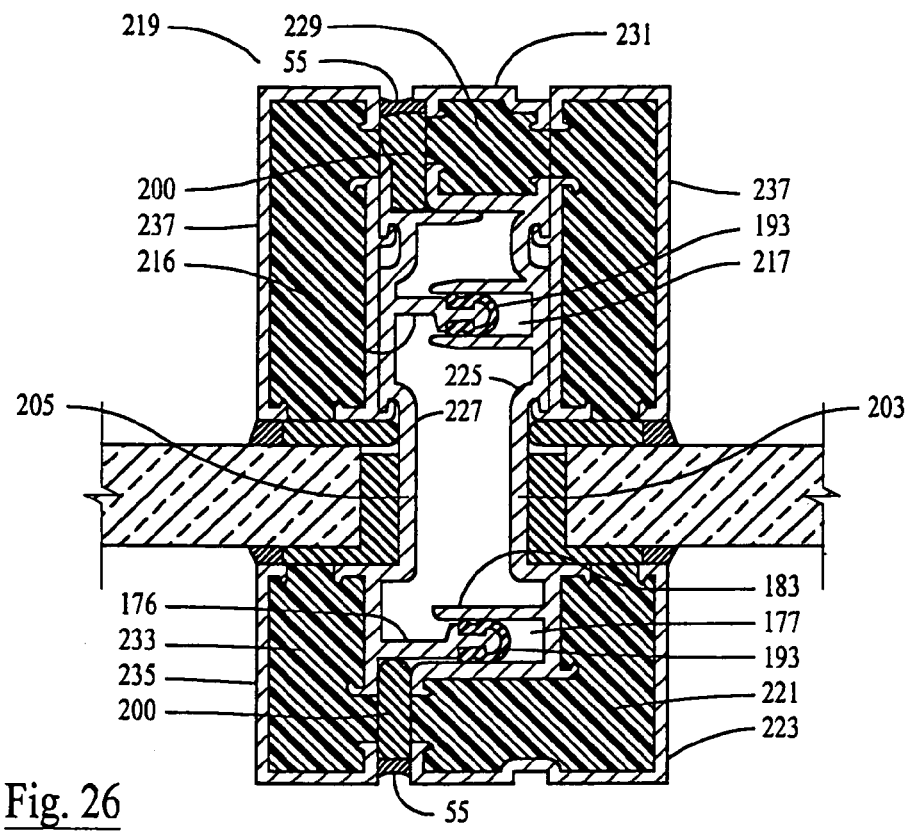

FIG. 26 illustrates another exemplary embodiment of a split mullion of the exemplary embodiments. A mullion 219 is composed of female mullion half 203, and male mullion half 205. Structural shells 225 and 227 are the major components of the female half 203 and male half 205 of mullion 219, respectively. Mullion 219 has two weather/smoke seals provided by gaskets 193, one located at the front end of mullion 219, and the other at the back end of mullion 219. Seal gaskets 193 are housed inside cavities 177 and 217. The two weather/smoke seal gaskets 193 and their attaching flanges 176 and 216, cavities 177 and 217 are integral parts of the inner structural shells 225 and 227 of the mullion 219. A fire barrier 221 is integrally attached to exposed shell 223 and secures exposed shell 223 to structural shell 225 at the front of female half 203. A barrier 229 secures the exposed shell 231 to the structural shell 225 at the back of mullion 219. A barrier 233 secures exposed shell 235 to structural shell 227 of male half 205. Retainers 237 are similar to retainers 139 and 201 of the previous figures and glass panels 15 are installed in the same manner described previously. Compressible fillers and fire barrier 200 is back adhered to one side and capped with a bead of weather/smoke sealant 55. Filler 200 fills the variable width of the joint between the two halves of mullion 219 and provides a continuous fire barrier around the inner structural core shells 225 and 227 of the mullion 219.

Figure 27:
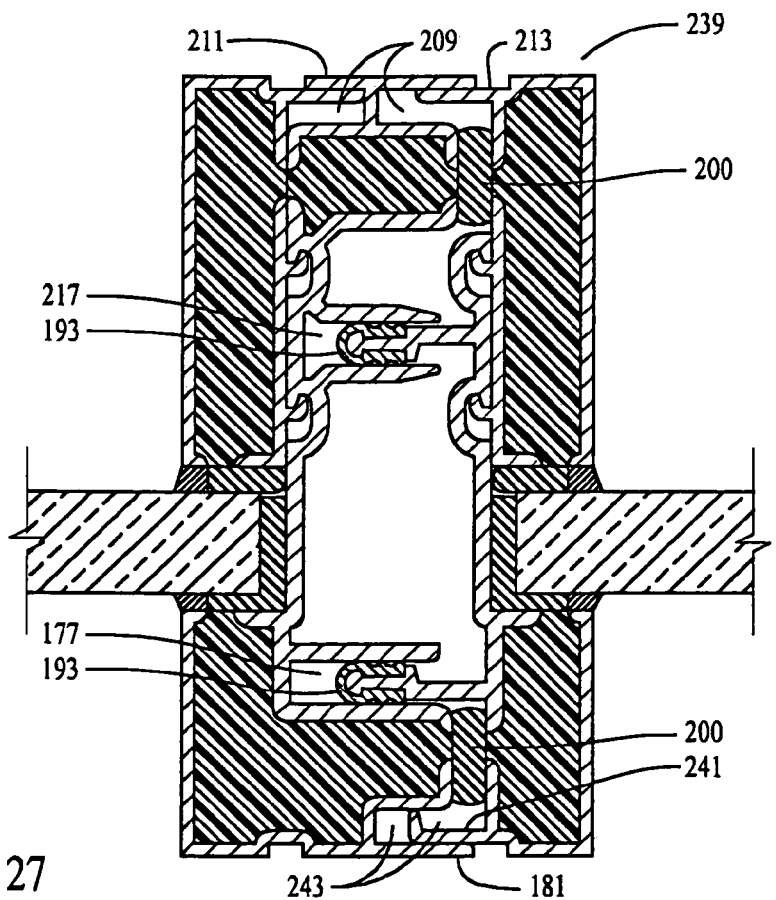

FIG. 27 illustrates an exemplary embodiment of a mullion. Mullion 239 is similar to mullion 171, as shown in FIG. 22. A flange 181 in combination with flange 241 and cavities 243 at the front end of mullion 239 provide added fire resistance as a cover for the jointed portion at the front of mullion 239. The flange 211 in combination with flanges 213 and the adjacent two cavities 209 at the back end of mullion provide added fire resistance for the jointed portion at the back end of the mullion 239.

FIGS. 28-30 illustrate another exemplary embodiment of a mullion. Mullion 245 may have an inner structural shell and an exposed shell, and may be a one piece mullion or a two half split mullion and may be detailed similar to other mullions presented herein. Mullion 245 is composed of a fire barrier 247 and has one or multiple cavities, where each cavity may either be continuous or carved for attaching a panel fastener 249. Panel fastener 249 may be a "Z" shaped plate anchor attached with concealed screws 251. The front portion may be shaped with a pocket 253 at the top such that a nib 257 is pointing up to receive a retaining anchor 255. The retaining anchor 255 may be attached to the back of facing panel 13 or glass 261. The retaining anchor 255 may be a single or multiple anchors, and may also act as an integral part of the panel, or may be pre-attached with screws 251 or other anchoring means. Retaining anchor 255 has a slotted hole 259 and it is engaged and retained by nib 257. The panel 261 is installed by moving the panel 261 to rest on the front face of the mullion 245 while aligning slotted hole 259 with nib 257 and urging the panel 261 that nib 257 engages through slotted hole 257, allowing the panel 261 to drop down and be hooked by nib 257.

Figure 31:
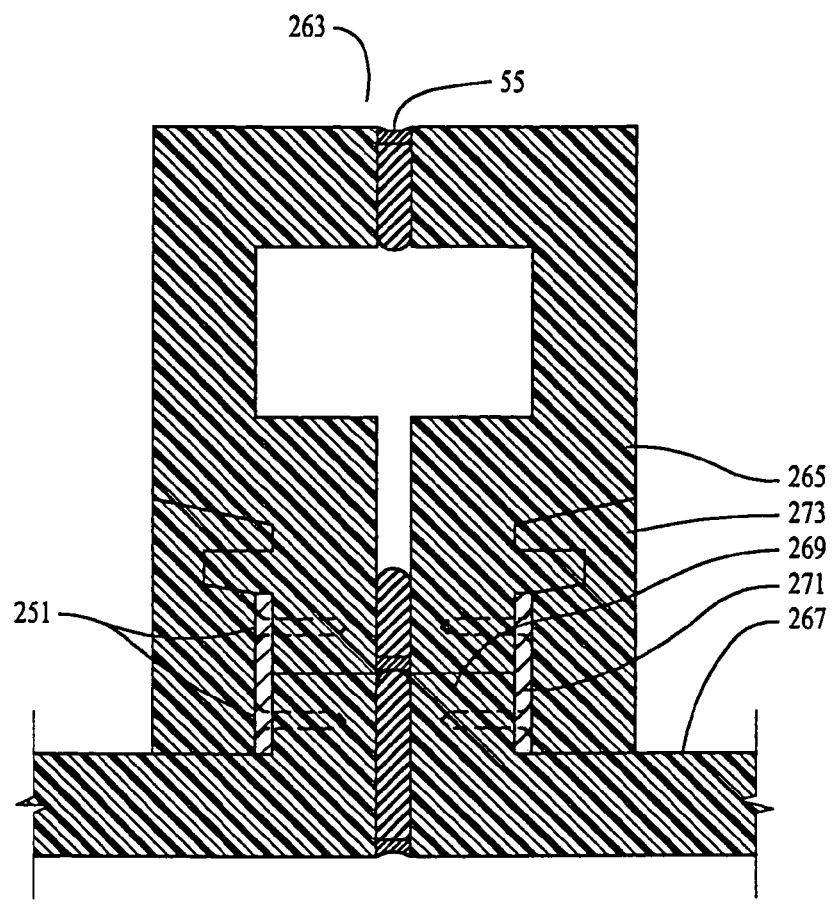

FIG. 31 illustrates another exemplary embodiment of a split mullion. A facing panel 267 has an angled integral return 269. The return 269 may be single or multiple pieces, and the facing panel 267 may be attached by fastening a minimum of one anchor plate 271 to the mullion 263 and to the integral return 269 of the facing panel 267. Cover 273 may be installed to mullion 263 to conceal the anchor plate 271 and screws 251.

Figure 32:
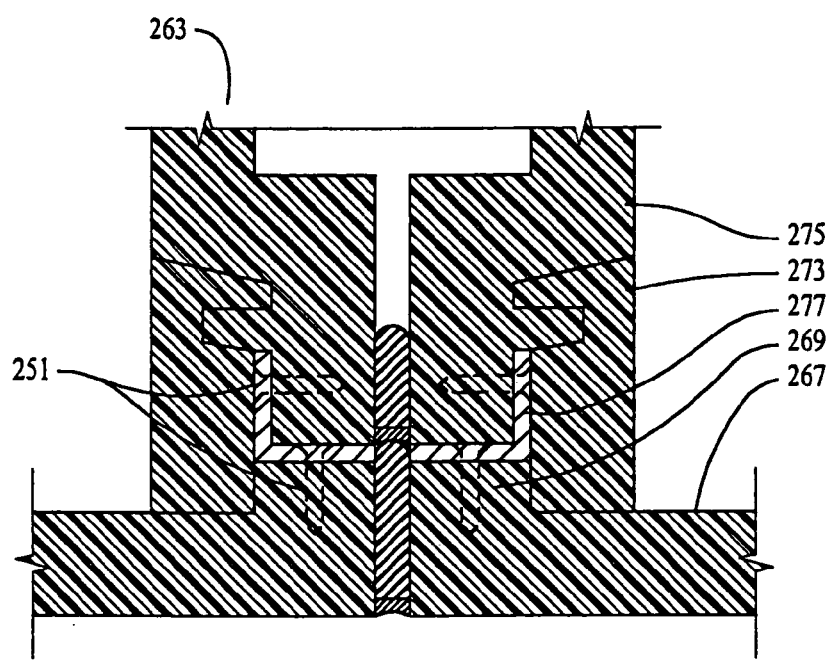

FIG. 32 illustrates a mullion 275 similar to mullion 263, as shown in FIG. 31. Anchor angle 277 may be pre-attached to the back of a facing panel 267. If the facing panel 267 is too thin to accommodate screws or the like, it may have an integral return 269. Angle 277 may also be fastened, or attached to, or integrally formed as part of the facing panel 267 and may also be directly attached to the back of facing panel 267.

Figure 33:
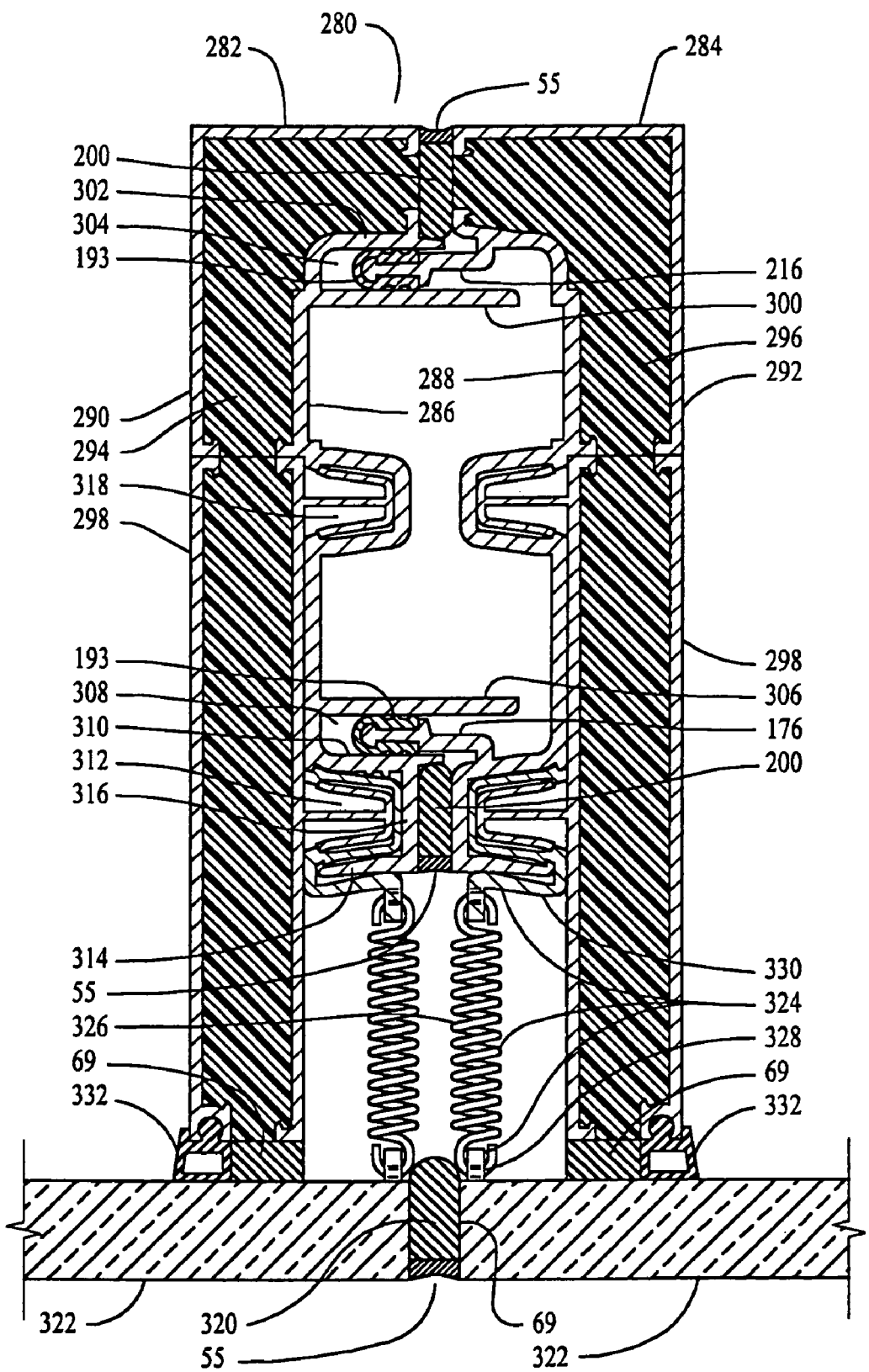
FIG. 33 is a horizontal cross sectional detail view of a mullion alternative comprising a fire resistant rated/Seismic safe stopless glazing curtain wall/fenestration system that can withstand earthquake forces.

FIG. 33 is an exemplary embodiment of a fire resistant rated/seismic safe stopless glazing curtain wall and fenestration system. Female half 282 and male half 284 compose split mullion 280. Female half 282 and male half 284 respectively are composed of inner structural shells 286 and 288, angle shaped outer exposed shells 290 and 292, and barriers 294 and 296. The barriers 294 and 296 are integrally attached to, and secured by the two adjacent shells and each barrier protects the attached inner structural shell. The two shells of each female half 282 and male half 284 may be extruded as one shell, to be used as the casting form. They may then be filled with fire barrier, separated and thermally broken in a similar way as described in FIGS. 19-21. Female shell 286 has a flange 300 at the back portion, parallel to the adjacent back wall 302 where a cavity 304 is formed between the flange 300 and the back wall 302. It should be appreciated that a one piece intermediate mullion and an end mullion may be developed by making few simple changes to the split mullion 280 of this embodiment.

Female shell 286 has a flange 306 parallel to an adjacent web 310 at the front portion of mullion 280 and a cavity 308 is formed between the flange 306 and the web 310. The inner structural shell 288 of male half 284 has two flanges 176 and 216. These two flanges have weather/smoke gasket seals 193 attached at their tips. Flanges 176 and 216 are aligned with and engage chambers 308 and 304 respectively during installation. Channel chamber 312 is at the front end of structural shells 286 and 288. Channel chamber 318 is similar to chamber 312 and formed by the side wall of structural shell of each mullion half. A fire resistant compressible filler 200 is at the front and back joint of the two mullion halves 282 and 284. Each filler 200 is capped with a weather/smoke sealant 55, which also seals the joint between the two mullion halves 282 and 284 at both ends.

Joint 320 is between the two adjacent facing panels preferably of glass 322. A compressible joint filler 69 is applied to joint 320 and panels 322 and is sealed with weather/smoke sealant 55 after installing the two panels 322. An elastic panel fastener 324 is an integral part of panel 322. The elastic panel fastener 324 comprises at least one spring 326 and at least one end element 330. The spring 326 is attached at the inner side to end element 330. It should be appreciated that the spring 326 and the end element 330 may be manufactured as a single piece elastic holding element. The spring 326 is shown with its ends shaped in a conventional hook shape for simplicity, but it may be provided with any other shape that facilitates attachment to either the back or the edge of the panel 322. The spring may also be attached either directly to the facing panel 322, or to a barb 328, as shown.

Structural engineers use few guidelines to assume the maximum wind pressure that the a building may be subjected to, and wind pressure may result in compression (positive wind pressure) at one side of the building, while at the same time the façade at the opposite side of the building may be subjected to suction wind pressure (negative wind pressure). As such, the same part of the façade of a building may be repeatedly subjected to compression or suction wind pressure.

According to this exemplary embodiment, a spring 326 having sufficient strength to withstand the maximum assumed negative wind pressure with minor elongation in the outward suction direction is provided within the mullion 280. The spring 326 is also capable of elongating when the edges of panels 322 are under the extreme forces caused by an earthquake. The spring 326 is not considered for withstanding compression forces during the positive wind pressure. However, compression forces will be resisted by a holding element 298. The gasket seal 332 is pre-installed to the holding element 298 and fire resistant compressible filler 69 is back adhered to the holding element 298. The gasket 332 and the adjacent compressible filler 69 act as a cushion between the mullion 280 and panels 322. The holding element 298 is snapped in and interlocked with mullion 280, as well as with the elastic panel fastener 324.

Figure 34:
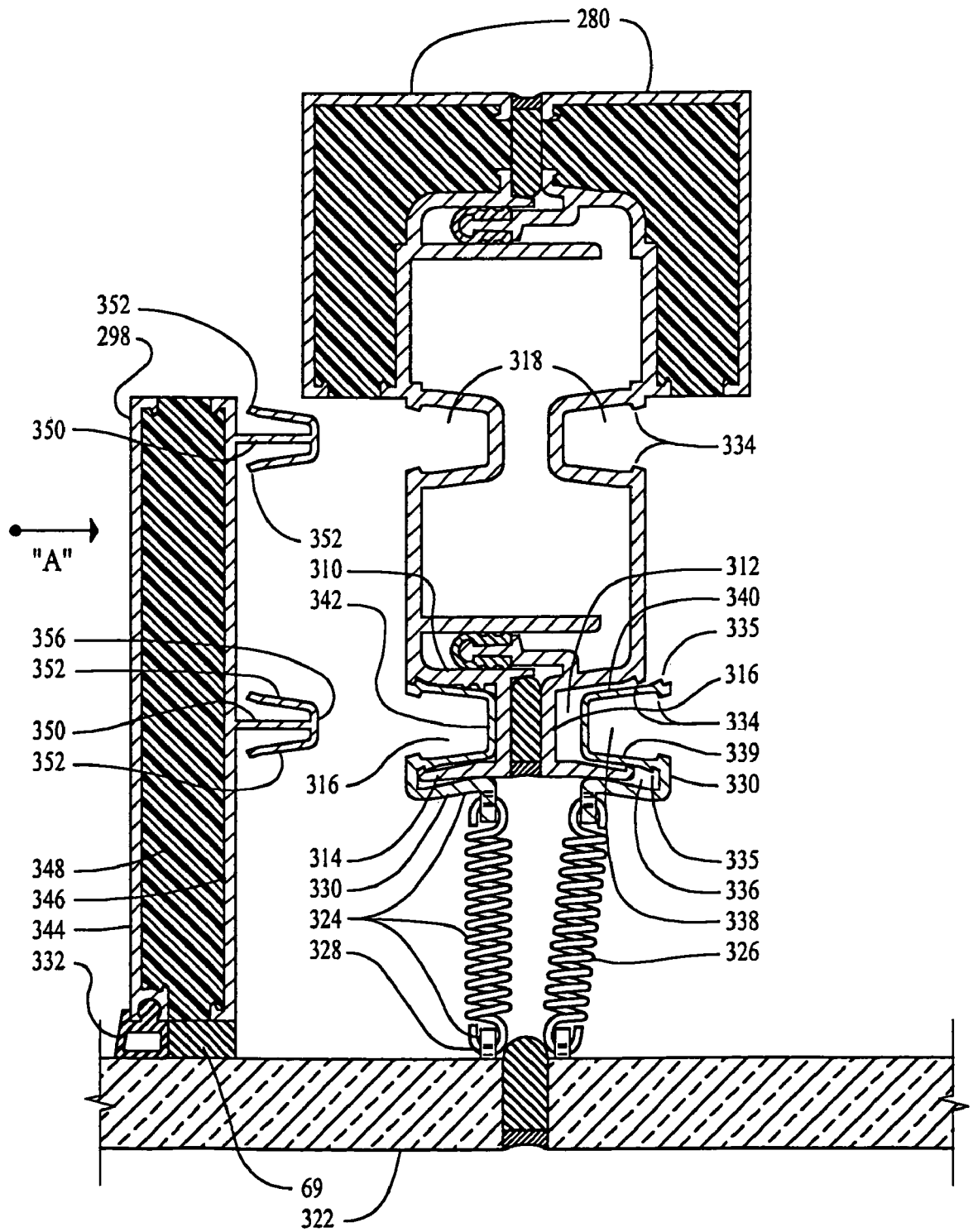
FIG. 34 is a horizontal cross sectional detail view of the installation steps for retaining the facing panel or glass, and holding element, for a mullion shown in FIG. 33.

FIG. 34 is a horizontal cross sectional detail view of the installation of assembling the mullion 280 of FIG. 33 and installing panels 322. The panels 322 are preferably made of glass, or other transparent materials. As illustrated, the facing panels 322 are integrally attached to the elastic panel fastener 324. The holding element 298 is then snapped in and interlocked with the mullion 280 and also with the elastic panel fastener 324. The mullion 280 is also connected via the elastic panel fasteners 324 to panel 322. A channel shaped chamber 312 is at the front end of the structural shells, and formed with three walls, the front wall 314 of mullion 280, the parallel web wall 310, and wall 316. The wall 316 connects the two walls 314 and 310 and extends parallel to mullion side walls. The channel chamber 318 is similar to chamber 312 and the three side walls of the channel are formed by the side walls of the structural shell of each mullion half. Interlocking barbs 334 are formed at the outer end of the two side walls of each channel shaped chamber 312 and 318. The spring 326 is attached to end elements 330. The end elements 330 have an "S" shape with two compartments, one small compartment 336, and a larger channel shaped compartment 338. Compartment 336 has a "Z" shaped element with one end attached to flange 340 of channel element 339. The "S" shaped end element 330 has a compartment 338 formed by channel element 339. Channel element 339 has two flanges 340 connected with web 342. Channel compartment 338 is similar to both of the other chambers 312 and 318 of the mullion halves, and also has two interlocking barbs 334 at the outer end of the two flanges 339 and 340 similar to channels 312 and 318 at the inside of channel compartment 338. Two interlocking barbs 335 are formed at the ends of the two flanges 339 and 340 at the outer side of channel element 339. The two interlocking barbs 335 correspond to the two barbs 334 of chamber 312.

The two mullion halves are illustrated fully installed and the left side facing panel 322 is secured and snap locked to the mullion 280. The installation of the right side facing panel 322 begins by inserting the channel element 339 of "S" shaped end element 330 inside chamber 312, as shown at the right side of mullion 280 and urging it all the way inside until the two barbs 335 interlock with the two corresponding barbs 334 of chamber 312, as shown installed at the left side of mullion. The holding element 298 has an outer exposed shell 344 and an inner structural shell 346, and the two shells are integrally attached with a barrier 348 in between the two shells. Two "E" shaped anchoring elements 350, each with two side flanges 352 and web 356 are connected to the three flanges of anchoring element 350. The anchoring element 350 is attached to the structural shell 346 at one end, and at the other end to attaching web 356.

Interlocking barbs are formed at the free end of each side flange 352 corresponding to interlocking barbs of chamber 318. These barbs also correspond to the interlocking barbs located inside channel compartment 338 of the end element 330. End element 330 is shown already installed inside chamber 312. The two anchoring elements 350 are aligned with chamber 318 at the mullion side walls, and with channel compartment 338 of end element 330. The last installation step is installing holding elements 298 to the two sides of mullion 280, by engaging the two anchoring elements 350 of the holding element. Anchoring element 350, located on the upper portion of structural shell 346, engages chamber 318 and the lower anchoring element engages compartment 338. The anchoring elements 350 are urged inside the corresponding chambers, as shown by direction "A" until the corresponding barbs interlock.

Figure 35:
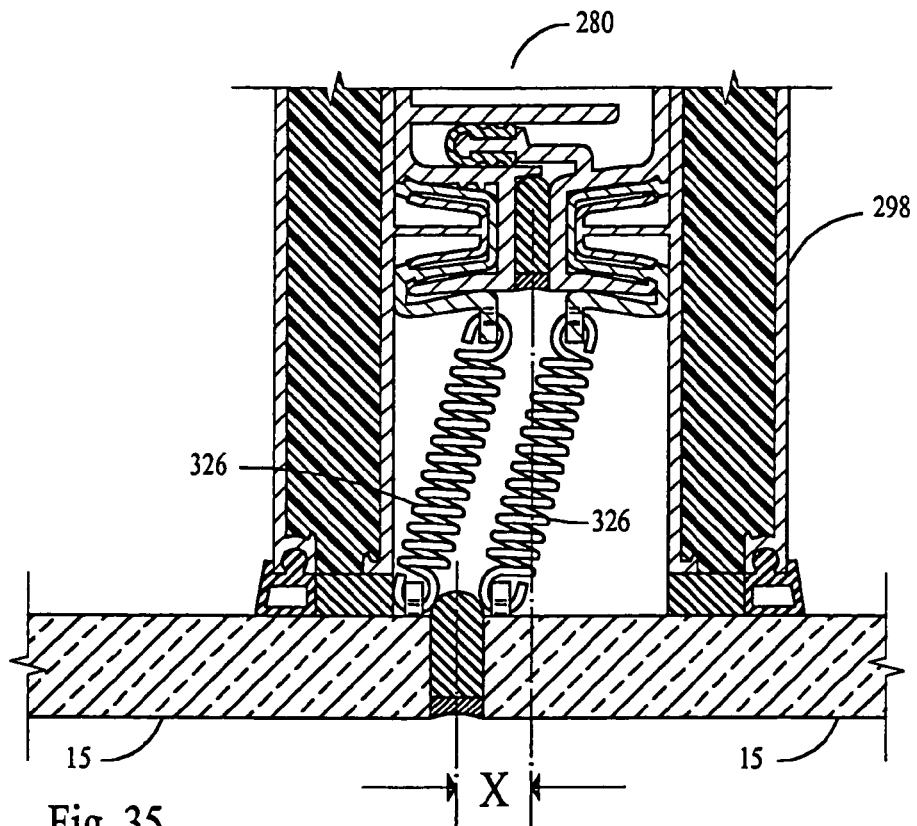
FIG. 35 is a horizontal cross sectional detail view of the front portion of mullion illustrated in FIG. 33 where a building facade is subjected to lateral movements.

FIG. 35 illustrates the advantageous manner in which the exemplary embodiment as described in FIG. 33 copes with the expected effects of earthquakes. When the building sways in a plane parallel to the glass panels 15, the angularity of the frame members may change. However the glass panels 15 will not deform. The swaying of the building may cause the mullion 280 to travel sideways at a distance "X" from the centerline of panel joint, and the travel distance "X" can be tolerated by the springs 326.

Figure 36:
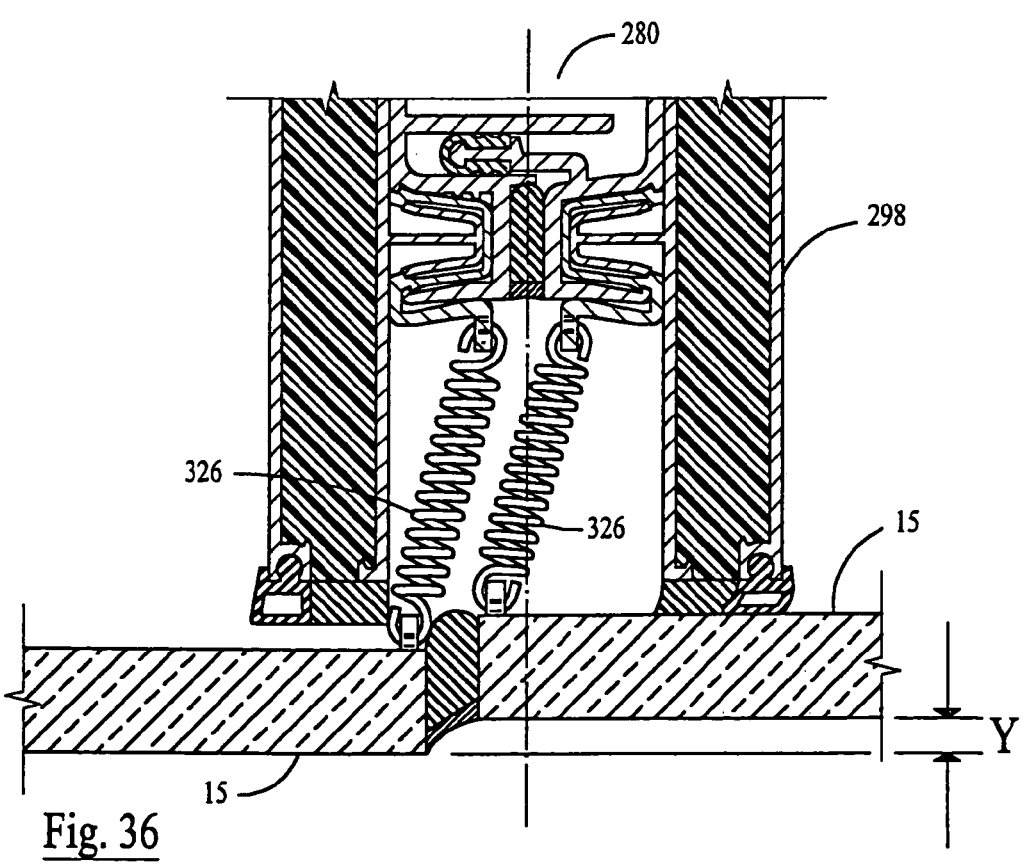
FIG. 36 is a horizontal cross sectional detail view of the front portion of a mullion illustrated in FIG. 33 where the building façade is subjected to lateral movement while the building facade is also subjected to twisting movement.

FIG. 36 illustrates the condition of compounded deformity of the frame members. Buildings may be designed such that the elevators, service core and wind bracing diaphragm are not centrally located, or the building may not be symmetrical in height, shape or foot print. In addition the building center of gravity may not coincide with the planes of the movement resisting diaphragm, in this case the motion caused by an earthquake may cause a twisting action on the building. This in turn may cause the frame at two diagonal corners of the building to push out the glass panels 15. Because of the rigidity of the glass panels 15 the two other diagonal corners may also be pulling out at the opposite corners of the frame. This results in a corner of the facing panel have the tendency to pull outward, while the corners of the adjacent panel have the tendency to push inward. The springs 326 will still tolerate this movement of the "Y" distance. Stopless glazing is the best suited system to allow mullions and glass panels 15 to move as illustrated without damage.

Figure 91:
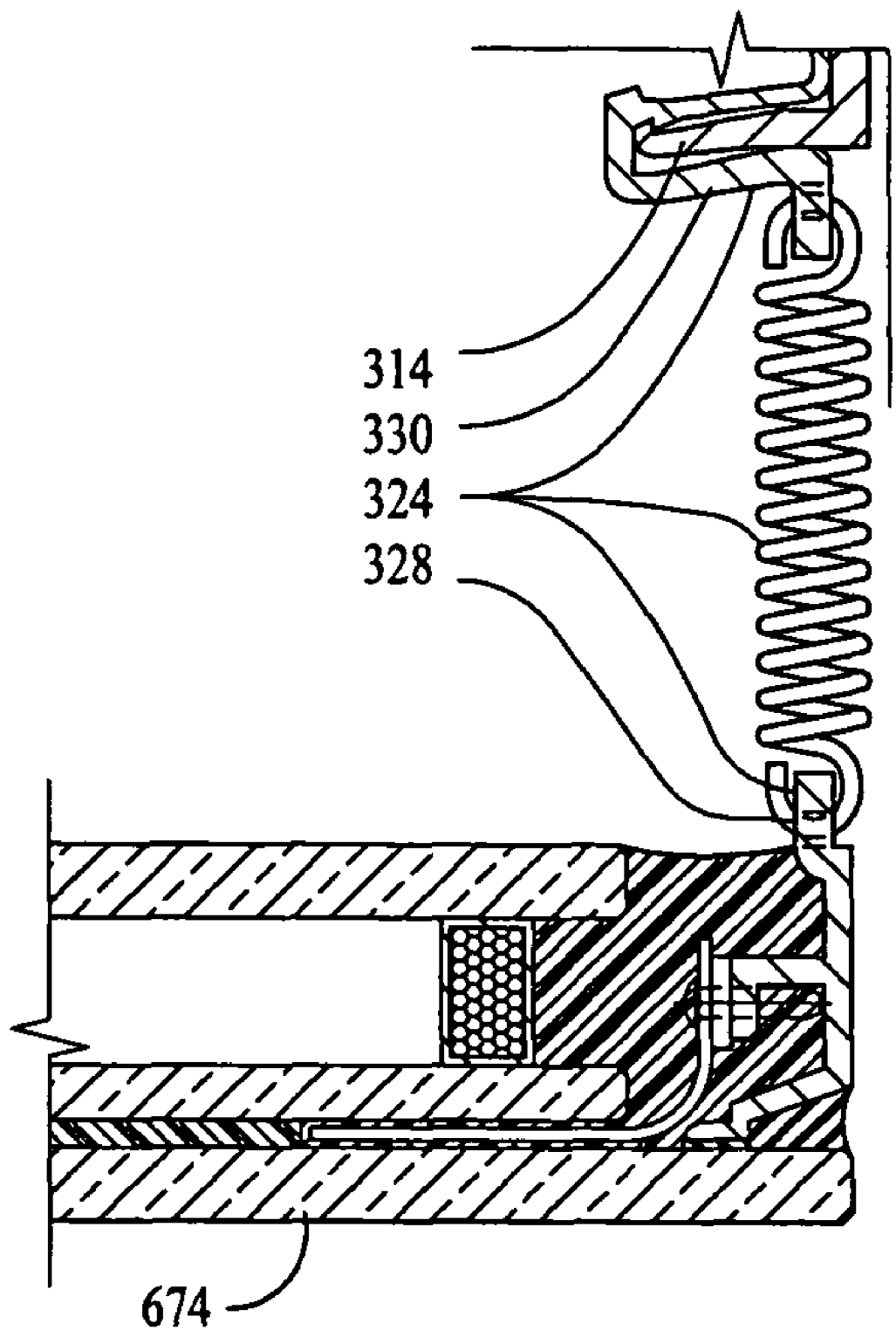
FIG. 91 is a cross sectional view of a detailed exemplary composition of a laminated insulating glass panel similar to the glass panel shown in FIG. 40.

FIG. 37 through FIG. 91 illustrate exemplary embodiments for providing an edge attachment to a panel of glass or any other applicable panel material, by way of a bridging element. A single or multiple insert component of the bridging element may be integrally attached to the panel and embedded respectively in a single or in multiple grooves. The multiple insert component, insert part, or insert segment may be provided between the panel sheets, and in a form suited to allow using rollers, while embedding the insert part in the same process of heat and pressure for laminating multiple sheets of glass.

The insert part or segment may be formed as part of the bridging element, or separately attached. The insert part may be manufactured of a rigid or flexible material, or a combination thereof, to allow for tolerance adjustments needed to suit fabrication and assembling techniques, as well as to suit machinery for all fabrication phases. An integral bond between the insert part and the groove can be enhanced by providing the insert part with serrations, perforations, stamps, punctures, a rough surface, barbs, holes, and/or protrusions. Furthermore, the insert part may be made of one or multiple materials having various thicknesses, and/or manufactured as one insert part or an insert part with multiple segments.

The panel may be formed of a plurality of sheets laminated together. If a heat and pressure method of lamination, for example, is applied, a pre-formed groove with the desired dimensions for the insert part can be provided in the panel. The insert part or insert segment may also be embedded at an edge of the panel at the same time while laminating the sheets in one step. If the insert part is attached to the bridging element, the insert part should have holes to allow for resin liquid fill to pass through the insert part to fill all the spaces between the plurality of sheets that make up the panel. By capillary action, the resin may also fill the space between the insert part and the preformed groove, where applicable. The liquid resin 390 will cure to a hard fill, bonding to all surfaces and holding the assembly together, as shown by the hatching throughout illustrated figures.

An insert part 462, shown in FIG. 73, is composed of three segments, segment 464 can be rigid and can have bond enhancement treatment, and may be attached to a second central flexible segment 466. Flexible segment 466 can be made of a thin gauge metal like stainless steel, or fabric, or rope wire, or chains or any like flexible composition. Flexible segment 466 may be attached to an end tube segment 468.

The insert part 462 can be manufactured with one part, or with multiple segments. The insert part 462 may be made of one material or multiple materials, with the multiple segments hinged together for adjustment of fabrication tolerances needed during assembling phases. The insert part may include multiple segments of one material in different thicknesses or treatments, or thin flexible material bent and folded on itself. The insert part 462 may include braded fine rope wires, which can also be in fabric form with different fabric pitch, or densities, or thicknesses, or the like or any combination thereof, to easily flex or bend where and when needed to allow for providing each segment of the insert part 462 with the needed properties to perform its projected function.

Methods of manufacture or use, components, parts, shapes, design, details, means of securing glass panels or any other applicable facing panel of the exemplary embodiments for the mullions and panels are envisioned. That is, according to the different alternative exemplary embodiments, all components and parts can be differently combined, arranged, and interchanged in any combination thereof to fulfill any code, guidelines, rating, safety or security measures. For example, the exemplary embodiments may include a fire resistant mullion composed of pulltruded, extruded, cast, or carved of larger sections, as two symmetrical halves of solid fire barrier; or the mullion may be designed to have an inner structural shell and an exposed outer shell, with fire barrier material cast in between the two shells; or the mullion may be designed as two symmetrical halves of a single exposed structural shell suited for earthquake safety, or two conventional interlocking mating single exposed structural shell halves, or an intermediate one piece mullion, or the like.

Shape, design and detail of the exemplary embodiments of mullions or parts thereof, as shown in the figures, in solid cross sections of fire resistance material, may be capable of withstanding earthquakes, and may be provided with the same functions as extruded sections with two shells filled with fire resistance material. The two shells may be separated (see, for example, FIGS. 87 and 88), and may be provided for fenestration of extruded shapes only capable of withstanding earthquakes (see, for example, FIG. 89). The two shells may also be provided as a simple fenestration without a specific specialty (see, for example, FIG. 90, where the presented modular split mullion is composed of two mating halves). All shapes presented by the exemplary embodiments can be adjusted and re-detailed to fit any shape and function as explained in at least the four previous examples.

Methods, components, shapes, design, details, means of securing glass panels or any other applicable similar facing panel, including laminated glass panels discussed herein are exemplary. According to the different alternative exemplary embodiments, all components, thickness, type, composition, arrangement, construction type, or ratings discussed herein can be differently combined, arranged, and interchanged in any combination thereof to suit any installation method, manufacturing procedures, assembly phasing, current fabrication techniques, production lines, machinery, and to fulfill any needed functional requirement.

All illustrated embodiments of mullions can be adjusted and adapted to provide a one piece intermediate mullion between multiple panels, and can also be adjusted and adapted to provide an end jamb comprised of one half of any shown mullion.

FIGS. 37 through 40 further illustrate the embodiments of panels shown in FIGS. 28 and 31 through 36. Some figures are indicated as thermal insulation panels where attaching screws 251 are possible. Glass panel 322 of FIG. 40 shows spring 326 attached either directly to the facing panel 322, or to a barb 328. The different alternative glass panels, are discussed in more detail below.

FIGS. 41 through 42 illustrate an exemplary introduction to the laminating process and how it is adapted to the exemplary embodiments. Providing one or multiple grooves at the edge of a panel are needed for embedding an insert part, which is part of a bridging element, between the sheets of glass. With the appropriate engagement width and depth between the glass sheets while using an interlayer material, or fill-in materials similar to the interlayer material, and with the appropriate bond and strength properties, or the like, to hold the insert to the two surrounding sheets of glass, interlayer material or fill material may hold three or more sheets of glass and other clear plastic and/or the like material together instead of only the two sheets of glass, and as one integral unit. FIGS. 41 through 62 illustrate a pre-formed groove, and as shown in later figures, is another method of using heat and pressure to laminate the sheets of glass, and at the same time installing the at least one insert part in between at least two sheets of glass in one process.

FIG. 41 illustrates a method for providing a pre-formed groove for embedding the insert part of the bridging element inside the edge of the panel. In the related art, pour-in laminated panels are fabricated with two sheets of the same size, where tape is aligned with and seals the edges of the two sheets. According to FIG. 41, a laminated glass panel 366 is composed of two sheets of glass. Sheet 362 is at the outside, and sheet 364 is at the inside of the laminated glass. An edge 364e of sheet 364 is recessed to a desired distance "d" from an edge 362e of sheet 362. A laminating pour-in interlayer 368 integrally laminates the two sheets of glass, sheet 362 and sheet 364.

Tape 360, which may be a double face self adhesive soft plastic clear tape, can be provided in different sizes, and in different thicknesses to correspond to a width of groove 372. The tape 360 may be placed on one glass sheet 362 and lined at a desired distance from the edges 362e, 364e, then the other sheet of glass 364 is placed on top of the placed tape 360, and aligned at a desired distance from the edges of tape 360. Sheet 362 may have exterior faces 1 and 2 and sheet 364 may have exterior faces 3 and 4. The tape 360 may be between the face 2 of the exterior sheet of glass 362 and the face 3 of the interior sheet of glass 364. The sheet 362 and the sheet 364 may be adhered and sealed to tape 360 in a recessed manner as shown. An inner space 370, between the two sheets 362 and 364, and the bordering tape 360, may become a sealed cavity. A pour in resin, of, for example, a one or two part mixed material, may be poured into the sealed cavity, or inner space 370, and in a short time may cure to a rigid clear or colored interlayer. A groove 372 may then become pre-formed. The sheet 364 is presented herein as one simple sheet of glass, but may also be composed of a pre-assembled whole insulating glass unit 365 with multiple sheets of glass and an air gap with the width of a bordering desiccant spacer strip in between the sheets, as illustrated by the dotted lines in FIG. 41, and as described below. Such a configuration allows for energy savings.

FIG. 42 illustrates the heat and pressure method of providing pre-formed groove 372 at the edge of a laminated glass panel 374, by using two interlayer sheets 376 with a plastic, lexan, or Plexiglas or the like sheet 378, in between the interlayer sheets 376, which are in between the two sheets 362 and 364. (PLEXIGLAS® is a registered trademark owned by Rohm & Haas Company). Alternatively, by using one or multiple interlayer sheets 380, as shown separately with break lines, the thickness of the resulting total interlayer after lamination may be adjusted according to the required width of the groove 372. The two sheets 362 and 364, and the interlayer sheets 376 may be in a clean air room placed with the designated recess ends and edges, as shown respectively, as a dry non-adhered panel assembly.

The panel assembly may then be moved on rollers to the inside of a heated oven to be pressed with heated rollers as shown with indicated directional arrows "A" in a first step to preliminary laminating the assembly as a unit, and to remove the major air bubbles. The laminated assembly may have imperfections, folds of thin sheets of interlayer material, and/or a few air bubbles. The next step is to place the panel inside an autoclave where it is tightly locked to raise the pressure inside the autoclave to a relatively high pressure, while raising the inside temperature to a high degree. After a determined subjection to the pressure and heat, the panel assembly becomes a substantially perfectly laminated panel. The panel may be removed from the autoclave oven with the groove 372 pre-formed as desired.

FIG. 43 illustrates an exemplary embodiment of a glass panel unit, with a laminated glass panel 382 composed of two sheets 362 and 364 and a pre-formed groove 372 assembled to a single piece bridging element 386. The bridging element 386 can be provided in multiple pieces and in different configurations and adjustments to suit different fabrication techniques and attachment methods to support a mullion behind the glass panel. An insert part 384 of the bridging element 386 is shown engaging the groove 372. A weather seal 55 may be applied between an outer sheet of glass 388 and the bridging element 386. A fill-in liquid material 390 may be poured between the two sheets 362 and 364 and cured to a hard laminating material to hold the assembly together.

The fill-in liquid material 390 may be composed of a one or a two part resin, plastic, polyurethane, polyester, or the like material with good adhesion and strength properties. The fill-in liquid material 390 may be poured into a cavity between the laminated glass panel 382 and the bridging element 386. Due to capillary action, the liquid material 390 (i.e., resin material) may also spread and fill the groove 372 between groove walls and the insert part 384. A thin net fabric or a plastic net can be placed between insert part 384 and the walls of groove 372, as a cushion separating the groove 372 inside the walls and the bridging element 386.

FIG. 44 illustrates a glass facing unit in an exemplary embodiment, with a bridging element 392 attached to a glass panel composed of multiple sheets of glass, one sheet of glass at the outer side of insert part 384, the pre-formed groove 372, and multiple laminated sheets at the inner side of the insert part 385.

FIG. 45 illustrates an insulating glass unit with an air cavity 394 between an inner glass sheet 398 and an outer laminated glass sheet 400 which has pre-formed groove 372 for engaging an insert part 384 of a bridging element 402. A spacer desiccant strip 396 seals the air cavity 394 and separates the two sheets of glass, (i.e., the inner sheet 398 and the outer laminated glass sheet 400). The fill material 390 holds the assembly together. A primary seal adhesive paste or a seal tape may be applied to the sides of desiccant strip 396, to laminate the strip 396 to the two sheets of glass. Then, the strip 396 is placed at a desired distance from an edge between the two sheets of glass, and the assembly is pressed for assembling the insulating glass unit with a pre-formed groove 372. Placing the insulating glass unit in the press for pressing the two sheets of glass should take place before installing the bridging element 402.

FIG. 46-FIG. 62 are similar to the previously discussed exemplary embodiments and further include adjustments for the function, and the method of fabrication insulating glass units.

FIG. 46 illustrates an outer sheet of glass 412 at the outer side of an insert part, composed of laminated multiple sheets of glass. The exemplary embodiment illustrated in FIG. 46 includes only two sheets of glass 414 and 416. Accordingly the joints between the two sheets of glass 414 and 416 and an intermediate interlayer 415 may be exposed to the exterior elements, and may be subjected to de-lamination by thaw and freeze cycles and other weather and natural elements. To avoid or guard against de-lamination, the joints may be covered by an integral flange 418 extending from the bridging element 420. Weather seal 55 may be applied between the integral flange 418 and an edge of laminated sheet 412.

The exemplary embodiment illustrated in FIG. 47 is similar to the exemplary embodiment illustrated in FIG. 45. FIG. 47 illustrates a laminated insulating glass unit 480, attached to bridging element 488 with multiple insert parts 384 and 385. This exemplary embodiment may be used, for example, in areas that require hurricane and flying debris safety. In the case of flying debris, the inner laminated sheet of glass will prevent sending glass fragments flying inside the interior space, and the bridging element may also include one outer insert element 484 and preformed groove 372. The insulating glass unit 480 may be composed of an insulating inner air cavity 394, laminated glass sheet 482 at the outside, with pre-formed groove 372, and laminated glass sheet 484 at the inside, with pre-formed groove 373. Insert parts 384 and 486 may engage grooves 372 and 373, respectively. A seal 55 may be applied between the outer most sheet of glass 482 and bridging element 488. The insert part 486 may have holes 410 to allow fill-in liquid material 390 to fill a lower space, as shown by the hatching in FIG. 47.

The exemplary embodiment illustrated in FIG. 48 is similar to the exemplary embodiments illustrated in FIGS. 46 and 47, with three sheets at each side of insulating inner air cavity 394. An integral flange 418 extends from bridging element 528, and weather seal 55 is applied between the integral flange 418 and an edge of a laminated outer sheet of a glass panel 530.

FIG. 49 illustrates the use of a new type of safety and fire resistant rated glass. A clear sheet of glass 424a includes multiple sheets of glass 422, shown herein, for example, as three sheets with the special multi-intumescent interlayer sheets "a" in between the glass sheets 422. This intumescent material, if exposed to fire, will expand in the form of a rigid opaque foam insulation shield, blocking heat transmission and fire expansion. Furthermore, a thickness and number of glass sheets and intumescent interlayers can be adjusted as needed for the different fire resistance duration ratings. A fabrication method of this particular type of laminated glass is performed without subjecting the layers of intumescent material to heat lamination. For example, if the two sheets around the insert element 384 are pre-laminated and the pre-formed groove 372 is at the edge of the panel, pour-in liquid resin 368 can be used, or heat and pressure lamination with interlayer sheets 380 can also be used, before the two sheets are laminated to the two other sheets 422 which will may be laminated with intumescent interlayers. Integral flange 428 covers the edge of intumescent panel where wedge 153 can be placed in between the integral flange 428 and the sheets 422. Sealant 55 may be applied as a weather seal. Flange 428 is shown extended to cover the edge of the laminated intumescent glass panel 424a and at the maximum expected expansion of glass panel 424a-x, as shown in FIG. 50.

FIG. 50 illustrates an exemplary embodiment similar to the exemplary embodiment shown in FIG. 49. Here, the laminated glass sheet 424a (shown in FIG. 49), becomes sheet 424a-x with intumescent interlayers material after the sheet 424a-x is activated and expanded by exposure to fire, where it will expand to thicker interlayers "a-x".

FIG. 51 illustrates an exemplary embodiment similar to the exemplary embodiment shown in FIG. 47, except that two insert parts 532 and 534 are made of thin flexible material, where thickness is adjusted to tension forces, and will be designed to withstand the maximum expected tension including applicable factors of safety. A bridging element 548 may be placed on glass using cushion seal tape 474, the seal 55 may be applied to weather seal the unit, and liquid fill 390 may be applied and cured.

This exemplary embodiment is shown with two insert parts as an example of multiple insert parts, but one insert part engaging an outer sheet of glass and attached to the bridging element may also be used.

If the insulating glass unit with two sheets of glass 536 and 538 is pre-assembled, then sheets 540 and 542 may be laminated by the pour-in liquid resin 368, where the pre-assembled insulating glass unit is not subjected to heat or pressure. If the two sheets 536 and 540, and the sheets 538 and 542, at each side of the air cavity 394 are pre-laminated together before assembling the insulating glass unit, any method for the lamination of the sheets may be used.

The flexible inserts 532 and 534 (also referred to herein as two insert parts 532 and 534), as shown, may be pre-assembled to the bridging element 548. In this case, the laminated insulating glass unit is assembled with preformed grooves and may be laminated by the capillary action of liquid fill 390. Inserts can be embedded between the glass sheets during lamination with a heat and pressure method in one step, by placing two thin interlayer sheets at the two sides of inserted segment, with the total thickness adjusted to the thickness of adjacent interlayer sheet 380. After fabricating and assembling the laminated insulated glass unit with the inserts already embedded, the inserts may be attached to the bridging element 548 by using a single or multiple screws 460, and single nut or multiple nuts or continuous nut block 546, or a combination thereof, where the end angle segment 544 of insert parts 532 and 534 are attached and locked.

This exemplary embodiment illustrates the possibility of pre-applying the interlayer material 470 on the inserted segment of insert parts 532 and 534 with the desired embedding width, and with a total thickness equivalent to adjacent interlayer 380. Interlayer sheet 380 and the inserted segment are placed between each two sheets of glass, with the shown arrangement for the primary laminating phase of each two laminated glass panels. Flexible inserts 532 and 534 may be fabricated as an angle shape with an end angle bent 544. Each insert will flex and bend by heat rollers if heat and pressure method is applied, and will also flex and bend during pressing the insulated glass unit together.

Each inserted segment between the two sheets of glass can be bond treated, and a central segment submerged in the fill 390 may have holes for the liquid fill material 390 to pass through to fill all the spaces and cavities. The single or multiple bolt 460 can attach the end angle segment 544 of the single or multiple insert parts 532 and 534.

FIG. 52 illustrates an exemplary embodiment similar to the exemplary embodiments shown in FIGS. 48 and 51, but illustrates three sheets (536, 540, 541 and 538, 542, 543) at each side of the insulating inner air space 394, respectively. Integral flange 418 extends from the bridging element 549. Weather seal 55 is applied between flange 418 and the edge of the laminated outer sheets of glass 540 and 541.

Figure 53:
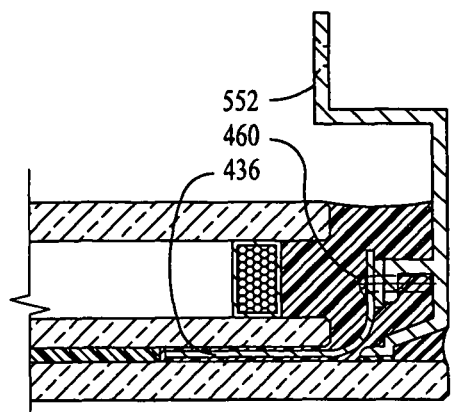
FIG. 53 is a cross sectional view similar to FIG. 43, of a laminated insulating glass unit with a single inner sheet of glass, and air space, and an outer laminated sheet of glass composed of two sheets and integrally attached to a bridging element which is pre-assembled to a separate insert part, the insert part being suited for a pre-formed groove or suited for being embedded during a heat and pressure laminating method.

FIG. 53 illustrates an exemplary embodiment similar to the exemplary embodiment shown in FIG. 45, with a one piece bridging element 552 attached to a separate pre-assembled insert part 436 preferably shown as one piece insert. The insert part 436 can be attached to the bridging element 552 by different methods, preferably shown herein with one or multiple screws 460. The insert part 436 can be a one piece or segment, or multiple pieces or segments of the same material or different materials. The insert part 436 may have a thin thickness with flexible properties to allow for fabrication tolerances, may have bond treatment at an embedded segment, and may have holes for fill material 390 so that the fill material 390 may pass through at the central segment to fill all spaces. Furthermore, a thin material of the insert part 436 may be a rigid material, or a flexible material, folded, fabric, braided, a wire rope, perforated, a screen, a mesh, or the like. The thin material can be made to suit a pre-formed groove attachment or to suit being embedded during a heat and pressure laminating method.

Figure 54:
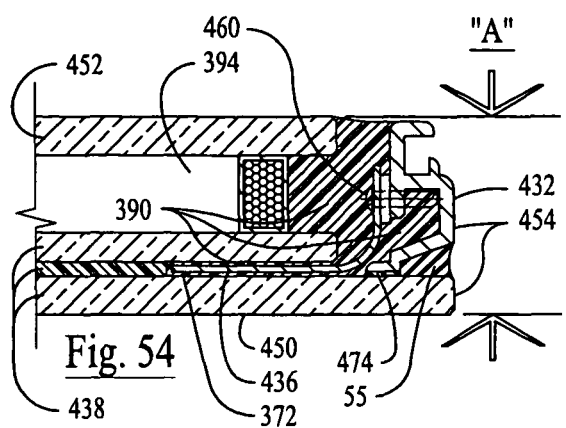
FIG. 54 is a cross sectional view similar to FIG. 53, of a laminated insulating glass unit with a single inner sheet of glass, and air space, and an outer laminated sheet of glass composed of two sheets and integrally attached to a panel edge part of a bridging element and having a separate pre-assembled insert part, the bridging element being composed of two parts.
Figure 55:
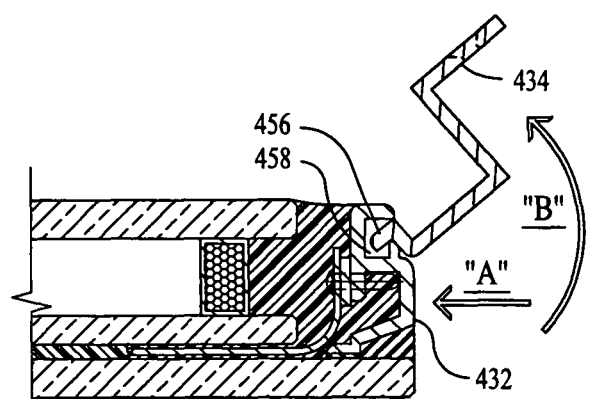
FIG. 55 illustrates the same embodiment of FIG. 54, and illustrates a method of attaching the mullion part of a bridging element.
Figure 56:
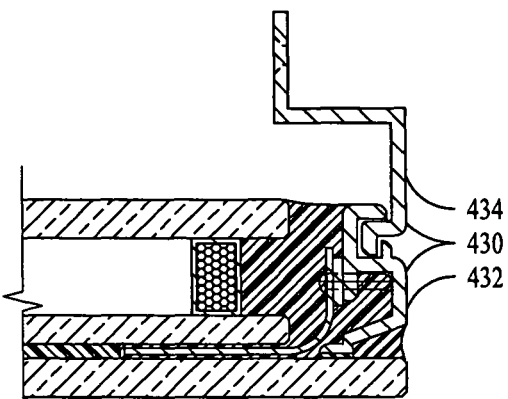
FIG. 56 illustrates the same embodiment of FIGS. 54 and 55 and illustrates a laminated insulating glass unit with an assembled panel edge part and a mullion part, which compose a bridging element.

FIGS. 54-56 illustrate an exemplary embodiment similar to the exemplary embodiment shown in FIG. 45, but with a bridging element 430 composed of two parts, an edge part 432 attached to a panel at its edge, and a mullion part 434 attached to a mullion. Part 432 attaches to an insert part 436. In this exemplary embodiment, part 432 with its attached insert part 436, may be attached first to the outer sheet of glass 438 before assembling the insulating glass unit 450. The insert part 436 may engage a pre-formed groove 372. The edge part 432 may be placed with tape 474. The sealant 55 may be applied to weather seal the unit. Fill-in liquid material 390 is partially applied as a first step to fill the space between insert 436 and walls of groove 372. The pour of the fill-in liquid material 390 may be completed later, after assembling the insulating glass unit as shown. Assembly 454 of a laminated sheet of glass 438 and edge 432 is formed.

A heat and pressure laminating method can be applied when insert part 436, having a central segment that is a flexible material, is placed as a straight piece. The insert part 436 may be placed where it will not interfere with rollers, where the inserted end will be embedded in between the two sheets of laminated glass sheet 438, and the other free end may be bent to stand up so that it may be attached to the edge part 432.

The inner sheet of glass 452 may be installed to assembly 454 by placing a primary seal adhesive paste or tape to the sides of the desiccant strip 396 where it is placed at the desired distance from an edge between the two sheets of glass 438 and 452. The assembly may be pressed for assembling the glass sheets and desiccant strip with the primary seal adhesive. Placing the unit in the press is graphically illustrated herein by the directional arrows "A". Placing the unit in the press should take place before installing the mullion part 434 of the bridging element 430. Part 432 is sized to have a little clearance from the press in its action. Liquid fill material is poured in the cavity and may cure to form a rigid fill which will hold the elements together and stiffen the assembly. A size and a shape of part 434 can be adjusted to suit the mullion configuration, and to suit the methods of attachment to mullion.

FIG. 55 illustrates the method of installing a part 434 to a part 432 by engaging and hooking the tip of a barb 456 in a chamber 458, as illustrated with directional arrow "A", then rotating the part 434 in a pivoted action around the centered chamber 458, as illustrated with directional arrow "B".

FIG. 56 illustrates a finished glass panel unit with the attached bridging element (i.e., the part 434) and the insert part (i.e., the part 432).

Figure 57:
FIG. 57 is a cross sectional view of a one piece bent insert part in an exemplary embodiment.

FIG. 57 illustrates a bent insert part 554 as one piece.

Figure 58:
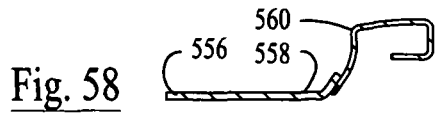
FIG. 58 illustrates the bent insert part shown in FIG. 57 alternatively being composed of two attached segments.

FIG. 58 illustrates a bent insert part 556 including two attached segments, where each segment can be fabricated with the required properties. An embedded segment 558 may have a bond treatment, and a segment 560 may be flexible.

Figure 59:
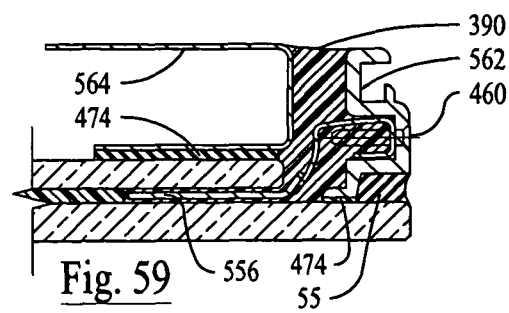
FIG. 59 is a cross sectional view of the bent insert part shown in FIG. 58, embedded inside the edge of laminated glass panel of clear, decorative, or spandrel glass, with a channel attached to the back of the panel in an exemplary embodiment.

FIG. 59 illustrates an exemplary embodiment similar to the exemplary embodiment of FIG. 54, and illustrates a single laminated glass panel of clear, decorative, or spandrel glass. Spandrel glass is mainly used to block the view from the outside between a ceiling of each floor and the top of a convector enclosure of the floor above, including a floor slab, beams, ducts, or the like. If a face of the spandrel glass panel must align with a face of an adjacent laminated insulating glass unit, (and for the economical use of the same parts and means of attachment to mullion, and as described below with respect to FIG. 90) a bent channel 564 may be installed at the back of panel by using a wider size tape 474. The total width of the assembly may be adjusted to the total width of the adjacent glass panel. An insert part 556 may be attached to the panel edge part 562 with a single or multiple screws 460, which directly attach and hold the insert part 556, as shown in FIG. 59, or by using a single or multiple nuts, or nut blocks, or a combination thereof, as shown in FIGS. 51 and 52.

Figure 60:
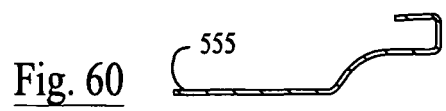
FIG. 60 is a cross sectional view of a one piece bent insert part in an exemplary embodiment.
Figure 61:
FIG. 61 illustrates a bent insert part shown in FIG. 60 in an alternative of being composed of two attached segments.
Figure 62:
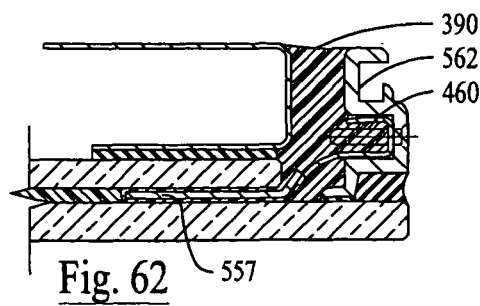
FIG. 62 is a cross sectional view of the bent insert part shown in FIG. 60, embedded inside an edge of a laminated glass panel of clear, decorative, or spandrel glass, with a channel attached to the back of the panel in an exemplary embodiment.

FIGS. 60-62 illustrate exemplary embodiments similar to the exemplary embodiments of FIGS. 57-59, but with a different shape of insert parts 555 and 557.

FIGS. 63-72 illustrate exemplary embodiments of a method of using heat and pressure in laminating the sheets of glass with an interlayer sheet, and at the same time installing the insert part in between the two sheets of glass in the same process. An interlayer material can be applied to two sides of an insert part and can be adjusted to have the same total thickness of adjacent interlayer sheet.

FIG. 63 illustrates a laminated panel of a glass composed of two sheets of glass, a space "A" needed between the heated rollers, shown in a first step, to primarily laminate the assembly as a laminated unit, and to remove the major air bubbles from the unit. Referring to FIG. 64, insert part 404 may have a hook shape 406 to engage barb 490 of panel edge part 408 of the bridging element.

FIG. 64 illustrates a panel edge part 408 of the bridging element placed by using a soft tape strip 474, and the seal 55 may be applied to its joint with glass. The assembled glass unit may be pressed together with an air cavity 394, an interior sheet of glass 398, a desiccant spacer strip 396, and an exterior sheet of laminated glass 500. Fill 390 may be applied as a liquid fill then may cure to a solid hard material to join all the parts of the assembly. The hook shape 406 has cuts or holes to allow for penetration of the fill 390 in all the spaces. The material of fill 390 has properties mainly for adhesion, strength, and for withstanding compression stresses.

FIGS. 65 and 66 illustrate an insert hinge part 492 composed of two parts, insert segments part 494 and hinge segment part 496. The hinge segment 496 is designed for the possible use of heat and pressure laminating methods, and to fold down on glass and does not interfere with the heat and pressure rollers indicated with directional arrows "A" of FIG. 63 during this primary laminating step. The segment 496 can be removed from insert segment 494 during the lamination process, to be re-installed back to part 494 and adjusted as shown by the directional arrow "A" of FIG. 64 for installing the panel edge part 408 of the bridging element. Hinge segment 496 is formed to adjust for placement and installation tolerance where the segment 496 is attached to part 498 with the single or multiple screws 460. The two segments 494 and 496 of the insert part 492 may be made of extruded shapes, but may also be made of sheet metal rolled and bent to form the required shape, braded rope wire fabric, chain fabric or the like. Thus, the two segments 494 and 496 may be made in numerous shapes, materials, compositions and may be designed to work as a hinge.

FIGS. 67 and 68 illustrate an exemplary embodiment similar to the exemplary embodiments illustrated in FIGS. 63-66, and further illustrate an insert part 502 composed of three segments, double hinge connected, to adjust for placement tolerance where the insert part 502 is attached to a part 498 with single or multiple screws 460. A hole in hinge 502 (the insert part 502) for the screw 460 can be spot drilled, or can be pre-drilled with an oversized hole where a special ellipse shaped nut 504 or the like of an unsymmetrical nut may be installed holding an upper hook shaped bent top 506 of a double hinge 502 (the insert part 502) in a desired location.

FIGS. 69 and 70 illustrate an exemplary embodiment similar to the exemplary embodiment illustrated in FIGS. 63-68, and further illustrate a two segments insert hinge 508 composed of insert segment 510 and angle segment 512. The angle segment 512 may be folded during lamination so as not to interfere with rollers during the heat and pressure laminating process.

FIG. 70 illustrates the segment 512 turned up as shown by a directional arrow "A", for installation and placement of a panel edge part 514 of the bridging element. A tape 474 maybe used to place the panel edge part 514. The seal 55 maybe applied to a joint with glass. The angle segment 512 may be turned back down as shown with a directional arrow "B" where the angle segment 512 engages a flange 516 of the panel edge part 514.

Rotating angle lock 518 is a locking device held up by tape during placement of the panel edge part 514 until after the angle part 512 engages flange 516. Then, lock 518 is turned down as shown by a directional arrow "C" circular movement. The lock 518 may be placed on top of the angle part 512 of the insert part and locks the angle part 512 in place. The lock 518 may have a cylindrical shaped end 520 where the lock 518 may be pre-installed to a corresponding round cavity in the panel edge part 514, and where circular movement "C" direction is centered.

The screw 460 may lock the angle lock 518 and the front tip of the screw 460 may be made to touch and push the sloped angled end of the angle lock 518 and slides on the angle lock 518 if and when tightened. This will cause the angle lock 518 to be pushed down further to tighten the lock onto the angle part 512 of the insert part. A part of the angle lock 518 where the cylindrical end 520 is located interferes with screw 460 and may be pre-cut only where the cylindrical part 520 interferes with the screw 460, such that lock 518 can move freely. The angle lock 518 can be provided in a single piece or in multiple pieces.

FIGS. 71 and 72 illustrate exemplary embodiments similar to the exemplary embodiments illustrated in FIGS. 69 and 70, and further illustrate the difference in providing one insert 522, which does not interfere with rollers, and is placed within a gap 524 between a glass and angled flange 526. Installation and placement of the panel edge part 514 of the bridging element may be accomplished by maneuvering the flange 516 through the gap 524 to engage the flange 526.

FIG. 73 illustrates an insert part 462 composed of three segments, an insert segment 464, attached to central flexible segment 466, which is attached to end tube segment 468. The insert segment 464 can be rigid and can have bond enhancement like barbs and holes. The central flexible segment 466 may be made of a thin gauge metal like stainless steel, or fabric or rope wire or chains or any flexible metal or component material.

The insert part 462 may be made of one material in different thicknesses to easily bend where needed, or may be made of a thin flexible material bent and folded on itself, or braded fine rope wire, or with different fabric pitch, or density, or thickness, or the like, to allow for providing each segment of the insert part 462 with the needed properties to perform the projected function.

FIG. 74 illustrates an exemplary embodiment including pre-applying an interlayer material 470 on the insert segment 464, with a total adjusted thickness equivalent to an adjacent interlayer sheet 380 (see also FIG. 75).

FIG. 75 illustrates the interlayer sheet 380, and the insert part 462 placed between the two sheets of glass 362 and 364, with the shown arrangement for the primary laminating phase of the glass panel by the heat and pressure rollers, as illustrated in directional arrows "A". A flexibility function of the central flexible segment 466 is shown flexing and bending with pressure rollers.

FIG. 76 illustrates an exemplary embodiment of an attachment of a part 472 of a bridging element 476. A soft tape 474 is preferably applied for placing the part 472 to apply the weather seal 55. Placing part 472 should be simultaneous with placing the end tube segment 468 into a corresponding chamber 478 while rolling on the end tube segment 468 the excess length of the central flexible segment 466, as illustrated with directional arrow "A". The central flexible segment 466 may stay relatively straight, and slightly in tension. The screw 460 may attach to and lock the end tube segment 468 in place.

FIG. 77 illustrates an exemplary embodiment of installation of the inner sheet of glass and desiccant strip for forming an insulating glass unit. Primary seal past or tape may be applied between a spacer desiccant strip 396 and the two surrounding sheets of glass, and accordingly may hermetically seal the air cavity 394, and may constantly place the two sheets of glass apart at the desired distance. Desiccant strip 396 may get placed at the desired distance from the edge between the two sheets of glass, and the assembly may be pressed for assembling the insulating glass unit. Placing the unit in the press for pressing the two sheets of glass and desiccant strip as shown with directional arrows "A" should take place before installing the bridging element 434. The fill material 390 may be applied and may hold the assembly together.

FIGS. 78 and 79 illustrate exemplary embodiments similar to the exemplary embodiments shown in FIGS. 55 and 56.

FIG. 80 illustrates an exemplary embodiment similar to the exemplary embodiments shown in FIGS. 73-79, and further illustrates laminated insulating glass units with two laminated sheets of glass at each side of the air cavity 394. The two insert parts 462 are used in a fashion similar to that shown in FIG. 51. The panel edge part (placing part) 472 of the bridging element 568 does not interfere with the process of pressing the two laminated sheets of glass to assemble the insulating glass unit. The placing part 472 will attach one insert part, and part 566 of the bridging element 568 may be installed and attached to the second insert part 462.

FIG. 81 illustrates an exemplary embodiment that is similar to the exemplary embodiment shown in FIG. 80, and further illustrates the laminated insulating glass units, with at least three sheets of glass at each side of the air cavity 394, where the two insert parts 462 are used in a fashion similar to that shown in FIG. 52, with two pieces 570 and 572 of the bridging element 574.

Examplary Embodiments of laminated insulating glass panels illustrated herein are mostly shown with one air cavity 394 for energy saving, furthermore, all exemplary embodiments can be adjusted to provide any desired plurality of air cavities.

FIGS. 82-84 illustrate exemplary embodiments similar to the exemplary embodiments shown in FIGS. 28-30, respectively, and further illustrate a mullion 582. The mullion 582 is preferably shown in this exemplary embodiment as a fire resistant mullion composed of pulltruded, extruded, cast, or carved of larger sections, two symmetrical halves of solid fire barrier 584. The mullion 582 can be designed to have an inner structural shell and an exposed outer shell, with fire barrier material cast in between the two shells. The mullion 582 may also be designed as a single exposed structural shell mullion suited for earthquake safety, as shown in two symmetrical halves, or two interlocking mating halves for non-seismic zones.

A laminated single glass panel 576 is composed of multiple sheets of glass, preferably shown herein as two sheets which conform to short fire resistance rated durations. The multiple sheets of glass can be made of fire resistance rated glass. The fire resistance rated glass may be made by providing special treatment to the glass surfaces to reflect heat rays back towards the fire source instead of allowing the heat rays to radiate through the glass to adjoining areas. Any type of applicable facing panel, and any type of laminated glass in any thickness, type, composition, arrangement, construction, or rating, including laminated insulating glass panel units can be easily adjusted to replace the single glass unit of the exemplary embodiment.

The glass panel 576 has a pre-attached embedded insert part 578 which interlocks with bridging element 580. The bridging element 580 may be installed to the insert part 578 as illustrated in FIGS. 82-84, and may have a single or multiple slotted holes 259. The panel 576 is installed by moving the panel 576 to rest on a front face of the mullion 582 while engaging and urging the slotted hole 259 of the bridging element 580 to engage with a nib 257. Then, the panel may be allowed to move by gravity and be fully interlocked and hooked by the nib 257. The glass panel 576 may be locked in place relative to the mullion 582 at a top and bottom of the mullion 582. A wedge 153 may be wedged in and tightly fill the space between the mullion 582 and the glass panel 576, and the sealant 55 may seal the mullion 582 and the glass joint and hold the wedge 153 in its place.

The exemplary embodiments also include glass or panel units designed for earthquake areas. Here, the mullion includes two symmetrical independent halves, and these halves do not engage each other as a split mating mullion but are free to move in a parallel direction (in-out and up-down). This arrangement allows units to stay angular and flat during all expected or non-expected moves. A dimension "Y" illustrates the difference in a panel unit twist movement, as shown between the two halves of mullion 582 where each panel and its half mullion frame are assembled as one rigid independent unit secured to a building at three connection points, as further explained with reference to FIGS. 85 and 86 below.

Figure 85:
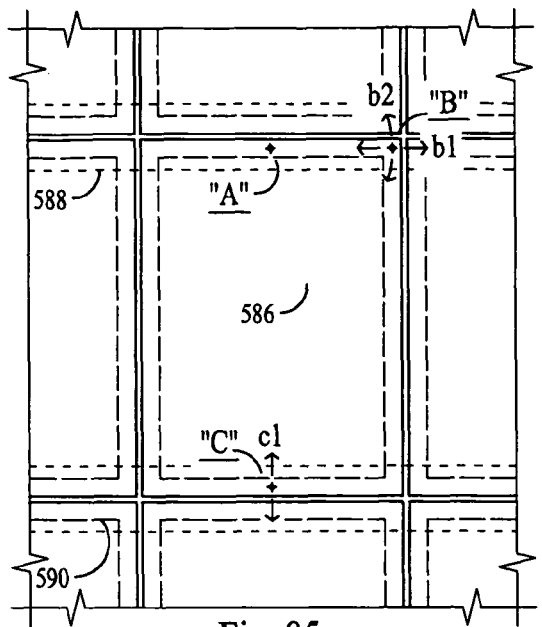
FIG. 85 is a façade view of a curtain wall with stopless glass panel units, illustrating a method of attachment to the building slabs to withstand earthquakes.
Figure 86:
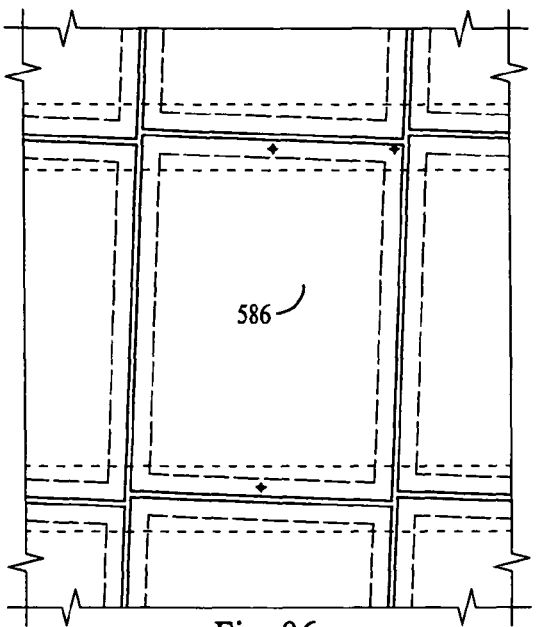
FIG. 86 illustrates the deformed shape of the same façade shown in FIG. 85, which may be caused by floor shifts during earthquakes.

FIGS. 85 and 86 illustrate another special seismic safety feature where each glass or panel unit 586 may be anchored to the building floor slabs at three connection points. A top mullion may be anchored to a top floor slab structure 588 at two connection points "A" and "B". A bottom mullion may be anchored to a bottom slab structure 590 at one connection point "C". The connection point "A" can be located at any convenient location, and preferably located at a center of the unit. The connection point "A" may be a fixed connection or a sleeve connection but may allow for easy rotational movement of the unit around its center. The connection point "B" may be aligned horizontally with the connection point "A", and may allow for a differential thermal expansion movement as shown with directional arrows (b1) and (b2), in a rotating movement centered at the connection point "A", for movements connected to, for example, earthquakes, where floor slabs shift and twist in relation to each other. The connection point "C" is vertically aligned with the connection point "A", and allows for differential thermal expansion movement between the building and the unit, and also allows for uneven deflection of the floor slabs due to differential live loads, where allowed movement is in a direction centered with the connection point "A", as shown by directional arrows (c1).

This three connection point arrangement allows the units to stay angular and flat during all expected or non-expected moves, and keeps the face of the top mullion parallel to the face of the top slab 558, and will allow the mullions at all sides of the unit to move or project in relation to the adjacent units. The panel units will also follow the sway, floor shifts, and twist of the upper slab as an independent separated rigid unit.

Figure 87:
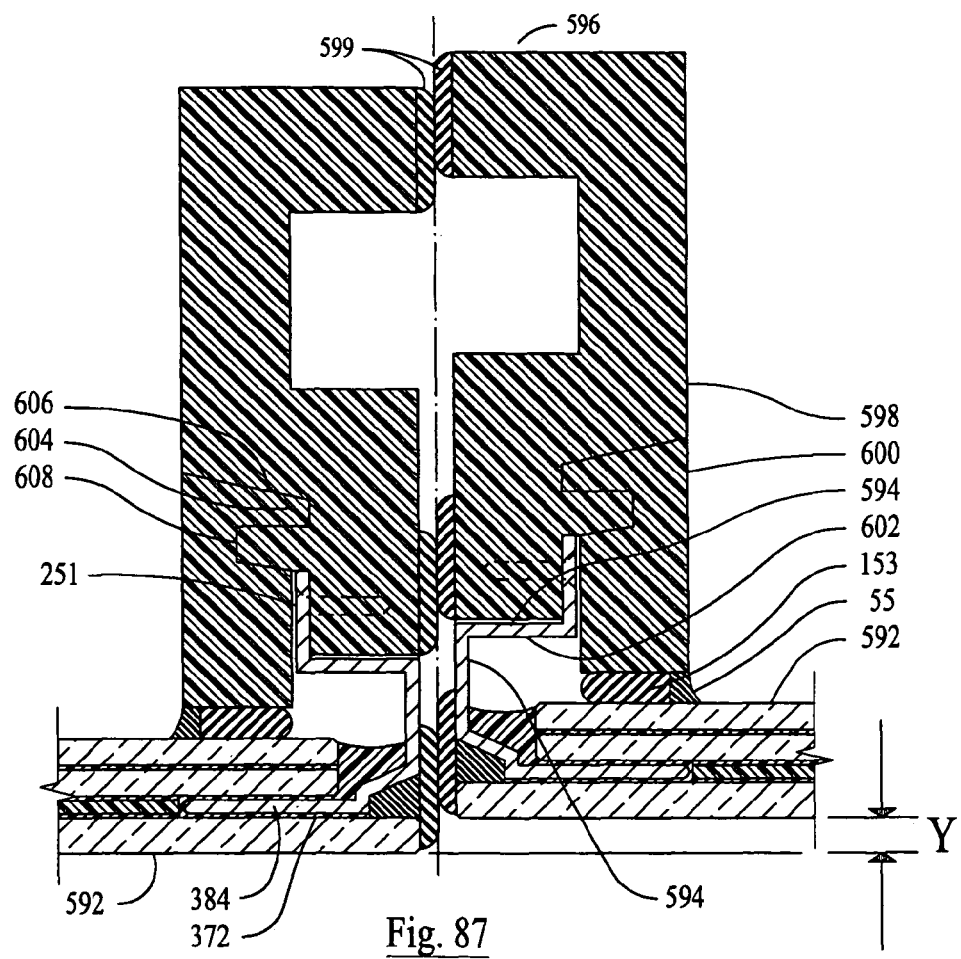
FIG. 87 is a horizontal cross sectional view of an alternative fire resistance rated laminated glass panel unit, with a unitized split mullion similar to FIGS. 31, 32 and 82 and illustrates the mullion composed of two symmetrical halves of solid fire barrier, and the expected move of adjacent panel units caused by earthquakes.

FIG. 87 illustrates a laminated glass unit composed of a mullion 596 and laminated glass panel 592. The mullion 596 and the glass panel 592 are preferably shown in this exemplary embodiment as a fire resistant unit with the added advantage of seismic safety to withstand earthquakes. The mullion 596 may be composed of pulltruded, extruded, cast, or carved of larger sections, and/or two symmetrical mullion halves 598 of solid fire barrier. A compressible pad 599 may be attached to the front and back of each mullion half, and at the edges of the glass panels. The compressible pad 599 may be made of a pre-formed compressible mineral fiber, or other non-combustible, or fire retardant fabric or fiber, and may be covered by a closed cell elastic coat.

A cover 600 may be installed to the mullion 596 to conceal screws 251 and the anchoring method of the bridging element 594 to half mullion 598. The bridging element 594 ends with angle shape 602 similar to the anchor angle 277 shown in FIG. 32. A flange 604 of the cover 600 extends to engage a chamber 606 of a mullion 598, which is shaped by a flange 608 of the mullion 598. The flange 604 is formed to install and align the cover 600 in its place. A wedge 153 may be installed and the sealant 55 may be applied between the mullion 598 and the laminated glass panel 592.

Figure 88:
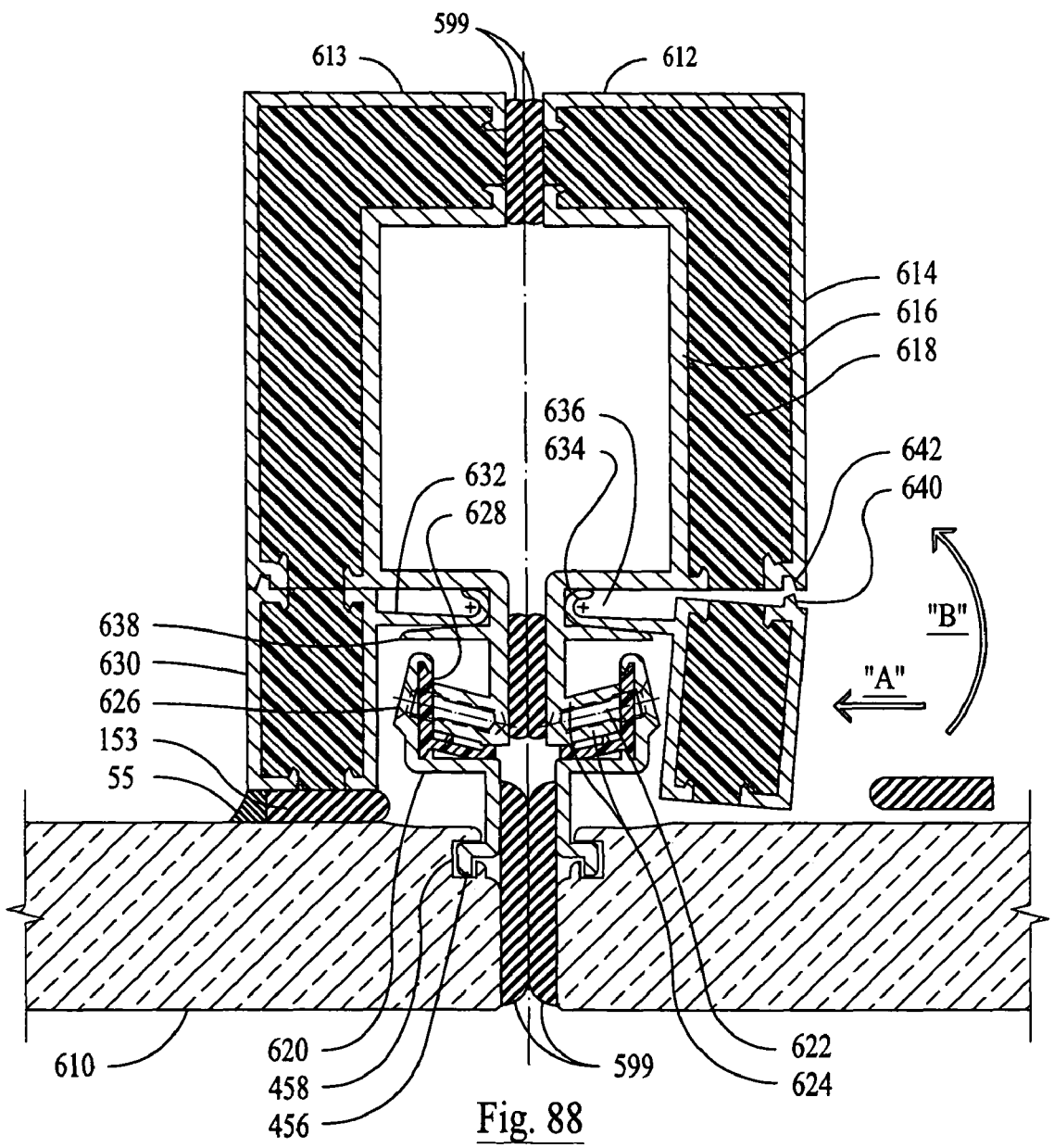
FIG. 88 is a horizontal cross sectional view similar to FIGS. 31, 32, 82 and 87, of a mullion suited to withstand earthquakes, an alternative embodiment to FIG. 87, with each mullion half composed of an outer cover shell, an inner structural shell, and a fire barrier in between the two shells.
Figure 89:
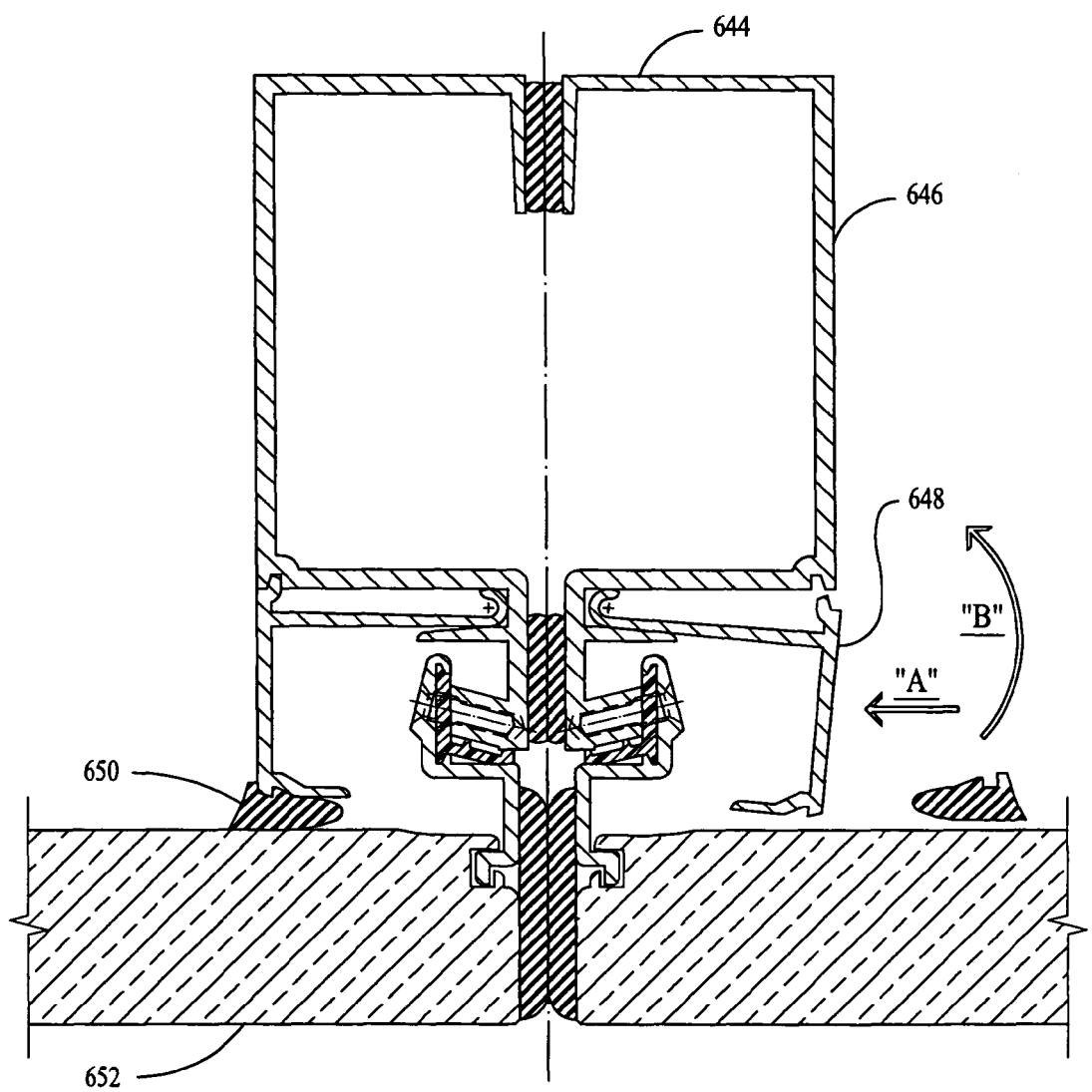
FIG. 89 is a horizontal cross sectional view similar to FIG. 88, of an alternative mullion suited to withstand earthquakes, with each mullion half composed of an exposed structural shell.
Figure 90:
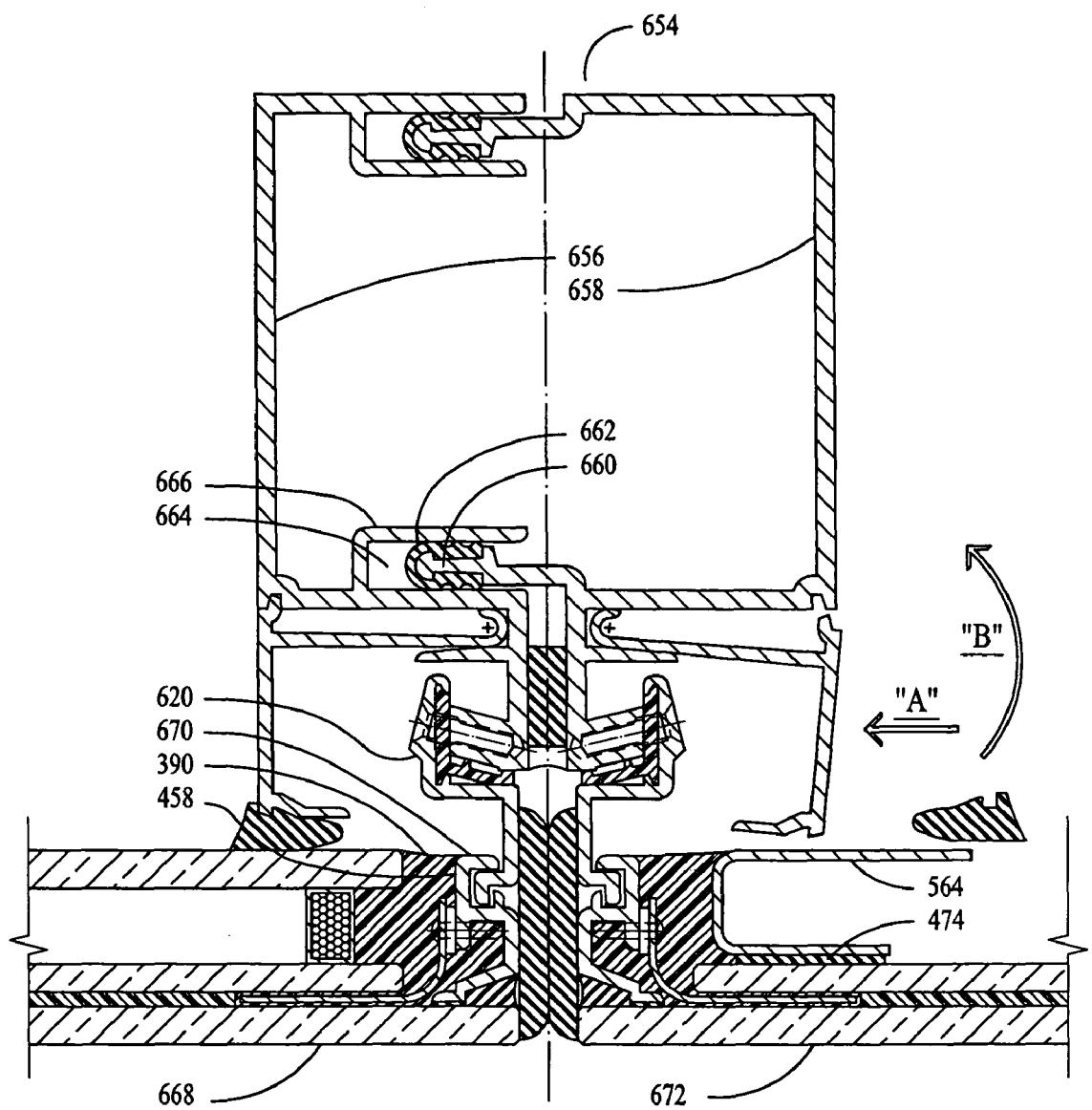
FIG. 90 is a horizontal cross sectional view similar to FIG. 89, of a conventional mullion alternative embodiment to FIG. 89, with two interlocking unitized split mullion halves of exposed structural shells.

The mullion 596 can be designed to have an inner structural shell and an exposed outer shell, with fire barrier material cast in between the two shells, and with a cover to conceal the attachment of the bridging element 594, as shown in the exemplary embodiment illustrated by FIG. 88. The mullion 596 may also be designed as a conventional single exposed structural shell mullion suited for earthquake safety, as shown in FIG. 89. The mullion 596 may also be designed as a conventional mullion with two interlocking mating halves without fire resistance rating or seismic safety, as shown in FIG. 90.

This exemplary embodiment illustrates the possible alternative details of a laminated glass panel 592 instead of the simply illustrated insulation panel as shown in FIGS. 38 and 39. The panel 592 may be composed of laminated multiple glass sheets, preferably three sheets attached to preferably a one piece bridging element 594, with an insert part 384 engaging a pre-formed groove 372. This exemplary embodiment is similar to the exemplary embodiment illustrated by FIG. 82.

FIG. 88 illustrates an alternative design to the same concept of the exemplary embodiment illustrated by FIG. 87. Here, a fire resistant unit with the added advantage of seismic safety for withstanding earthquakes is illustrated. A laminated glass panel 610 may be composed to conform to any desired function as explained with respect to the exemplary embodiments, and preferably has a bridging element panel-part attached to form the glass panel edge with a chamber 458. The chamber 458 engages and interlocks with a barb 456 of the bridging element mullion-part 620, as explained and illustrated in FIGS. 55 and 56.

The mullion 612 is composed of two symmetrical halves 613, each half is composed of an outer cover shell 614, an inner structural shell 616, and a middle fill 618 of fire barrier in between the two shells. The compressible pad 599 is attached to the front and back of each mullion half, and at the edges of the laminated glass panel 610. A front part of the mullion 612 is formed to anchor the bridging element mullion-part 620, and is shaped as an angle where a screw-way 622 is formed at its front end. The screw-way 622 is formed by the two flanges 624, and is angled to allow for comfortable handling and access to install a single or multiple screws 626 to attach the bridging element 620 to a front of the mullion 612. A pre-formed thermal break 628 may be pre-installed to the bridging element 620, to provide for energy saving.

A cover 630 may be installed to the mullion to conceal screws 626 and the method of anchoring the bridging element 620 to the half mullion 613. A flange 632 of the cover 630 has a circular end 634 to allow for rotational movement around a center of the flange 632. The flange 632 extends to engage a chamber 636 of the half mullion 613, which is shaped by a flange 638 of the half mullion 613. The flange 632 of the cover 630 is formed to install and align the cover 630 in its place. The cover 630 may be installed by moving the cover 630 in the front of the half mullion 613 while engaging the flange 632 and the circular end 634 in the chamber 636, as illustrated with directional arrow "A". The flange 638 of the half mullion 613 will restrain the flange 632 and an edge of the cover 630 from touching the face of the glass panel 610. The rotating cover 630, as illustrated by directional arrow "B", while urging a barb 640 of the cover 630 to engage a cavity 642 of the half mullion 613. A wedge 153 may be wedged between the cover 630 and the glass panel 610 and may lock the cover 630 in place. The sealant 55 may be applied between the half mullion 613 and the laminated glass panel 592 and may hold the wedge 153 in place.

FIG. 89 illustrates an exemplary embodiment similar to the concept of the exemplary embodiment of FIG. 88, for a conventional unit with the added advantage of seismic safety to withstand earthquakes. A mullion 644 may be composed of two halves 646. Each half 646 may be composed of a single structural exposed shell, as well as a cover 648. A wedge gasket 650 may be pushed between the cover 648 and a panel 652, and may lock the cover 648 in place.

FIG. 90 illustrates an exemplary embodiment similar to the concept of the exemplary embodiment of FIG. 89. A unitized mullion 654 may be composed of two mating and interlocking halves, a female half 656, and a male half 658. The male half 658 may have two flanges 660 and each flange may have a weather gasket 662 installed at its end. The female half 656 may have two angles 666 which form cavities 664. The male flanges 660, wrapped with gaskets 662, may engage the two angles 666 in the cavities 664.

A laminated insulating glass panel 668 has a bridging element composed of two parts, a bridging element panel-part 670 installed at the edge of panel, where cavity 458 is formed, and a bridging element mullion-part 620 attached to the mullion. A single glass laminated panel 672 illustrates a clear, decorative, or spandrel glass. The spandrel glass is mainly used to block the view from the outside between ceiling of each floor and the top of a convector enclosure of the floor above, including floor slab, beams, ducts and the like, as illustrated in FIG. 5.

If the face of the single glass panel 672 has to align with a face of the adjacent laminated insulating glass unit 668, a bent channel 564 may be installed at the back of the panel 668 by using a wider size of tape 474, and the total width of the assembly may be adjusted to the total width of the adjacent glass panel 668. For economical reasons, the same parts and device for applying the resin/liquid fill 390 and method of attachment to the mullion is used.

FIG. 91 illustrates an exemplary composition of a glass panel 674, similar to the glass panel 322 illustrated in FIG. 40. Any type of applicable facing panel, and any type of laminated glass in any thickness, composition, arrangement, construction, or rating, including laminated insulating glass panel units, may be easily adjusted to any desired function, and may replace the illustrated glass panel 674.

While this invention has been described in conjunction with specific embodiments outlined above, it is evident that many alternatives, modifications and variations will be apparent to those skilled in the art. Accordingly, the preferred embodiments of the invention, as set forth above, are intended to be illustrative, not limited. Various changes may be made without departing from the spirit and scope of the invention.

What is claimed is:

1. A fenestration system for use in buildings or structures, the fenestration system comprising:
    a panel including a plurality of sheets;
    a laminating interlayer between each of the plurality of sheets, the plurality of sheets being laminated together;
    a supporting mullion continuously attached to the panel at one side of the panel, the panel extending and overlapping a face of the supporting mullion, a cavity being defined between the panel and the mullion;
    a bridging element having a first end and a second end, the first end having an insert part integrally embedded at an edge of the panel between the plurality of sheets, the second end being connected to the supporting mullion, the insert part being a hinge;
    a cover that covers at least a portion of the cavity between the panel and the mullion; and
    a compressible wedge between the panel and the cover, the compressible wedge separates the panel and the cover.

2. The fenestration system according to claim 1, wherein the bridging element comprises a plurality of parts, including the insert part.

3. The fenestration system according to claim 1, wherein the insert part of the bridging element comprises a plurality of segments, and has a means for adjusting to fabrication and cutting tolerances, the insert part comprising a flexible material, the plurality of segments capable of being hinged together.

4. The fenestration system according to claim 2, wherein the plurality of parts include an attached rotating hinged angle lock part that rotates and tightens in a locking action on the insert part, wherein the locking action is activated by a screw.

5. The fenestration system according to claim 1, wherein the bridging element comprises an elastic part capable of elongating to allow the panel to move in at least a direction parallel to a face of the panel and perpendicular to the face of panel.

6. The fenestration system according to claim 1, wherein the mullion comprises two interlocking halves, a female half and a male half.

7. The fenestration system according to claim 1, further comprising:
two non-interlocking halves that form the mullion, the two non-interlocking halves defining a joint; and
an axis defined by the joint, the two non-interlocking halves being free to move with respect to each other in any direction parallel to the axis;
wherein the fenestration system is capable of withstanding seismic movement.

8. The fenestration system according to claim 1, the fenestration system being fire resistant for a desired duration of time.

9. The fenestration system according to claim 7, further comprising:
a mullion frame anchored to the building or structure at multiple points including one fixed connection and at least one sleeve connection arranged to allow for differential thermal expansion, deflection of the structure due to differential live loads or moving loads, floor shifts and twisting during earthquakes.

10. The fenestration system according to claim 1, wherein the insert part of the bridging element is embedded between the plurality of sheets of the panel while laminating the plurality of sheets together.

11. A method for forming a fenestration system for use in building or structures, the method comprising:
forming a panel with a plurality of sheets;
placing a laminating interlayer between each of the plurality of sheets;
laminating the plurality of sheets together to form a single unit;
attaching the panel to a mullion with a bridging element, the mullion including an inner structural shell, a cavity, a cover, and a wedge;
attaching the bridging element to an edge of the panel with an insert part, the insert part being a hinge; and
placing the wedge between the panel and the cover so that the cover abuts the inner structural shell.

12. The method for forming the fenestration system of claim 11, further comprising:
securing the mullion to the structure or building at a plurality of connection points.

13. The method for forming the fenestration system of claim 11, further comprising:
attaching an edge of the panel to the mullion.

14. The method for forming the fenestration system of claim 11, further comprising:
integrally forming the insert part with the bridging element.

15. The method for forming the fenestration system of claim 11, further comprising:
attaching the insert part and the bridging element to each other with a screw.

16. The method for forming the fenestration system of claim 11, further comprising:
defining the insert part with at least one hole to allow liquid to be poured through the insert part and between the plurality of sheets.

17. The method for forming the fenestration system of claim 16, further comprising:
attaching the mullion and panel together at approximately a same time the plurality of sheets are laminated together.

18. The method for forming the fenestration system of claim 11, wherein
the panel is fire resistant and the mullion includes an outer shell and a barrier formed of a fire resistant material disposed between the inner structural shell and the outer shell, the method further including sealing a space between the mullion and the fire resistant panel with at least one fire resistant compressible filler.

19. The method of forming the fenestration system of claim 18, further comprising:
providing an elastic part of the bridging element to allow the fire resistant panel to move in at least one of a rotational direction and translational direction.

20. The method for forming the fenestration system of claim 19, wherein the elastic part of bridging element further comprises a spring and an end element.

21. The method for forming the fenestration system of claim 18, wherein the at least one mullion further includes at least two separate mullion portions, the mullion portions each accommodating at least one fire resistant panel, wherein the mullion portions have of a fire resistant barrier strip and a fire resistant weather strip disposed between the mullion portions.

22. The method for forming the fenestration system according to claim 19, further comprising:
securing the panel, at a plurality of connection points, to at least two consecutive horizontal floor slabs including an upper slab and a lower slab, wherein the plurality of connection points allow a top or a bottom of the panel to remain parallel or substantially parallel to a face of an adjacent slab while allowing the mullion to move with respect to the structure or building.

* * * * *